(12) United States Patent
Aridomi et al.

(10) Patent No.: US 10,795,515 B2
(45) Date of Patent: Oct. 6, 2020

(54) TRANSFER FILM, ELECTRODE PROTECTIVE FILM FOR ELECTROSTATIC CAPACITANCE-TYPE INPUT DEVICE, LAMINATE, METHOD FOR MANUFACTURING LAMINATE, AND ELECTROSTATIC CAPACITANCE-TYPE INPUT DEVICE

(71) Applicant: FUJIFILM Corporation, Tokyo (JP)

(72) Inventors: Takashi Aridomi, Fujinomiya (JP); Shinichi Kanna, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/928,360

(22) Filed: Mar. 22, 2018

(65) Prior Publication Data

US 2018/0210580 A1 Jul. 26, 2018

Related U.S. Application Data

(63) Continuation of application No. PCT/JP2016/078421, filed on Sep. 27, 2016.

(30) Foreign Application Priority Data

Sep. 29, 2015 (JP) .................................. 2015-191319

(51) Int. Cl.
*G06F 3/044* (2006.01)
*B32B 27/00* (2006.01)
(Continued)

(52) U.S. Cl.
CPC ................ *G06F 3/044* (2013.01); *B32B 9/04* (2013.01); *B32B 27/00* (2013.01); *B32B 27/08* (2013.01);
(Continued)

(58) Field of Classification Search
CPC ... B23B 7/06; B23B 27/308; B23B 2457/208; G06F 3/044–3/0448
See application file for complete search history.

(56) References Cited

U.S. PATENT DOCUMENTS

2007/0218374 A1* 9/2007 Kitano ................... G11B 7/252
430/14
2009/0004597 A1* 1/2009 Ueoka ..................... C03C 3/066
430/270.1
(Continued)

FOREIGN PATENT DOCUMENTS

JP 2009-116452 A 5/2009
JP 2014-108541 A 6/2014
(Continued)

OTHER PUBLICATIONS

Wiyono et al., Chemical Compositions of Pine Resin, Rosin, and Turpentine Oil from West Java, Journal of Forestry Research, vol. 3, No. 1, pp. 7-17 (Year: 2006).*

(Continued)

*Primary Examiner* — Ramsey Zacharia
(74) *Attorney, Agent, or Firm* — Sughrue Mion, PLLC

(57) ABSTRACT

A transfer film including a temporary support and a photosensitive transparent resin layer located on the temporary support, in which the photosensitive transparent resin layer includes (A) a binder polymer, (B) a photopolymerizable compound having an ethylenic unsaturated group, (C) a photopolymerization initiator, and (D) a rosin compound can be used to form electrode protective films for electrostatic capacitance-type input devices which have a low moisture permeability and are excellent in terms of heat and moisture resistance after the supply of saline water; an electrode protective film for an electrostatic capacitance-type input device; a laminate; a method for manufacturing the laminate; and an electrostatic capacitance-type input device.

24 Claims, 7 Drawing Sheets

(51) Int. Cl.
*B32B 9/04* (2006.01)
*B32B 27/08* (2006.01)
*B32B 27/30* (2006.01)
*B32B 27/36* (2006.01)

(52) U.S. Cl.
CPC ............ *B32B 27/308* (2013.01); *B32B 27/36* (2013.01); *B32B 2307/412* (2013.01); *B32B 2457/208* (2013.01); *G06F 2203/04103* (2013.01)

(56) References Cited

U.S. PATENT DOCUMENTS

| | | | |
|---|---|---|---|
| 2013/0211028 A1* | 8/2013 | Shinike | G06F 3/044 526/307.5 |
| 2014/0363767 A1 | 12/2014 | Murakami et al. | |
| 2015/0251393 A1 | 9/2015 | Kanna et al. | |
| 2015/0331151 A1 | 11/2015 | Fukuda et al. | |

FOREIGN PATENT DOCUMENTS

| | | |
|---|---|---|
| JP | 2015-7768 A | 1/2015 |
| JP | 2015-102813 A | 6/2015 |
| WO | 2013/084872 A1 | 6/2013 |
| WO | WO-2013084886 A1 * | 6/2013 |
| WO | 2014/119487 A1 | 8/2014 |

OTHER PUBLICATIONS

International Search Report for PCT/JP2016/087421, dated Jan. 10, 2017.
International Preliminary on Patentability Report dated Apr. 3, 2018, issued by the International Searching Authority in application No. PCT/JP2016/078421.
Written Opinion dated Jan. 10, 2017, issued by the International Searching Authority in application No. PCT/JP2016/078421.
Office Action dated Mar. 26, 2019 from the Japanese Patent Office in Japanese Application No. 2017-543425.
Office Action dated Apr. 26, 2019 issued by the State Intellectual Property Office of People's Republic of China in counterpart Chinese application No. 201680056173.2.
Office Action dated Dec. 11, 2019 issued by the State Intellectual Property Office of the People's Republic of China in counterpart Chinese application No. 201680056173.2.
Office Action dated Apr. 14, 2020, from the State Intellectual Property Office of the P.R.C in Chinese application No. 201680056173.2.

* cited by examiner

TRANSFER FILM, ELECTRODE PROTECTIVE FILM FOR ELECTROSTATIC CAPACITANCE-TYPE INPUT DEVICE, LAMINATE, METHOD FOR MANUFACTURING LAMINATE, AND ELECTROSTATIC CAPACITANCE-TYPE INPUT DEVICE

CROSS-REFERENCE TO RELATED APPLICATIONS

This application is a Continuation of PCT International Application No. PCT/JP2016/078421, filed on Sep. 27, 2016, which claims priority under 35 U.S.C. Section 119(a) to Japanese Patent Application No. 2015-191319 filed on Sep. 29, 2015. Each of the above applications is hereby expressly incorporated by reference, in its entirety, into the present application.

BACKGROUND OF THE INVENTION

1. Field of the Invention

The present invention relates to a transfer film, an electrode protective film for an electrostatic capacitance-type input device, a laminate, a method for manufacturing a laminate, and an electrostatic capacitance-type input device.

2. Description of the Related Art

Recently, as electronic devices such as mobile phones, car navigations, personal computers, ticket vending machines, and bank terminals, there are electronic devices in which a liquid crystal display device having a touch panel-type input device is provided and desired commands can be input by contacting images and the like displayed on the liquid crystal display device with fingers or styluses.

As the input device (touch panel), there are resistance film-type input devices, electrostatic capacitance-type input devices, and the like. Electrostatic capacitance-type input devices have an advantage that a transparent conductive film needs to be formed only on one substrate. As such electrostatic capacitance-type input devices, for example, there are input devices in which transparent electrode patterns are extended in mutually intersecting directions and input locations are detected by sensing changes in electrostatic capacitance between electrodes caused in a case in which an input surface of the electrostatic capacitance-type input device is contacted with fingers or the like.

As an electrode protective film for an electrostatic capacitance-type input device which protects guidance wires (for example, metal wires such as copper wires) arranged in electrode patterns or frame portions in the electrostatic capacitance-type input device, a transparent resin layer is provided on a side opposite to a surface on which information is input with fingers or the like.

Methods for forming a transparent insulating layer or a transparent protective layer for electrostatic capacitance-type input devices by transferring a curable transparent resin layer from a transfer film are known. For example, JP2014-108541A discloses the use of a transfer film including a temporary support, a first curable transparent resin layer, and a second curable transparent resin layer disposed adjacent to the first curable transparent resin layer in this order, in which the refractive index of the second curable transparent resin layer is higher than the refractive index of the first curable transparent resin layer, and the refractive index of the second curable transparent resin layer is 1.6 or higher as a transfer film for transparent insulating layers or transparent protective layers in electrostatic capacitance-type input devices.

SUMMARY OF THE INVENTION

From the viewpoint of improving the heat and moisture resistance of electrostatic capacitance-type input devices, there is a demand for decreasing the moisture permeability of electrode protective films that protect electrodes in electrostatic capacitance-type input devices from moisture and the like. In JP2014-108541A, no studies have been made regarding a decrease in the moisture permeability of electrode protective films for electrostatic capacitance-type input devices or the improvement of the heat and moisture resistance of electrostatic capacitance-type input devices.

Furthermore, electrode protective films for electrostatic capacitance-type input devices are intended to protect guidance wires arranged in electrode patterns or frame portions in electrostatic capacitance-type input devices from moisture such as sweat. From the viewpoint of weight reduction, there is a demand for decreasing the thickness of transparent resin layers; however, as an adverse effect, a new problem of the deterioration of the resistance to moisture including a salt content such as sweat, that is, the heat and moisture resistance after the supply of saline water has been found. The heat and moisture resistance after the supply of saline water is a practically important performance since sweat attached when human beings touch the input surface of an electrostatic capacitance-type input device with fingers intrudes into the electrostatic capacitance-type input device through gaps and reaches protective layers in the device, and, afterwards, the electrostatic capacitance-type input device is used in a hot and humid environment or charging or the like forms a high-temperature and high-humidity environment in the electrostatic capacitance-type input device.

Meanwhile, for usages other than electrostatic capacitance-type input devices, curable compositions in which a rosin compound is used are known.

WO2014/119487 A1 describes an optical film having a layer formed by curing a curable composition containing 50% to 99% by mass of (A) and 1% to 50% by mass of (B) with respect to a total solid content of the curable composition when the total solid content is set to 100% by mass on a substrate film;

(A) at least any of a compound having a cyclic aliphatic hydrocarbon group and an ethylenic unsaturated group and a compound having a fluorene ring and an ethylenic unsaturated group; and (B) a rosin compound.

According to WO2014/119487 A1, it is described that, due to the above-described constitution, it is possible to provide an optical film having a decreased moisture permeability. In addition, it is described that, in a case in which this optical film is used as a protective film for a polarizer in a polarizing plate, it is possible to provide liquid crystal display devices in which the occurrence of light leakage caused after the liquid crystal display devices are stored in a high-temperature and high-humidity environment is suppressed.

However, protective films for polarizers in polarizing plates disposed in liquid crystal display devices are not a usage in which the protective films are assumed to be used in a hot and humid environment after being touched by human fingers, and protective films for polarizers in polarizing plates disposed in liquid crystal display devices do not have any problem with the heat and moisture resistance after the supply of saline water after the curing of the protective films. Actually, WO2014/119487 A1 does not pay any attention to a problem of the heat and moisture resistance after the supply of saline water.

In addition, WO2014/119487 A1 even does not imply the use of the curable composition for a usage of electrostatic capacitance-type input devices. Therefore, hitherto, persons skilled in the art have not studied the use of curable compositions for protective films for polarizers in polarizing plates disposed in liquid crystal display devices in the usage of electrostatic capacitance-type input devices.

An object of the present invention is to provide a transfer film which can be used to form electrode protective films for electrostatic capacitance-type input devices which have a low moisture permeability and are excellent in terms of the heat and moisture resistance after the supply of saline water.

In addition, another object thereof is to provide an electrode protective film for an electrostatic capacitance-type input device and a laminate, for which the transfer film is used, a method for manufacturing the laminate, and an electrostatic capacitance-type input device including the laminate.

The present inventors found that the above-described objects can be achieved with means of using a transfer film having a photosensitive transparent resin layer including a rosin compound.

Meanwhile, JP2014-108541A does not describe that rosin compounds are used for transfer films. WO2014/119487 A1 does not describe that curable compositions including rosin compounds are used for electrode protective films for electrostatic capacitance-type input devices or transfer films having a temporary support.

The present invention which is specific means for achieving the above-described objects will be described below.

[1] A transfer film comprising: a temporary support; and a photosensitive transparent resin layer located on the temporary support, in which the photosensitive transparent resin layer includes (A) a binder polymer, (B) a photopolymerizable compound having an ethylenic unsaturated group, (C) a photopolymerization initiator, and (D) a rosin compound.

[2] The transfer film according to [1], in which (D) the rosin compound is preferably one or more kinds of rosin compounds selected from rosin, hydrogenated rosin, acid-modified rosin, and esterified rosin.

[3] The transfer film according to [1] or [2], in which (D) the rosin compound preferably includes one or more kinds of compounds selected from abietic acid, an abietic acid derivative, palustric acid, a palustric acid derivative, isopimaric acid, and an isopimaric acid derivative.

[4] The transfer film according to any one of [1] to [3], in which (D) the rosin compound is preferably rosin or hydrogenated rosin.

[5] The transfer film according to any one of [1] to [4], in which a content of (D) the rosin compound is preferably 45% by mass or less of a solid content of the photosensitive transparent resin layer.

[6] The transfer film according to any one of [1] to [5], further comprising: a second transparent resin layer on the photosensitive transparent resin layer, in which a refractive index of the second transparent resin layer is preferably higher than a refractive index of the photosensitive transparent resin layer.

[7] The transfer film according to any one of [1] to [6], in which a thickness of the photosensitive transparent resin layer is preferably 20 μm or less.

[8] The transfer film according to any one of [1] to [7], in which the transfer film is preferably used for an electrode protective film for an electrostatic capacitance-type input device.

[9] An electrode protective film for an electrostatic capacitance-type input device which is obtained by peeling off the temporary support from the transfer film according to any one of [1] to [8].

[10] A laminate which is formed by using the transfer film according to any one of [1] to [8] and transferring the photosensitive transparent resin layer in the transfer film onto a substrate including an electrode of an electrostatic capacitance-type input device.

[11] A laminate comprising: a substrate including an electrode of an electrostatic capacitance-type input device; and a photosensitive transparent resin layer located on the substrate, in which the photosensitive transparent resin layer includes (A) a binder polymer, (B) a photopolymerizable compound having an ethylenic unsaturated group, (C) a photopolymerization initiator, and (D) a rosin compound.

[12] The laminate according to [10] or [11], in which the electrode of the electrostatic capacitance-type input device is preferably a transparent electrode pattern.

[13] The laminate according to any one of [10] to [12], in which a thickness of the photosensitive transparent resin layer is preferably 20 μm or less.

[14] A method for manufacturing a laminate, comprising: a step of using the transfer film according to any one of [1] to [8] and transferring the photosensitive transparent resin layer in the transfer film onto a substrate including an electrode of an electrostatic capacitance-type input device.

[15] The method for manufacturing a laminate according to [14], in which the substrate is preferably a transparent film substrate.

[16] A laminate which is manufactured by the method for manufacturing a laminate according to [14] or [15].

[17] An electrostatic capacitance-type input device comprising: the laminate according to any one of [10] to [13] and [16].

According to the present invention, it is possible to provide a transfer film which can be used to form electrode protective films for electrostatic capacitance-type input devices which have a low moisture permeability and are excellent in terms of heat and moisture resistance after the supply of saline water.

In addition, it is possible to provide an electrode protective film for an electrostatic capacitance-type input device and a laminate, for which the transfer film is used, a method for manufacturing the laminate, and an electrostatic capacitance-type input device including the laminate.

BRIEF DESCRIPTION OF THE DRAWINGS

FIG. 14 is a schematic view illustrating an example of a state in which the transfer film of the present invention having the photosensitive transparent resin layer and a second transparent resin layer is laminated on the transparent electrode pattern in the electrostatic capacitance-type input device by means of lamination and is yet to be cured by means of exposure or the like.

DESCRIPTION OF THE PREFERRED EMBODIMENTS

Figure 1:
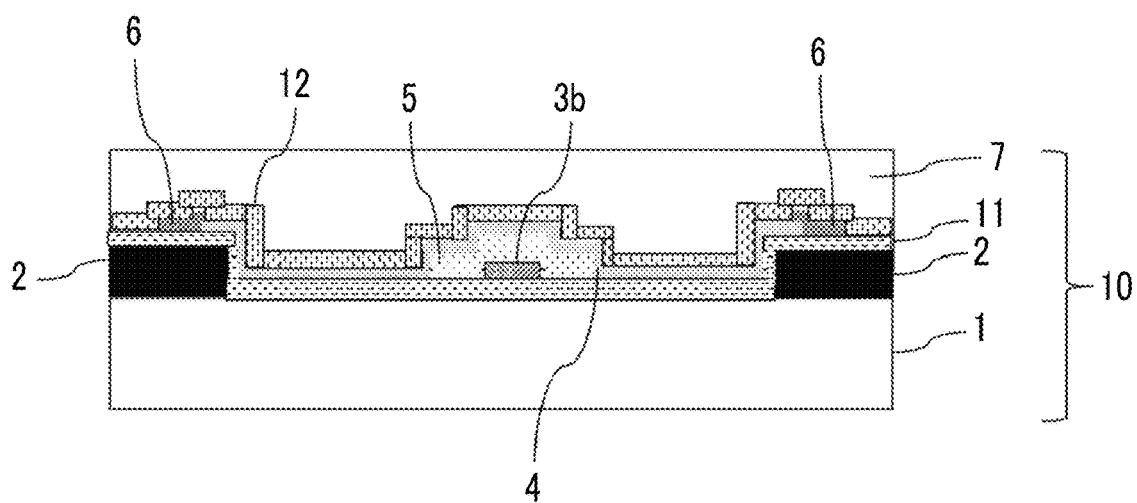
FIG. 1 is a schematic cross-sectional view illustrating an example of a constitution of an electrostatic capacitance-type input device of the present invention.

Hereinafter, a transfer film, an electrode protective film for an electrostatic capacitance-type input device, a laminate, a method for manufacturing a laminate, and an electrostatic capacitance-type input device of the present invention will be described. Hereinafter, there are cases in which constituent requirements will be described on the basis of typical embodiments or specific examples of the present invention, but the present invention is not limited to the embodiments or the specific examples. Meanwhile, in the present specification, numerical ranges expressed using "to" include numerical values before and after "to" as the lower limit value and the upper limit value. "(Meth)acryl" refers to both "methacryl" and "acryl", which is also true in other "(meth)" cases.

Unless particularly otherwise described, refractive indexes in the present specification refer to refractive indexes at a wavelength of 550 nm.

Meanwhile, being transparent in the present specification means that the average transmittance of visible light having a wavelength of 400 nm to 700 nm is 80% or more. Therefore, transparent layers refer to layers having an average transmittance of visible light having a wavelength of 400 nm to 700 nm of 80% or more. The average transmittance of visible light having a wavelength of 400 nm to 700 nm of a transparent layer is preferably 90% or more.

The average transmittance of visible light having a wavelength of 400 nm to 700 nm of the transfer film of the present invention or transparent layers in the transfer film is measured using a spectrophotometer U-3310 manufactured by Hitachi, Ltd.

[Transfer Film]

A transfer film of the present invention is a transfer film having a temporary support and a photosensitive transparent resin layer located on the temporary support, and the photosensitive transparent resin layer includes (A) a binder polymer, (B) a photopolymerizable compound having an ethylenic unsaturated group, (C) a photopolymerization initiator, and (D) a rosin compound.

In a case in which the above-described constitution is provided, it is possible to form electrode protective films for electrostatic capacitance-type input devices which have a low moisture permeability and are excellent in terms of the heat and moisture resistance after the supply of saline water.

Although not confined to any theories, the addition of the rosin compound enables a decrease in the moisture permeability and makes it difficult for saline water to pass through the photosensitive transparent resin layer. Both effects are assumed to result from the fact that the hydrophobic rosin compound blocks water passages in the film for which the photosensitive transparent resin layer is used.

Hereinafter, a preferred aspect of the transfer film of the present invention will be described.

<Moisture Permeability>

The moisture permeability of a measurement sample obtained by laminating five transfer films is preferably less than 500 $g/m^2/day$ ($g/m^2/24$ hours), more preferably less than 400 $g/m^2/day$ ($g/m^2/24$ hours), particularly preferably less than 300 $g/m^2/day$ ($g/m^2/24$ hours), and particularly preferably less than 250 $g/m^2/day$ ($g/m^2/24$ hours).

<Temporary Support>

The temporary support that is used in the transfer film is not particularly limited.

(Thickness)

The thickness of the temporary support is not particularly limited, but is generally in a range of 5 to 200 μm and particularly preferably in a range of 10 to 150 μm from the viewpoint of ease of handling, versatility, and the like.

(Material)

The temporary support is preferably a film and more preferably a resin film.

As the film that is used as the temporary support, it is possible to use flexible materials that do not significantly deform, contract, or extend under pressurization or under pressurization and heating. Examples of the temporary support satisfying the above-described property include polyethylene terephthalate films, triacetylcellulose films, polystyrene films, polycarbonate films, and the like, and, among these, biaxially-stretched polyethylene terephthalate films are particularly preferred.

In addition, the temporary support may be transparent and may contain dyed silicon, an alumina sol, a chromium salt, a zirconium salt, or the like.

In addition, the temporary support can be imparted with a conductive property using the method described in JP2005-221726A.

<Constitution of Photosensitive Transparent Resin Layer>

The photosensitive transparent resin layer may be photocurable or thermocurable and photocurable. Among these, the photosensitive transparent resin layer and a second transparent resin layer described below are preferably thermocurable transparent resin layers and photocurable transparent resin layers since it is easy to produce films by transferring and then photocuring the layers and it is possible to impart the reliability of the layers and the heat and moisture resistance after the supply of saline water by thermally curing the layers after the production of the films.

Meanwhile, in the present specification, for the convenience of description, in a case in which the photosensitive transparent resin layer and the second transparent resin layer in the transfer film of the present invention are transferred onto a transparent electrode pattern, are photocured, and thus become no longer photocurable, these layers will be continuously termed as the photosensitive transparent resin layer and the second transparent resin layer respectively regardless of whether or not the layers are thermocurable. Furthermore, there are cases in which these layers are photocured and then thermocured; however, even in these cases, these layers will be continuously termed as the photosensitive transparent resin layer and the second transparent resin layer respectively regardless of whether or not the layers are curable. Similarly, in a case in which the photosensitive resin layer and the second transparent resin layer of the transfer film of the present invention are transferred onto a transparent electrode pattern, and the layers are thermally cured and then lose the thermocurable property, these layers will be continuously referred to as the photosensitive transparent resin layer and the second transparent resin layer regardless of whether or not the layers are photocurable.

The photosensitive transparent resin layer is preferably alkali-soluble. The resin layer being alkali-soluble means that the resin layer dissolves in a weak alkaline aqueous solution, and the resin layer can be preferably developed with a weak alkaline aqueous solution.

(Thickness)

In the transfer film of the present invention, the thickness of the photosensitive transparent resin layer is preferably 20 μm or less since it is possible to decrease the thickness of the electrode protective film which leads to the thickness reduction of electrostatic capacitance-type input devices and improves development residues. The photosensitive transparent resin layer is preferably used for image-displaying portions in electrostatic capacitance-type input devices. In such a case, high transparency and an increase in transmittance are important, and in a case in which the thickness of the photosensitive transparent resin layer is sufficiently thin, the transmittance does not easily decrease due to the absorption by the photosensitive transparent resin layer, and light having a short wavelength is not easily absorbed, which suppresses image-displaying portions being colored to yellow.

The thickness of the photosensitive transparent resin layer is more preferably 1 to 20 μm, particularly preferably 2 to 16 μm, and more particularly preferably 2 to 12 μm. In a case in which the thickness of the photosensitive transparent resin layer is sufficiently thin, it is possible to decrease the moisture permeability of the photosensitive transparent resin layer after transferring (particularly, after exposure, development, and heating) and improve the heat and moisture resistance after the supply of saline water.

The thickness of the photosensitive transparent resin layer is obtained using a method described in the section of examples below.

(Refractive Index)

In the transfer film of the present invention, the refractive index of the photosensitive transparent resin layer is preferably 1.50 to 1.53 and more preferably 1.50 to 1.52.

(Composition)

In the transfer film of the present invention, the photosensitive transparent resin layer may be a negative-type material or a positive-type material.

The photosensitive transparent resin layer in the transfer film of the present invention is preferably a negative-type material.

A method for controlling the refractive index of the photosensitive transparent resin layer is not particularly limited, and it is possible to singly use a photosensitive transparent resin layer having a desired refractive index, use a photosensitive transparent resin layer to which particles such as metal particles or metal oxide particles are added, or use a complex of a metal salt and a macromolecule.

Furthermore, in the photosensitive transparent resin layer, additives may also be used. Examples of the additives include the surfactants described in Paragraph 0017 of JP4502784B and Paragraphs 0060 to 0071 of JP2009-237362A, well-known fluorine-based surfactants, the thermal polymerization inhibitors described in Paragraph 0018 of JP4502784B, and furthermore, other additives described in Paragraphs 0058 to 0071 of JP2000-310706A. Examples of additives that are preferably used in the photosensitive transparent resin layer include MEGAFACE F-551 (manufactured by DIC Corporation) which is a well-known fluorine-based surfactant.

Hitherto, a case in which the photosensitive transparent resin layer in the transfer film of the present invention is a negative-type material has been mainly described, but the photosensitive transparent resin layer in the transfer film of the present invention may also be a positive-type material.

—(A) Binder Polymer—

In the transfer film of the present invention, the photosensitive transparent resin layer preferably includes (A) a binder polymer.

The binder polymer in the photosensitive transparent resin layer is preferably an acrylic resin.

The binder polymer included in the photosensitive transparent resin layer is preferably an acrylic resin. Both the binder polymer included in the photosensitive transparent resin layer and a binder polymer included in the second transparent resin layer more preferably contain an acrylic resin from the viewpoint of enhancing the interlayer adhesion before and after the transfer of the photosensitive transparent resin layer and the second transparent resin layer.

A preferred range of the binder polymer that is used in the photosensitive transparent resin layer will be specifically described.

In the transfer film of the present invention, the binder polymer in the photosensitive transparent resin layer is preferably an alkali-soluble resin, more preferably a resin having a polar group, and particularly preferably a resin having an acidic group. It is assumed that, in a case of being jointly used with (E) a compound capable of reacting with acids by heating described below, the resin having an acidic group is thermally crosslinked, and consequently, the three-dimensional crosslinking density increases, which contributes to the improvement of the heat and moisture resistance after the supply of saline water.

In a case in which the binder polymer is a resin having an acidic group, the acid value of the binder polymer is not particularly limited, but is preferably 60 mgKOH/g or more, more preferably 60 to 200 mgKOH/g, particularly preferably 60 to 180 mgKOH/g, and more particularly preferably 70 to 150 mgKOH/g.

As the acid value of the binder polymer in the present invention, the value of a theoretical acid value computed using the calculation method described in the following documents and the like is used: [0063] of JP2004-149806A and [0070] of JP2012-211228A.

The binder polymer that is a resin having an acidic group, which is used in the photosensitive transparent resin layer, (also referred to as "binder" or "polymer") is not particularly limited within the scope of the gist of the present invention and can be appropriately selected from well-known binder polymers. The polymers described in Paragraph 0025 of JP2011-95716A (among these, the binder polymer which is a carboxy group-containing acrylic resin having an acid value of 60 mgKOH/g or more is preferred) and the polymers described in Paragraphs 0033 to 0052 of JP2010-237589A (among these, the binder polymer which is a carboxy group-containing acrylic resin having an acid value of 60 mgKOH/g or more is preferred) are preferably used. In addition, the binder polymer that is a resin having an acidic group is particularly preferably Compound G which is used in examples described below. Compound G is a carboxy group-containing acrylic resin having an acid value of 60 mgKOH/g or more.

In addition, the photosensitive transparent resin layer may also include a binder polymer formed of a polymer latex as the binder polymer. The polymer latex mentioned herein is a latex obtained by dispersing the particles of a water-insoluble polymer in water. The polymer latex is described in, for example, "Chemistry of high-molecular-weight latex (published by Kobunshi Kankokai (1973))" by Muroi Soichi.

Polymer particles that can be used are preferably polymer particles of a polymer such as an acrylic polymer, a vinyl acetate-based polymer, a rubber-based (for example, styrene-butadiene-based or chloroprene-based) polymer, an olefin-based polymer, a polyester-based polymer, a polyurethane-based polymer, a polystyrene-based polymer or a copolymer thereof.

The binder polymer formed of a polymer latex preferably strengthens the bonding forces between polymer chains constituting the polymer particles. Examples of means for strengthening the bonding forces between polymer chains include means of using interactions attributed to hydrogen bonds and means of generating covalent bonds.

Means of using interactions attributed to hydrogen bonding forces is preferably the introduction of monomers having a polar group into polymer chains by means of copolymerization or graft polymerization.

Examples of the polar group (preferably the acidic group) in the binder polymer include carboxy groups (included in acrylic acid, methacrylic acid, itaconic acid, fumaric acid, maleic acid, crotonic acid, partially-esterified maleic acid, and the like), primary, secondary, and tertiary amino groups, ammonium salt groups, sulfonic acid groups (styrenesulfonic acid and the like), and the like. The binder polymer preferably has at least a carboxy group as the polar group. It is assumed that, as a result of jointly using and thermally crosslinking the binder polymer having a carboxy group and (E) the compound capable of reacting with acids by heating, the three-dimensional crosslinking density increases, and additionally, the carboxy group in the binder polymer having a carboxy group loses water and is hydrophobilized, which contributes to the improvement of the heat and moisture resistance after the supply of saline water.

In the binder polymer, a preferred range of the copolymerization ratio of a constitutional unit derived from the above-described monomer having a polar group is in a range of 5% to 50% by mass, more preferably 5% to 40% by mass, and particularly preferably 20% to 30% by mass with respect to 100% by mass of the binder polymer.

Meanwhile, examples of means of generating covalent bonds include methods in which at least one of an epoxy compound, a blocked isocyanate, an isocyanate, a vinylsulfone compound, an aldehyde compound, a methylol compound, a carboxylic acid anhydride, and the like is reacted with at least one of a hydroxyl group, a carboxy group, a primary or secondary amino group, an acetoacetyl group, a sulfonic acid group, and the like.

The polymer latex that can be used in the present invention may be a polymer latex obtained by emulsification polymerization or a polymer latex obtained by emulsification. Methods for preparing the polymer latex are described in, for example, "Emulsion Latex Handbook" (edited by the emulsion latex handbook editorial committee, published by Taiseisha Ltd. (1975)).

Examples of the polymer latex that can be used in the present invention include polymer latexes obtained by ammonia-neutralizing and emulsifying alkyl acrylate copolymer-ammonium (trade name: JURYMER AT-210, manufactured by Toagosei Co., Ltd.), alkyl acrylate copolymer-ammonium (trade name: JURYMER ET-410, manufactured by Toagosei Co., Ltd.), alkyl acrylate copolymer-ammonium (trade name: JURYMER AT manufactured by Toagosei Co., Ltd.), or polyacrylic acid (trade name: JURYMER AC-10L, manufactured by Toagosei Co., Ltd.).

The photosensitive transparent resin layer may include additional binder polymers other than the resin having a polar group (acidic group).

As the additional binder polymers that are included in the photosensitive transparent resin layer, arbitrary polymer components can be used without any particular limitations, and, from the viewpoint of use as transparent protective films in electrostatic capacitance-type input devices, a binder polymer having high surface hardness and high heat resistance is preferred, and an alkali-soluble resin is more preferred. Examples of the alkali-soluble resin which is the additional binder polymer other than the resin having a polar group (acidic group) include well-known photosensitive siloxane resin materials and the like.

The weight-average molecular weight of the binder polymer is preferably 5,000 or more and more preferably 8,000 to 100,000.

—(B) Photopolymerizable Compound—

In the transfer film of the present invention, the photosensitive transparent resin layer preferably includes (B) a photopolymerizable compound having an ethylenic unsaturated group. The photopolymerizable compound having an ethylenic unsaturated group needs to have at least one ethylenic unsaturated group as the photopolymerizable group and may also have an epoxy group or the like in addition to the ethylenic unsaturated group. As the photopolymerizable compound in the photosensitive transparent resin layer, a compound having a (meth)acryloyl group is more preferably included.

The photopolymerizable compound that is used in the transfer film may be used singly or two or more photopolymerizable compounds may be used in combination, but two or more photopolymerizable compounds are preferably used in combination from the viewpoint of improving the heat and moisture resistance after the supply of saline water after the exposure of the transferred photosensitive transparent resin layer. As the photopolymerizable compound that is used in the transfer film of the present invention, a tri- or higher-functional photopolymerizable compound and a difunctional photopolymerizable compound are preferably used in combination from the viewpoint of improving the heat and moisture resistance after the supply of saline water after the exposure of the transferred photosensitive transparent resin layer. The content of the difunctional photopolymerizable compound being used is preferably in a range of 10% to 90% by mass, more preferably in a range of 20% to 85% by mass, and particularly preferably in a range of 30% to 80% by mass of all of the photopolymerizable compounds. The content of the tri- or higher-functional photopolymerizable compound being used is preferably in a range of 10% to 90% by mass, more preferably in a range of 15% to 80% by mass, and particularly preferably in a range of 20% to 70% by mass of all of the photopolymerizable compounds. The transfer film preferably includes, as the photopolymerizable compounds, at least a compound having two ethylenic unsaturated groups and a compound having at least three ethylenic unsaturated groups and more preferably includes at least a compound having two (meth)acryloyl groups and a compound having at least three (meth)acryloyl groups.

In addition, in the transfer film, at least one photopolymerizable compound having an ethylenic unsaturated group preferably contains a carboxy group since it is possible to further improve the heat and moisture resistance after the supply of saline water due to a carboxylic acid anhydride being formed by the carboxy group in the binder polymer and the carboxy group in the photopolymerizable compound having an ethylenic unsaturated group. The photopolymerizable compound having an ethylenic unsaturated group which contains a carboxy group is not particularly limited, and commercially available compounds can be used. For example, ARONIX TO-2349 (manufactured by Toagosei Co., Ltd.), ARONIX M-520 (manufactured by Toagosei Co., Ltd.), ARONIX M-510 (manufactured by Toagosei Co., Ltd.), and the like can be preferably used. The content of the photopolymerizable compound having an ethylenic unsaturated group which contains a carboxy group being used is preferably in a range of 1% to 50% by mass, more preferably in a range of 1% to 30% by mass, and particularly preferably in a range of 5% to 15% by mass of all of the photopolymerizable compounds.

The photosensitive transparent resin layer preferably includes, as the photopolymerizable compound, an urethane (meth)acrylate compound. The amount of the urethane (meth)acrylate compound mixed is preferably 10% by mass or more and more preferably 20% by mass or more of all of the photopolymerizable compounds. In the urethane (meth) acrylate compound, the number of functional groups in the photopolymerizable groups, that is, the number of (meth) acryloyl groups is preferably three or more and more preferably four or more.

Photopolymerizable compounds having a difunctional ethylenic unsaturated group are not particularly limited as long as the compounds have two ethylenic unsaturated groups in the molecule, and commercially available (meth) acrylate compounds can be used. For example, it is possible to preferably use tricyclodecane dimethanol diacrylate (A-DCP, manufactured by Shin-Nakamura Chemical Co., Ltd.), tricyclodecane dimethanol dimethacrylate (DCP, manufactured by Shin-Nakamura Chemical Co., Ltd.), 1,9-nonanediol diacrylate (A-NOD-N, manufactured by Shin-Nakamura Chemical Co., Ltd.), 1,6-hexanediol diacrylate (A-HD-N, manufactured by Shin-Nakamura Chemical Co., Ltd.), and the like.

Photopolymerizable compounds having a tri- or higher-functional ethylenic unsaturated group is not particularly limited as long as the compounds have three or more ethylenic unsaturated groups in the molecule, and, for example, it is possible to use (meth)acrylate compounds having a skeleton such as dipentaerythritol (triketra/penta/hexa)acrylates, pentaerythritol (tri/tetra)acrylates, trimethylolpropane triacrylate, ditrimethylolpropane tetraacrylate (AD-TMP manufactured by Shin-Nakamura Chemical Co., Ltd.), or isocyanurate acrylate, and (meth)acrylate compounds having a long distance between (meth)acryloyl groups are preferred. Specifically, it is possible to preferably use caprolactone-modified compounds (KAYARAD DPCA manufactured by Nippon Kayaku Co., Ltd., A-9300-1CL manufactured by Shin-Nakamura Chemical Co., Ltd., and the like), alkylene oxide-modified compounds (KAYARAD RP-1040 manufactured by Nippon Kayaku Co., Ltd., ATM-35E and A-9300 manufactured by Shin-Nakamura Chemical Co., Ltd., EBECRYL 135), and the like of the above-described (meth)acrylate compounds having a skeleton such as dipentaerythritol (tri/tetra/penta/hexa)acrylates, pentaerythritol (tri/tetra)acrylates, trimethylolpropane triacrylate, ditrimethylolpropane tetraacrylate, and isocyanurate acrylate. In addition, it is preferable to use tri- or higher-functional urethane (meth)acrylates. As the tri- or higher-functional urethane (meth)acrylates, it is possible to preferably use 8UX-015A (manufactured by Taisei Fine Chemical Co., Ltd.), UA-32P (manufactured by Shin-Nakamura Chemical Co., Ltd.), UA-1100H (manufactured by Shin-Nakamura Chemical Co., Ltd.,), and the like.

The weight-average molecular weight of the photopolymerizable compound that is used in the transfer film is preferably 200 to 3,000, more preferably 250 to 2,600, and particularly preferably 280 to 2,200.

—(C) Photopolymerization Initiator—

In the transfer film of the present invention, the photosensitive transparent resin layer includes (C) a photopolymerization initiator. In a case in which the photosensitive transparent resin layer includes the photopolymerizable compound and the photopolymerization initiator, it is possible to facilitate the formation of patterns of the photosensitive transparent resin layer.

As the photopolymerization initiator that can be used in the photosensitive transparent resin layer, it is possible to use the photopolymerization initiators described in Paragraphs "0031" to "0042" of JP2011-95716A. For example, it is possible to preferably use 1,2-octane dione, 1-[4-(phenylthio)-, 2-(O-benzoyloxime)] (trade name: IRGACURE OXE-01, manufactured by BASF), additionally, ethanone, 1-[9-ethyl-6-(2-methylbenzoyl)-9H-carbazole-3-yl]-, 1-(O-acetyloxime) (trade name: IRGACURE OXE-02, manufactured by BASF), 2-(dimethylamino)-2-[(4-methylphenyl) methyl]-1-[4-(4-morpholinyl)phenyl]-1-butanone (trade name: IRGACURE 379EG, manufactured by BASF), 2-methyl-1-(4-methyl thiophenyl)-2-morpholino propan-1-one (trade name: IRGACURE 907, manufactured by BASF), 2-hydroxy-1-{4-[4-(2-hydroxy-2-methyl-propionyl)-benzyl]phenyl}-2-methyl-propan-1-one (trade name: IRGACURE 127, manufactured by BASF), 2-benzyl-2-dimethylamino-1-(4-morpholinophenyl)-butanone-1 (trade name: IRGACURE 369, manufactured by BASF), 2-hydroxy-2-methyl-1-phenyl-erypropan-1-one (trade name: IRGACURE 1173, manufactured by BASF), 1-hydroxy-cyclohexyl-phenyl-ketone (trade name: IRGACURE 184, manufactured by BASF), 2,2-dimethoxy-1,2-diphenyl ethan-1-one (trade name: IRGACURE 651, manufactured by BASF), oxime ester-based photopolymerization initiator (trade name: Lunar 6, manufactured by DKSH Japan K.K.), and the like.

The content of the photopolymerization initiator in the photosensitive transparent resin layer is preferably 1% by mass or more and more preferably 2% by mass or more of the photosensitive transparent resin layer. The content of the photopolymerization initiator in the photosensitive transparent resin layer is preferably 10% by mass or less and more preferably 5% by mass or less of the photosensitive transparent resin layer from the viewpoint of improving the patterning property of the laminate of the present invention.

—(D) Rosin Compound—

In the transfer film of the present invention, the photosensitive transparent resin layer includes (D) a rosin compound.

The rosin compound is not particularly limited, and well-known rosin compounds can be used.

In the transfer film of the present invention, (D) the rosin compound is preferably one or more kinds of rosin compounds selected from rosin, hydrogenated rosin (also referred to as hydrogenated rosin), acid-modified rosin, and esterified rosin (also referred to as rosin esters). In the transfer film of the present invention, (D) the rosin compound is more preferably rosin or hydrogenated rosin since the polarity is small, and thus the amount of the compound having a polar group in the photosensitive transparent resin layer can be decreased, and it is possible to form electrode protective films for electrostatic capacitance-type input devices which have a low moisture permeability and are excellent in terms of the heat and moisture resistance after the supply of saline water and particularly preferably hydrogenated rosin.

In the transfer film of the present invention, (D) the rosin compound preferably includes one or more kinds of compounds selected from abietic acid, an abietic acid derivative, palustric acid, a palustric acid derivative, isopimaric acid, and an isopimaric acid derivative.

The proportion of one or more kinds of compounds selected from abietic acid, an abietic acid derivative, palustric acid, a palustric acid derivative, isopimaric acid, and an isopimaric acid derivative is preferably 10% by mass or more and more preferably 20% by mass or more of all of the rosin compounds included in the photosensitive transparent resin layer.

Examples of the rosin include non-modified rosin such as tall oil rosin, gum rosin, and wood rosin including, as a main component, a resin acid such as abietic acid, levopimaric acid, palustric acid, isopimaric acid, neoabietic acid, dehydroabietic acid, or dihydroabietic acid.

The hydrogenated rosin refers to a substance obtained by hydrogenating rosin. Examples thereof include rosin including a high content (for example, 50% by mass or more) of a tetrahydro body such as tetrahydroabietic acid.

Examples of the acid-modified rosin include unsaturated acid-modified rosin to which an unsaturated acid such as maleic acid, fumaric acid, or acrylic acid is added by means of the Diels-Alder reaction, and more specific examples thereof include maleopimaric acid in which maleic acid is added to rosin, fumaropimaric acid in which fumaric acid is added, acrylopimaric acid in which acrylic acid is added, and the like.

Examples of the esterified rosin include glycerin esters obtained by causing an esterification reaction between an alkyl ester of rosin and glycerin of rosin, pentaerythritol esters obtained by esterifying rosin and pentaerythritol, and the like.

As the esterified rosin (rosin esters), commercially available products can also be used. Examples thereof include SUPER ESTER E-720, SUPER ESTER E-730-55, SUPER ESTER E-650, SUPER ESTER E-786-60, TAMANOL E-100, EMULSION AM-1002, EMULSION SE-50 (all are trade names, special rosin ester emulsions, manufactured by Arakawa Chemical Industries, Ltd.), SUPER ESTER L, SUPER ESTER A-18, SUPER ESTER A-75, SUPER ESTER A-100, SUPER ESTER A-115, SUPER ESTER A-125, SUPER ESTER T-125 (all are trade names, special rosin ester emulsions, manufactured by Arakawa Chemical Industries, Ltd.), and the like.

In addition, examples thereof include ESTER GUM AAG, ESTER GUM AAL, ESTER GUM A, ESTER GUM AAV, ESTER GUM 105, ESTER GUM HS, ESTER GUM AT, ESTER GUM H, ESTER GUM HP, ESTER GUM HD, PENSEL A, PENSEL AD, PENSEL AZ, PENSEL C, PENSEL D-125, PENSEL D-135, PENSEL D-160, and PENSEL KK (all are trade names, rosin ester-based resins, manufactured by Arakawa Chemical Industries, Ltd.).

Furthermore, other commercially available products of rosin compounds can also be used.

Examples of rosin derivatives manufactured by Arakawa Chemical Industries, Ltd. include RONDIS R, RONDIS K-25, RONDIS K-80, and RONDIS K-18.

Examples of colorless rosin derivatives manufactured by Arakawa Chemical Industries, Ltd. include PINECRYSTAL PR-580 (hydrogenated rosin), PINECRYSTAL KR-85, PINECRYSTAL KR-120, PINECRYSTAL KR-612, PINECRYSTAL KR-614, PINECRYSTAL KE-100 (esterified rosin), PINECRYSTAL KR-311, PINECRYSTAL KE-359, PINECRYSTAL KE-604 (acid-modified rosin), PINECRYSTAL 30PX, PINECRYSTAL D-6011, PINECRYSTAL D-6154, PINECRYSTAL D-6240, PINECRYSTAL KM-1500, and PINECRYSTAL KM-1550.

Examples of polymerized rosin manufactured by Arakawa Chemical Industries, Ltd. include ARDYME R-140 and ARDYME R-95.

Examples of hydrogenated rosin manufactured by Arakawa Chemical Industries, Ltd. include HYPALE CH.

Examples of rosin acrylates manufactured by Arakawa Chemical Industries, Ltd. include BEAMSET 101.

The acid value of the rosin compound is preferably 5 to 300 mgKOH/g and more preferably 50 to 250 mgKOH/g. In a case in which the acid value of the rosin compound is controlled in this range, the polarity is small, and thus the amount of compounds having a polarity in the photosensitive transparent resin layer can be decreased, it is possible to form electrode protective films for electrostatic capacitance-type input devices which have a low moisture permeability and are excellent in terms of the heat and moisture resistance after the supply of saline water, and it is possible to suppress the generation of alkali development residues.

Examples of the rosin compound having an acid value in the above-described range include the rosin or hydrogenated rosin that has been described above.

In addition, as the rosin compound, a rosin compound which is acid-modified and then hydrogenated may be used. In a case in which a hydrogenation treatment is carried out, the residual double bonds of the rosin compound are reduced in the photosensitive transparent resin layer, and it is possible to prevent the coloration of the transfer film.

The softening point of the rosin compound is preferably 20° C. to 170° C. and more preferably 30° C. to 150° C. In a case in which the softening point of the rosin compound is 30° C. or higher, the photosensitive transparent resin layer does not become too soft, and the stickiness is excellent. In a case in which the softening point is lower than 170° C., there is an advantage that the infusion of air bubbles during the transfer of films can be suppressed.

In the transfer film of the present invention, from the viewpoint of improving the stickiness, the content of (D) the rosin compound is preferably 45% by mass or less, more preferably less than 40% by mass, and particularly preferably less than 30% by mass of the solid content of the photosensitive transparent resin layer. Furthermore, from the viewpoint of decreasing the moisture permeability and improving the heat and moisture resistance after the supply of saline water, the content of (D) the rosin compound is preferably more than 2% by mass, more preferably more than 5% by mass, and particularly preferably more than 8% by mass of the solid content of the photosensitive transparent resin layer.

—(E) Compound Capable of Reacting with Acids by Heating—

In the transfer film, the photosensitive transparent resin layer preferably includes (E) a compound capable of reacting with acids by heating, and at least one of Condition 1 and Condition 2 is more preferably satisfied.

Condition 1: The photosensitive transparent resin layer includes (E) the compound capable of reacting with acids by heating, and (E) the compound capable of reacting with acids by heating has a hydrophilic group in the molecule.

Condition 2: The photosensitive transparent resin layer further includes (F) a compound having an ethylene oxide chain or a propylene oxide chain.

The present inventors studied a method for improving the heat and moisture resistance after the supply of saline water and consequently found that the use of a photosensitive transparent resin layer for which a binder polymer and a compound capable of reacting with acids by heating such as a blocked isocyanate or an epoxy compound are used is effective.

However, as a result of observing patterns obtained by exposing and developing the photosensitive transparent resin layer for which a compound capable of reacting with acids by heating such as a blocked isocyanate or an epoxy compound having a viscosity in a certain range is used, it was found that there are cases in which the compound remains as development residues in non-exposed portions. In a case in which development residues remain in non-exposed portions as described above, it was found that particulate foreign substances are observed during the combination into electrostatic capacitance-type input devices, and a so-called surface defect after development was caused. The problem of development residues generated in the presence of certain specific compounds is a new problem that has not been studied in the field of electrode protective films for electrostatic capacitance-type input devices and a problem caused for the first time in a case in which electrode protective films for electrostatic capacitance-type input devices are produced using photosensitive transparent resin layers for which a binder polymer and a compound capable of reacting with acids by heating are used.

Transfer films that can be used to form electrode protective films for electrostatic capacitance-type input devices being excellent in terms of both the heat and moisture resistance after the supply of saline water and developability including development residues as described above have not been known so far.

The use of the photosensitive transparent resin layer for which a binder polymer and a compound which has a hydrophilic group in the molecule and is capable of reacting with acids by heating are jointly used or the photosensitive transparent resin layer for which a binder polymer, a compound capable of reacting with acids, and a compound having a specific hydrophilic group are jointly used enables the formation of electrode protective films for electrostatic capacitance-type input devices being excellent in terms of both the heat and moisture resistance after the supply of saline water and development residues.

Although not confined to any theories, it is anticipated that, even in a case in which developability is enhanced using the binder polymer and the compound capable of reacting with acids by heating, according to the constitution of the present invention, in the photosensitive transparent resin layer that has been irradiated with light (ultraviolet rays) and heated, the photopolymerizable compound forms a crosslinking structure densely enough to sufficiently shield saline water, and it is assumed that the heat and moisture resistance after the supply of saline water after the exposure of the transferred photosensitive transparent resin layer can be improved.

Meanwhile, the present inventors found that the fact that a case in which, in a pattern of the transparent resin layer obtained by exposing and developing the photosensitive transparent resin layer for which the binder polymer and the compound capable of reacting with acids by heating are used, the compound remains as development residues in non-exposed portions indicates a case in which a compound which is highly lipophilic and capable of reacting acids by heating is used. Therefore, the fact that the compound capable of reacting acids by heating is highly lipophilic is assumed to be a cause of development residues after development. Therefore, it is anticipated that the photosensitive transparent resin layer being changed to be hydrophilic from lipophilic enables the suppression of the generation of development residues.

However, in a case in which the photosensitive transparent resin layer is changed to be hydrophilic without adding the compound capable of reacting with acids, it is anticipated that the heat and moisture resistance including the heat and moisture resistance after the supply of saline water degrades. In contrast, in a case in which a hydrophilic group is introduced into the compound capable of reacting with acids by heating or a compound having a specific hydrophilic group other than the compound capable of reacting with acids is added to the photosensitive transparent resin layer, due to the synergetic effect of the compound capable of reacting with acids by heating and the hydrophilic group, the generation of development residues can be suppressed without causing the degradation of the heat and moisture resistance after the supply of saline water.

Meanwhile, in a case in which the reaction percentage of the photopolymerizable compound in the photosensitive transparent resin layer is increased by increasing the light irradiation amount and thus the three-dimensional crosslinking density is increased, cured films significantly contract due to curing, and thus it can be considered that the adhesion between the transferred photosensitive transparent resin layer and a substrate may be impaired. According to a preferred aspect of the transfer film of the present invention, it is possible to form electrode protective films for electrostatic capacitance-type input devices being excellent in terms of both heat and moisture resistance after the supply of saline water and development residues without increasing the light irradiation amount, and thus the adhesion between the transferred photosensitive transparent resin layer and a substrate is also likely to be favorable.

The viscosity at 25° C. of (E) the compound capable of reacting with acids by heating is preferably 0.1 to 100 Pa·s and more preferably 2 to 60 Pa·s.

The viscosity at 25° C. of (E) the compound capable of reacting with acids by heating is preferably equal to or more than the lower limit value since the volatilization of this component during coating and drying or post baking is suppressed, and the reactivity of the component during heating is ensured.

The viscosity at 25° C. of (E) the compound capable of reacting with acids by heating is preferably equal to or less than the upper limit value since the fluidity of this component in films during post baking is ensured, and thus the reactivity of the component during heating is ensured.

In this viscosity range, (E) the compound capable of reacting with acids by heating does not easily remains on the substrate even after development and does not easily become development residues.

(E) The compound capable of reacting with acids by heating is not particularly limited within the scope of the gist of the present invention. The compound capable of reacting with acids by heating is preferably a compound having a higher reactive with acids after being heated to higher than 25° C. compared with the reactivity at 25° C. The compound capable of reacting with acids by heating is preferably a compound which has a group capable of reacting with acids that are temporarily inactivated by blocking agents and in which blocking agent-derived groups are dissociated at a predetermined dissociation temperature.

Examples of the compound capable of reacting with acids by heating include carboxylic acid compounds, alcohol compounds, amine compounds, blocked isocyanates, epoxy compounds, and the like, and the compound capable of reacting with acids by heating is preferably a blocked isocyanate or an epoxy compound.

In a case in which the transfer film satisfies Condition 1, (E) the compound capable of reacting with acids by heating preferably includes a hydrophilic group in the molecule.

The compound capable of reacting with acids by heating which has a hydrophilic group in the molecule is not particularly limited, and well-known compounds can be used. A method for preparing the compound capable of reacting with acids by heating which has a hydrophilic group in the molecule is not particularly limited, and the compound can be prepared by means of, for example, synthesis.

The compound capable of reacting with acids by heating which has a hydrophilic group in the molecule is preferably a blocked isocyanate having a hydrophilic group in the molecule. The detail of the compound capable of reacting with acids by heating which has a hydrophilic group in the molecule will be described in the section of a blocked isocyanate below.

—(E1) Blocked Isocyanate—

The blocked isocyanate refers to "a compound having a structure in which isocyanate groups in an isocyanate are protected (masked) with a blocking agent".

The initial glass transition temperature (Tg) of the blocked isocyanate is preferably −40° C. to 10° C. and more preferably −30° C. to 0° C.

The dissociation temperature of the blocked isocyanate is preferably 100° C. to 160° C. and more preferably 130° C. to 150° C.

In the present specification, the dissociation temperature of the blocked isocyanate refers to "the temperature of an endothermic peak generated by a deprotection reaction of the blocked isocyanate in the case of being measured by means of differential scanning calorimetry (DSC) using a differential scanning calorimeter (manufactured by Seiko Instruments Inc., DSC6200)".

Examples of the blocking agent having a dissociation temperature of 100° C. to 160° C. include pyrazole-based compounds (3,5-dimethylpyrazole, 3-methylpyrazole, 4-bromo-3,5-dimethylpyrazole, 4-nitro-3,5-dimethylpyrazole, and the like), active methylene-based compounds (malonic acid diesters (dimethyl malonate, diethyl malonate, n-butyl malonate, and di-2-ethylhexyl malonate) and the like), triazole-based compounds (1,2,4-triazole and the like), oxime-based compounds (compounds having a structure represented by —C(=N—OH)— in the molecule such as formaldoxime, acetoaldoxime, acetoxime, methyl ethyl ketoxime, and cyclohexanone oxime), and the like. Among these, oxime-based compounds and pyrazole-based compounds are preferred from the viewpoint of storage stability, and oxime-based compounds are more preferred.

In the transfer film of the present invention, the blocked isocyanate preferably has an isocyanurate structure from the viewpoint of the brittleness of films and the bonding force to the substrate. The blocked isocyanate having an isocyanurate structure can be prepared by, for example, turning hexamethylene diisocyanate into isocyanurate.

Among blocked isocyanates having an isocyanurate structure, compounds having an oxime structure for which an oxime-based compound is used as a blocking agent are more preferred than compounds not having an oxime structure since it is easy to set the dissociation temperature in a preferred range and decrease development residues.

In the blocked isocyanate, the number of blocked isocyanate groups per molecule is preferably 1 to 10, more preferably 2 to 6, and particularly preferably 3 or 4.

As the blocked isocyanate, the blocked isocyanate compounds described in 0074 to 0085 of JP2006-208824A may be used, the content of which is incorporated into the present specification.

Specific examples of the blocked isocyanate that is used in the transfer film of the present invention include the following compounds. However, the blocked isocyanate that is used in the present invention is not limited to the following specific examples.

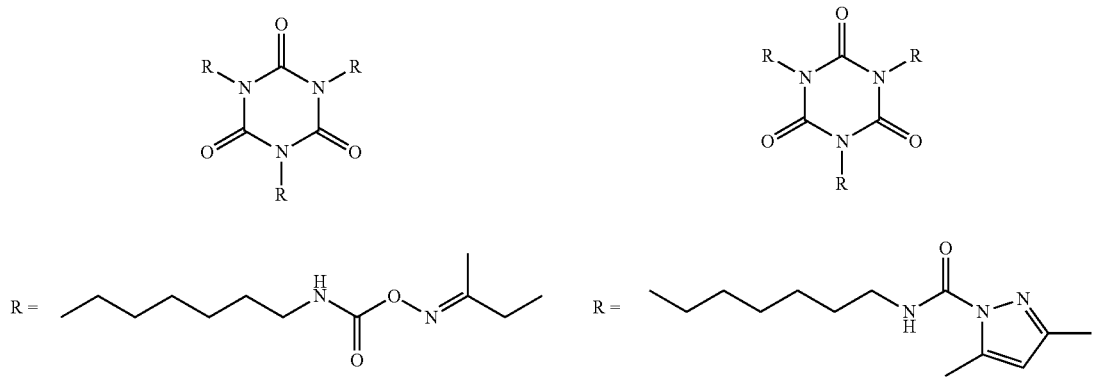

-continued

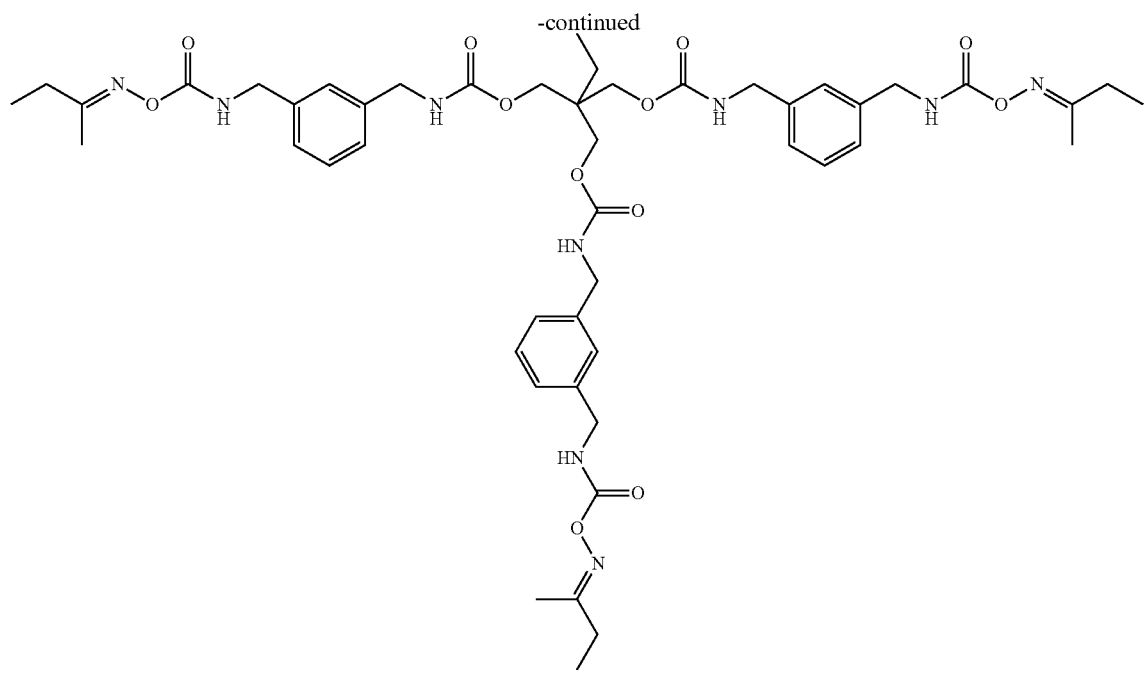

As the blocked isocyanate that is used in the transfer film, it is possible to use commercially available blocked isocyanates. Examples thereof include TAKENATE (registered trademark) B870N (manufactured by Mitsui Chemicals, Inc.) which is a methyl ethyl ketone oxime blocked body of isophorone diisocyanate, DURANATE (registered trademark) MF-K60B (manufactured by Asahi Kasei Corporation) which are hexamethylene diisocyanate-based blocked isocyanate compounds, and the like.

In the blocked isocyanate having a hydrophilic group in the molecule, at least some of isocyanate groups are preferably blocked isocyanates which are aqueous isocyanate groups to which a hydrophilic group is added. The blocked isocyanate having a hydrophilic group in the molecule can be obtained by reacting an isocyanate group in a polyisocyanate and a blocking agent (in some cases, also referred to as an amine compound). Examples of the reaction method include a method in which a hydrophilic group is added to some of isocyanate groups in a polyisocyanate by chemical reactions.

The hydrophilic group in the compound capable of reacting with acids by heating is not particularly limited, and specific examples thereof include nonionic hydrophilic groups, cationic hydrophilic groups, and the like.

The nonionic hydrophilic groups are not particularly limited, and specific examples thereof include compounds obtained by adding ethylene oxide or propylene oxide to hydroxyl groups of alcohols such as methanol, ethanol, butanol, ethylene glycol, or diethylene glycol. That is, the hydrophilic group in the compound capable of reacting with acids by heating which has the hydrophilic group in the molecule is preferably an ethylene oxide chain or a propylene oxide chain. These compounds have active hydrogen that reacts with isocyanate groups and thus can be added to isocyanate groups. Among these, monoalcohols that can be dispersed in water in a small amount used are preferred.

In addition, the addition number of ethylene oxide chains or propylene oxide chains is preferably 4 to 30 and more preferably 4 to 20. In a case in which the addition number is 4 or more, there is a tendency that the water dispersibility further improves. In addition, in a case in which the addition number is 30 or less, there is a tendency that the initial Tg of the obtained blocked isocyanate further improves.

Examples of a method for adding the cationic hydrophilic group include a method in which a compound having both the cationic hydrophilic group and active hydrogen that reacts with isocyanate groups is used; a method in which, for example, a functional group such as a glycidyl group is introduced in advance into a polyisocyanate and then, for example, a specific compound such as sulfide or phosphine is reacted with the functional group, and the like, and the former method is easy.

The active hydrogen that reacts with isocyanate groups is not particularly limited, and specific examples thereof include a hydroxyl group, a thiol group, and the like. The compound having both the cationic hydrophilic group and active hydrogen that reacts with isocyanate groups is not particularly limited, and specific examples thereof include dimethylethanolamine, diethylethanolamine, diethanolamine, methyl diethanolamine, and the like. Tertiary amino groups that are introduced using the above-described compound can also be quaternized using dimethyl sulfate, diethyl sulfate, or the like.

The equivalent ratio between the isocyanate group to which the hydrophilic group is added and the blocked isocyanate group is preferably 1:99 to 80:20, more preferably 2:98 to 50:50, and particularly preferably 5:95 to 30:70. The equivalent ratio is preferably set in the above-described range from the viewpoint of satisfying both the isocyanate reactivity and development residues.

As the blocked isocyanate having a hydrophilic group in the molecule and a method for synthesizing the blocked isocyanate, the aqueous blocked polyisocyanate described in 0010 to 0045 of JP2014-065833A can be preferably used, and the content of the publication is incorporated into the present specification by reference.

In a case in which the blocked isocyanate having a hydrophilic group in the molecule is synthesized, the addition reaction of a hydrophilic group or the blocking reaction of an isocyanate group can be caused in the presence of synthesis solvents. The synthesis solvents in this case preferably do not include any active hydrogen, and examples thereof include dipropylene glycol monomethyl ether, propylene glycol monomethyl ether acetate, methoxy propyl acetate, and the like.

In a case in which the blocked isocyanate having a hydrophilic group in the molecule is synthesized, the amount of the compound having a hydrophilic group added is preferably 1% to 100% by mass and more preferably 2% to 80% by mass of the polyisocyanate.

In a case in which the blocked isocyanate having a hydrophilic group in the molecule is synthesized, the amount of a blocking agent added is preferably 20% to 99% by mass and more preferably 10% to 100% by mass of the polyisocyanate.

The weight-average molecular weight of the blocked isocyanate that is used in the transfer film is preferably 200 to 3,000, more preferably 250 to 2,600, and particularly preferably 280 to 2,200.

——(E2) Epoxy Compound——

The epoxy compound is not particularly limited, and well-known compounds can be used.

As the epoxy compound, the compound described in [0096] to [0098] of JP2015-135396A can be preferably used, and the content of the publication is incorporated into the present specification by reference.

Examples of the epoxy compound include EPDX-MK R151 (manufactured by Printec Corporation) and the like.

The content of the epoxy compound is preferably 5% to 50% by mass and more preferably 5% to 30% by mass of the photosensitive transparent resin layer.

(F) Compound Having Ethylene Oxide Chain or Propylene Oxide Chain

In a case in which the transfer film satisfies the condition 2, the photosensitive transparent resin layer preferably further includes (F) a compound having an ethylene oxide chain or a propylene oxide chain.

The compound having an ethylene oxide chain or a propylene oxide chain is not particularly limited, and well-known compounds can be used.

The compound having an ethylene oxide chain or a propylene oxide chain is preferably a nonionic surfactant. As the compound having an ethylene oxide chain or a propylene oxide chain which is a nonionic surfactant, the compounds described in [0021] to [0026] of WO2011/052620A can be preferably used, and the content of the publication is incorporated into the present specification by reference.

Examples of the compound having an ethylene oxide chain or a propylene oxide chain include EMULGEN B-66, EMULGEN A-90 (manufactured by Kao Corporation) and the like.

The content of the compound having an ethylene oxide chain or a propylene oxide chain is preferably 0.1% to 10% by mass, more preferably 0.3% to 8% by mass, and particularly preferably 0.5% to 5% by mass of the photosensitive transparent resin layer.

—Metal Oxide Particles—

The photosensitive transparent resin layer may include particles (preferably metal oxide particles) for the purpose of adjusting the refractive index or the light-transmitting property, but preferably does not include particles. In order to control the refractive index of the photosensitive transparent resin layer in the above-described range, it is possible to add metal oxide particles in an arbitrary ratio depending on the kind of polymers or the polymerizable compound being used. In the photosensitive transparent resin layer, the content of the metal oxide particles is preferably 0% to 35% by mass, more preferably 0% to 10% by mass, and particularly preferably 0% by mass of the photosensitive transparent resin layer. The photosensitive transparent resin layer preferably includes no metal oxide particles, but the photosensitive transparent resin layer including metal oxide particles is also included in the scope of the present invention.

A method for measuring the content of the metal oxide particles in the photosensitive transparent resin layer and the second transparent resin layer in a laminate of the present invention is as described below.

A cross section of the laminate is cut and then observed using a transmission electron microscope (TEM). The ratio of the occupancy area of the metal oxide particles to the film cross-sectional area of the photosensitive transparent resin layer (or the second transparent resin layer) is measured at three arbitrary places in the layer, and the average value thereof is considered as the volume fraction (VR).

The volume fraction (VR) is converted using the following expression, thereby computing the weight fraction (WR) of the metal oxide particles in the photosensitive transparent resin layer (or the second transparent resin layer).

$$WR = D*VR/(1.1*(1-VR)+D*VR)$$

D: The specific weight of the metal oxide particles

The ratios can be computed with D that is 4.0 in a case in which the metal oxide particles are titanium oxide or 6.0 in a case in which the metal oxide particles are zirconium oxide.

The refractive index of the metal oxide particles is preferably higher than the refractive index of the photosensitive transparent resin layer not including the metal oxide particles. That is, the metal oxide particles preferably have a refractive index higher than the refractive indexes of compositions made of materials obtained by excluding these particles from the photosensitive transparent resin layer.

Meanwhile, the metal of the above-described metal oxide particles may also be a semi-metal such as B, Si, Ge, As, Sb, or Te.

The metal oxide particles which are light-transmissible and have a high refractive index are preferably oxide particles including atoms such as Be, Mg, Ca, Sr, Ba, Sc, Y, La, Ce, Gd, Tb, Dy, Yb, Lu, Ti, Zr, Hf, Nb, Mo, W, Zn, B, Al, Si, Ge, Sn, Pb, Sb, Bi, and Te, more preferably titanium oxide, titanium complex oxide, zinc oxide, zirconium oxide, indium/tin oxide, or antimony/tin oxide, particularly preferably titanium oxide, titanium complex oxide, or zirconium oxide, more particularly preferably titanium oxide or zirconium oxide, and most preferably titanium oxide. Particularly, titanium oxide is preferably rutile-type titanium oxide having a high refractive index. The surfaces of these metal oxide particles can also be treated with an organic material in order to impart dispersion stability.

From the viewpoint of the transparency of the photosensitive transparent resin layer, the average primary particle diameter of the metal oxide particles is preferably 1 to 200 nm and more preferably 3 to 80 nm. Here, the average primary particle diameter of particles refers to the arithmetic average of the diameters of 200 arbitrary particles measured using an electronic microscope. In addition, in a case in which the shapes of particles are not spherical, the longest sides are considered as the diameters.

In addition, one kind of the metal oxide particles may be used or two or more kinds of the metal oxide particles can be jointly used.

<Constitution of Second Transparent Resin Layer>

The transfer film of the present invention preferably has the second transparent resin layer on the photosensitive transparent resin layer and more preferably has the second transparent resin layer located adjacent to the photosensitive transparent resin layer.

The second transparent resin layer is preferably a curable transparent resin layer.

In a case in which the second transparent resin layer is a curable transparent resin layer, the second transparent resin layer may be thermocurable, photocurable, or thermocurable and photocurable. Among these, the second transparent resin layer is preferably at least a thermocurable transparent resin layer since reliability and heat and moisture resistance can be imparted to films by means of thermal curing after transfer and more preferably a thermocurable transparent resin layer and a photocurable transparent resin layer since it is easy to form films by photocuring the layer after transfer and reliability and heat and moisture resistance can be imparted to films by means of thermal curing after the formation of films.

The second transparent resin layer is preferably alkali-soluble.

(Refractive Index)

The transfer film of the present invention preferably has the second transparent resin layer on the photosensitive transparent resin layer, and the refractive index of the second transparent resin layer is more preferably higher than the refractive index of the photosensitive transparent resin layer.

In a case in which the refractive index difference between a transparent electrode pattern (preferably ITO; indium tin oxide) and the second transparent resin layer and the refractive index difference between the second transparent resin layer and the photosensitive transparent resin layer are decreased, the formation of the second transparent resin layer and the photosensitive transparent resin layer on the viewer side of the transparent electrode pattern alleviates light reflection and makes the transparent electrode pattern barely visible, and thus it is possible to improve the transparent electrode pattern-masking property. Using a transfer film on which the second transparent resin layer which is a high-refractive index layer is laminated, it is possible to produce protective films through which the transparent electrode pattern does not easily become visible (is not easily shown) in a first transferring process. In addition, even in a case in which the photosensitive transparent resin layer is laminated and then the second transparent resin layer is laminated without curing the photosensitive transparent resin layer, the photosensitive transparent resin layer and the second transparent resin layer are favorably differentiated from each other, and thus the transparent electrode pattern-masking property can be improved with the above-described mechanism. In a case in which the photosensitive transparent resin layer and the second transparent resin layer are curable transparent resin layers, after the photosensitive transparent resin layer and the second transparent resin layer are further transferred from the transfer film onto the transparent electrode pattern, it is possible to develop refractive index-adjusting layers in desired patterns by means of photolithography. Meanwhile, in a case in which the layer differentiation between the photosensitive transparent resin layer and the second transparent resin layer is favorable, the refractive index adjustment effect attributed to the above-described mechanism is likely to be sufficient, and the improvement of the transparent electrode pattern-masking property is likely to be sufficient.

The refractive index of the second transparent resin layer is preferably 1.60 or higher.

Meanwhile, the refractive index of the second transparent resin layer needs to be adjusted using the refractive index of the transparent electrode pattern, and the upper limit value of the value is not particularly limited, but is preferably 2.10 or lower and more preferably 1.78 or lower, and may be 1.74 or lower.

Particularly, in a case in which the refractive index of the transparent electrode exceeds 2.00 as in the case of an oxide of In and Zn (IZO), the refractive index of the second transparent resin layer is preferably 1.70 or higher and 1.85 or lower.

(Thickness)

The thickness of the second transparent resin layer is preferably 500 nm or less and is more preferably 110 nm or less. The thickness of the second transparent resin layer is preferably 20 nm or more. The thickness of the second transparent resin layer is particularly preferably 55 to 100 nm, more particularly preferably 60 to 100 nm, and still more particularly preferably 70 to 100 nm.

The thickness of the second transparent resin layer is obtained using a method described in the section of the examples described below.

(Composition)

The second transparent resin layer may be a negative-type material or a positive-type material.

In a case in which the second transparent resin layer is a negative-type material, the second transparent resin layer preferably includes a binder polymer (preferably an alkali-soluble resin), a polymerizable compound, and a photopolymerization initiator. In the transfer film of the present invention, the second transparent resin layer more preferably includes a binder polymer, a photopolymerizable compound, and a photopolymerization initiator. The second transparent resin layer particularly preferably includes metal oxide particles. Furthermore, additives and the like can be used, but the components are not limited thereto.

A method for controlling the refractive index of the second transparent resin layer is not particularly limited, and it is possible to singly use the second transparent resin layer having a desired refractive index, use the second transparent resin layer to which particles such as metal particles or metal oxide particles are added, or use a complex of a metal salt and a macromolecule.

Furthermore, in the second transparent resin layer, additives may also be used. Examples of the additives include the surfactants described in Paragraph 0017 in the specification of JP4502784B and Paragraphs 0060 to 0071 of JP2009-237362A, the thermal polymerization inhibitors described in Paragraph 0018 in the specification of JP4502784B, and, furthermore, other additives described in Paragraphs 0058 to 0071 of JP2000-310706A. Examples of the additives that are preferably used in the second transparent resin layer include MEGAFACE F-444 (manufactured by DIC Corporation) which is a well-known fluorine-based surfactant.

Hitherto, a case in which the second transparent resin layer in the transfer film of the present invention is a negative-type material has been mainly described, but the second transparent resin layer in the transfer film of the present invention may be a positive-type material. In a case in which the second transparent resin layer in the transfer film of the present invention is a positive-type material, for example, the material and the like described in JP2005-221726A can be used in the second transparent resin layer, but the components are not limited thereto.

—Binder Polymer—

The second transparent resin layer preferably includes a binder polymer.

Examples of the binder polymer include resins having an acidic group and additional binder polymers having no acidic group.

——Resin Having Acidic Group——

The resin having an acidic group is preferably a resin having an acidic group and more preferably a resin having a monovalent acidic group (a carboxy group or the like). The binder polymer in the second transparent resin layer is particularly preferably a binder polymer having a carboxy group.

The resin which is used in the second transparent resin layer and is soluble in water-based solvents (preferably water or solvent mixtures of a lower alcohol having 1 to 3 carbon atoms and water) is not particularly limited within the scope of the gist of the present invention and can be appropriately selected from well-known resins.

The resin having an acidic group that is used in the second transparent resin layer is preferably an alkali-soluble resin. The alkali-soluble resin can be appropriately selected from alkali-soluble resins which are linear organic macromolecular polymers and have at least one group that accelerates alkali dissolution (that is, an acidic group: for example, a carboxy group, a phosphoric acid group, a sulfonic acid group, or the like) in a molecule (preferably a molecule having an acrylic copolymer or a styrene-based copolymer as the main chain). Among these, alkali-soluble resins which are soluble in organic solvents and can be developed using a weak alkaline aqueous solution are more preferred. The acidic group is preferably a carboxy group.

To the manufacturing of the alkali-soluble resin, it is possible to apply, for example, a method in which a well-known radical polymerization method is used. The polymerization conditions such as temperature, pressure, the kind and amount of radical initiators, and the kind of solvents in the case of manufacturing the alkali-soluble resin using a radical polymerization method can be easily set by persons skilled in the art, and the conditions can also be experimentally determined.

The linear organic macromolecular polymer is preferably a polymer having a carboxylic acid group in a side chain. For example, poly(meth)acrylates, methacrylic acid copolymers, acrylic acid copolymers, itaconic acid copolymers, crotonic acid copolymers, maleic acid copolymers such as styrene/maleic acid, partially-esterified maleic acid copolymers, and the like, which are respectively described in JP1984-44615A (JP-S59-44615A), JP1979-34327B (JP-S54-34327B), JP1983-12577B (JP-S58-12577B), JP1979-25957B (JP-S54-25957B), JP1984-53836A (JP-S59-53836A), JP1984-71048A (JP-S59-71048A), JP1971-2121A (JP-S46-2121A), and JP1981-40824B (JP-S56-40824B) and, furthermore, acidic cellulose derivatives having a carboxylic acid group in a side chain such as carboxyalkyl cellulose and carboxyalkyl starch, polymers obtained by adding an acid anhydride to a polymer having a hydroxyl group, and the like are preferred. Furthermore, macromolecular polymers having a reactive functional group such as a (meth)acryloyl group in the side chain are also preferred.

Among these, particularly, benzyl (meth)acrylate/(meth)acrylic acid copolymers and multicomponent copolymers made of benzyl (meth)acrylate/(meth)acrylic acid/other monomers are preferred.

Additionally, polymers obtained by copolymerizing 2-hydroxyethylmethacrylate are also useful. The amount of the polymer being mixed and used can be arbitrary.

Additionally, examples thereof include 2-hydroxypropyl (meth)acrylate/polystyrene macromonomer/benzyl methacrylate/methacrylic acid copolymers, 2-hydroxy-3-phenoxypropyl acrylate/polymethyl methacrylate macromonomer/benzyl methacrylate/methacrylic acid copolymers, 2-hydroxyethyl methacrylate/polystyrene macromonomer/methyl methacrylate/methacrylic acid copolymers, 2-hydroxyethyl methacrylate/polystyrene macromonomer/benzyl methacrylate/methacrylic acid copolymers, and the like which are described in JP1995-140654A (JP-H07-140654A).

Regarding the specific constitutional unit of the alkali-soluble resin, particularly, copolymers of (meth)acrylic acid and an additional monomer capable of being copolymerized with (meth)acrylic acid are preferred.

Examples of the additional monomer capable of being copolymerized with (meth)acrylic acid include alkyl (meth)acrylates, aryl (meth)acrylates, vinyl compounds, and the like. Here, hydrogen atoms in alkyl groups and aryl groups may be substituted with substituents.

Specific examples of alkyl (meth)acrylate and aryl (meth)acrylate include methyl (meth)acrylates, ethyl (meth)acrylates, propyl (meth)acrylates, butyl (meth)acrylates, isobutyl (meth)acrylates, pentyl (meth)acrylates, hexyl (meth)acrylates, octyl (meth)acrylates, phenyl (meth)acrylates, benzyl acrylates, tolyl acrylates, naphthyl acrylates, cyclohexyl acrylates, and the like.

In addition, examples of the vinyl compounds include styrene, α-methyl styrene, vinyl toluene, glycidyl methacrylate, acrylonitrile, vinyl acetate, N-vinyl pyrrolidone, tetrahydrofurfuryl methacrylate, polystyrene macromonomers, polymethyl methacrylate macromonomers, $CH_2=CR^1R^2$, $CH_2=C(R^1)(COOR^3)$, and the like. Here, $R^1$ represents a hydrogen atom or an alkyl group having 1 to 5 carbon atoms, $R^2$ represents an aromatic hydrocarbon ring having 6 to 10 carbon atoms, and $R^3$ represents an alkyl group having 1 to 8 carbon atoms or an aralkyl group having 6 to 12 carbon atoms.

The additional monomer capable of being copolymerized with (meth)acrylic acid can be used singly or a combination of two or more monomers capable of being copolymerized with (meth)acrylic acid can be used. A preferred additional monomer capable of being copolymerized with (meth)acrylic acid is at least one monomer selected from $CH_2=CR^1R^2$, $CH_2=C(R^1)(COOR^3)$, phenyl (meth)acrylates, benzyl (meth)acrylates, and styrene and particularly preferably $CH_2=CR^1R^2$ and/or $CH_2=C(R^1)(COOR^3)$.

Additionally, examples thereof include resins having an ethylenic unsaturated group introduced into a linear macromolecule which are obtained by reacting a (meth)acrylic compound having a reactive functional group, cinnamic acid, or the like with the linear macromolecule having a substituent capable of reacting with this reactive functional group. Examples of the reactive functional group include a hydroxyl group, a carboxy group, an amino group, and the like, and examples of the substituent capable of being reacted with this reactive functional group include an isocyanate group, an aldehyde group, an epoxy group, and the like.

Among these, the resin having an acidic group is preferably an acrylic resin having an acidic group, more preferably a copolymer resin of (meth)acrylic acid/vinyl compound, and particularly preferably a copolymer resin of (meth)acrylic acid/allyl (meth)acrylate. Meanwhile, in the present specification, acrylic resins refer to both methacrylic resins and acrylic resins, and, similarly, (meth)acrylic resins refers to methacrylic resins and acrylic resins.

The weight-average molecular weight of the resin having an acidic group is preferably 10,000 or more and more preferably 20,000 to 100,000.

——Additional Binder Polymers——

The additional binder polymers having no acidic groups which are used in the second transparent resin layer are not particularly limited, and the binder polymers that are used in the photosensitive transparent resin layer can be used.

—Polymerizable Compound—

The second transparent resin layer preferably includes a polymerizable compound such as a photopolymerizable compound or a thermopolymerizable compound from the viewpoint of increasing the strength or the like of films by being cured.

Examples of the polymerizable compound in the second transparent resin layer include monomers having an acidic group and polymerizable compounds other than the monomers having an acidic group.

The polymerizable compound in the second transparent resin layer preferably includes the photopolymerizable compounds other than the monomers having an acidic group and more preferably includes the monomers having an acidic group and the photopolymerizable compounds other than the monomers having an acidic group.

——Monomer Having Acidic Group——

As the monomer having an acidic group, it is possible to preferably use an acrylic monomer such as (meth)acrylic acid or a derivative thereof or the following monomer.

Examples thereof include tri- or tetrafunctional radical polymerizable monomers (monomers obtained by introducing a carboxylic acid group into a pentaerythritol tri- and tetraacrylate skeleton (acid value=80 to 120 mg-KOH/g)), penta- or hexafunctional radical polymerizable monomers (monomers obtained by introducing a carboxylic acid group into a dipentaerythritol penta- and hexaacrylate skeleton (acid value=25 to 70 mg-KOH/g)), and the like. Specific titles are not described, but difunctional alkali-soluble radical polymerizable monomers may also be used as necessary.

Additionally, it is possible to preferably use the monomers having an acidic group described in [0025] to [0030] of JP2004-239942A, the content of which is incorporated into the present specification.

In addition, as the monomer having an acidic group, among the polymerizable compounds exemplified as the polymerizable compound that is used in the photosensitive transparent resin layer, the monomers having an acidic group can also be preferably used.

Among these, as the monomer having an acidic group, polymerizable compounds containing a carboxy group are preferred, acrylic monomers such as (meth)acrylic acids or derivatives thereof can be more preferably used, and, among these, ARONIX TO-2349 (manufactured by Toagosei Co., Ltd.) is particularly preferred. Meanwhile, in the present specification, acrylic monomers refer to both methacrylic monomers and acrylic monomers.

——Other Polymerizable Compounds——

As other polymerizable compounds other than the monomer having an acidic group which are used in the second transparent resin layer, photopolymerizable compounds are preferred.

As the photopolymerizable compounds, it is possible to use the polymerizable compounds described in Paragraphs 0023 and 0024 of JP4098550B. Among these, pentaerythritol tetraacrylate, pentaerythritol triacrylate, and tetraacryltes of pentaerythritol ethylene oxide adducts can be preferably used. These polymerizable compounds may be used singly or a plurality of polymerizable compounds may be used in combination. In a case in which a mixture of pentaerythritol tetraacrylate and pentaerythritol triacrylate is used, the percentage of pentaerythritol triacrylate in terms of the mass ratio is preferably 0% to 80% by mass and more preferably 10% to 60% by mass of all of the mixture of pentaerythritol tetraacrylate and pentaerythritol triacrylate.

Specific examples of the photopolymerizable compound that is used in the second transparent resin layer include mixtures of a water-soluble polymerizable compound represented by Structural Formula 1 and pentaerythritol tetraacrylate (NK ester A-TMMT manufactured by Shin-Nakamura Chemical Co., Ltd., containing approximately 10% by mass of triacrylate as an impurity), mixtures of pentaerythritol tetraacrylate and triacrylate (NK ester A-TMM3LM-N manufactured by Shin-Nakamura Chemical Co., Ltd., 37% by mass of triacrylate), mixtures of pentaerythritol tetraacrylate and triacrylate (NK ester A-TMM-3L manufactured by Shin-Nakamura Chemical Co., Ltd., 55% by mass of triacrylate), mixtures of pentaerythritol tetraacrylate and triacrylate (NK ester A-TMM3 manufactured by Shin-Nakamura Chemical Co., Ltd., 57% by mass of triacrylate), tetraacrylates of a pentaerythritol ethylene oxide adduct (KAYARAD RP-1040 manufactured by Nippon Kayaku Co., Ltd.), ARONIX TO-2349 (manufactured by Toagosei Co., Ltd.), and the like.

As the photopolymerizable compound that is used in the second transparent resin layer, among these, it is possible to preferably use the water-soluble polymerizable compound represented by Structural Formula 1, a pentaerythritol tetraacrylate mixture (NK ester A-TMMT manufactured by Shin-Nakamura Chemical Co., Ltd.), a mixture of pentaerythritol tetraacrylate and triacrylate (NK ester A-TMM3LM-N manufactured by Shin-Nakamura Chemical Co., Ltd., 37% triacrylate), or a mixture of pentaerythritol tetraacrylate and triacrylate (NK ester A-TMM-3L manufactured by Shin-Nakamura Chemical Co., Ltd., 55% triacrylate) from the viewpoint of improving the reticulation of the transfer film.

Structural Formula I

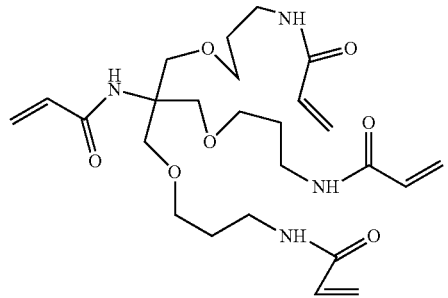

The other photopolymerizable compounds that are used in the second transparent resin layer are preferably soluble in water or solvent mixtures of a lower alcohol having 1 to 3 carbon atoms and water in a case in which an alcohol dispersion liquid of the metal oxide particles is jointly used in the resin composition that is used to form the second transparent resin layer. As the photopolymerizable compounds that are soluble in water or solvent mixtures of a lower alcohol having 1 to 3 carbon atoms and water, it is possible to use monomers having a hydroxyl group and monomers having an ethylene oxide or polypropylene oxide and a phosphoric acid group in the molecule. Meanwhile, the photopolymerizable compounds being soluble in solvent mixtures of a lower alcohol having 1 to 3 carbon atoms and water means that 0.1% by mass or more of the photopolymerizable compound dissolves in solvent mixtures of an alcohol and water.

In addition the content of the photopolymerizable compound is preferably 0% to 20% by mass, more preferably 0% to 10% by mass, and particularly preferably 0% to 5% by mass of the second transparent resin layer.

—Photopolymerization Initiator—

As the photopolymerization initiator which is used in the second transparent resin layer and is soluble in water or solvent mixtures of a lower alcohol having 1 to 3 carbon atoms and water, it is possible to use IRGACURE 2959 or an initiator of Structural Formula 2.

Structural Formula 2

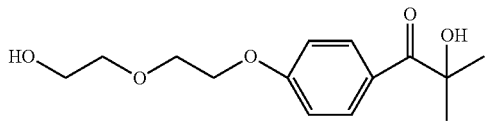

—Metal Oxide Particles—

The second transparent resin layer may not include particles (preferably metal oxide particles) for the purpose of adjusting the refractive index or the light transmittance, but preferably includes metal oxide particles. Among particles, the second transparent resin layer preferably includes metal oxide particles from the viewpoint of controlling the refractive index of the second transparent resin layer in the above-described range. To the second transparent resin layer, it is possible to add metal oxide particles in an arbitrary ratio depending on the kind of the polymer or the polymerizable compound being used. In the second transparent resin layer, the content of the metal oxide particles is preferably 40% to 95% by mass, more preferably 55% to 95% by mass, particularly preferably 62% to 90% by mass from the viewpoint of improving cracks in the transfer film, still more particularly preferably 62% to 75% by mass from the viewpoint of further improving cracks in the transfer film and improving the substrate adhesion of the laminate of the present invention, and more particularly preferably 62% to 70% by mass of the second transparent resin layer.

The refractive index of the metal oxide particles is preferably higher than the refractive index of the second transparent resin layer not including the metal oxide particles. That is, the metal oxide particles are preferably metal oxide particles having a refractive index that is higher than the refractive indexes of compositions made of materials obtained by removing the particles from the second transparent resin layer. Specifically, the second transparent resin layer preferably contains particles having a refractive index of 1.50 or higher, more preferably contains particles having a refractive index of 1.55 or higher, particularly preferably contains particles having a refractive index of 1.70 or higher, more particularly preferably contains particles having a refractive index of 1.90 or higher, and still more particularly preferably contains particles having a refractive index of 2.00 or higher with respect to light rays having wavelengths of 400 to 750 nm.

Here, the refractive index being 1.50 or higher with respect to light rays having wavelengths of 400 to 750 nm means that the average refractive index is 1.50 or higher with respect to light having wavelengths in the above-described range, and the refractive index is not necessarily 1.50 or higher with respect to all of the light rays having wavelengths in the above-described range. In addition, the average refractive index refers to the average value of refractive indexes with respect to light having wavelengths in the above-described range.

In addition, only one kind of metal oxide particles may be used or two or more kinds of metal oxide particles can be jointly used.

The kind of the metal oxide particles is not particularly limited, and well-known metal oxide particles can be used. In the transfer film, the second transparent resin layer preferably has at least one of zirconium oxide particles ($ZrO_2$ particles), $Nb_2O_5$ particles, or titanium oxide particles ($TiO_2$) particles from the viewpoint of controlling the refractive index in the range of the refractive index of the second transparent resin layer, and the metal oxide particles are more preferably zirconium oxide particles or titanium oxide particles and particularly preferably zirconium oxide particles.

—Metal Oxidation Suppressor—

The second transparent resin layer preferably includes a metal oxidation suppressor. In a case in which the second transparent resin layer includes a metal oxidation suppressor, it becomes possible to treat the surface of a metal wire portion in direct contact with the second transparent resin layer in a case in which the second transparent resin layer is laminated on a substrate (the substrate preferably include a transparent electrode pattern, the metal wire portion, or the like). The metal wire portion-protecting property which is imparted by the surface treatment is considered to remain effective even after the second transparent resin layer (and the photosensitive transparent resin layer) is removed.

The metal oxidation suppressor that is used in the present invention is preferably a compound having an aromatic ring including a nitrogen atom in the molecule.

In addition, in the metal oxidation suppressor, the aromatic ring including a nitrogen atom is preferably at least one ring selected from the group consisting of an imidazole ring, a triazole ring, a tetrazole ring, a thiadiazole ring, and fused rings of the above-described ring and an additional aromatic ring, and the aromatic ring including a nitrogen atom is more preferably an imidazole ring or a fused ring of an imidazole ring and an additional aromatic ring.

The additional aromatic ring may be a homocyclic ring or a heterocyclic ring, but is preferably a homocyclic ring, more preferably a benzene ring or a naphthalene ring, and still particularly preferably a benzene ring.

A metal oxidation suppressor is preferably imidazole, benzimidazole, tetrazole, mercaptothiadiazole, or benzotriazole, and more preferably imidazole, benzimidazole, or benzotriazole. As the metal oxidation suppressor, commercially available products may be used, and, for example, BT120 manufactured by Johoku Chemical Co., Ltd. which includes benzotriazole can be preferably used.

In addition, the content of the metal oxidation suppressor is preferably 0.1% to 20% by mass, more preferably 0.5% to 10% by mass, and particularly preferably 1 to 5% by mass of the total mass of the second transparent resin layer.

<Thermoplastic Resin Layer>

In the transfer film of the present invention, it is also possible to provide a thermoplastic resin layer between the temporary support and the photosensitive transparent resin layer. In a case in which a laminate is formed by transferring the photosensitive transparent resin layer and the second transparent resin layer using a transfer material having the thermoplastic resin layer, air bubbles are not easily generated in individual elements formed by transferring the layers, image unevenness or the like is not easily caused in image display devices, and excellent display characteristics can be obtained.

The thermoplastic resin layer is preferably alkali-soluble. The thermoplastic resin layer plays a role of a cushion material so as to be capable of absorbing protrusions and recesses (also including protrusions, recesses, and the like caused by images and the like which have been previously formed) on the base surface and is preferably capable of transforming in accordance with protrusions and recesses on the subject surface.

The thermoplastic resin layer preferably includes the organic macromolecular substance described in JP1993-72724A (JP-H05-72724A) as a component and particularly preferably includes at least one substance selected from organic macromolecular substances having a softening point of approximately 80° C. or lower which is obtained using the Vicat method [specifically, the polymer softening point measurement method based on American Society for Testing and Materials (ASTM International) ASTM D1235].

Specific examples thereof include organic macromolecules such as polyolefins such as polyethylene and polypropylene, ethylene copolymers of ethylene and vinyl acetate or a saponified substance thereof, copolymers of ethylene and an acrylic acid ester or a saponified substance thereof, vinyl chloride copolymers of polyvinyl chloride or vinyl chloride and vinyl acetate or a saponified substance thereof, polyvinylidene chloride, vinylidene chloride copolymers, polystyrene, styrene-based copolymers of styrene and a (meth)acrylic acid ester or a saponified substance thereof, polyvinyl toluene, vinyl toluene copolymers of vinyl toluene and a (meth)acrylic acid ester or a saponified substance thereof, poly(meth)acrylic acid esters, (meth)acrylic acid ester copolymers of butyl (meth)acrylate and vinyl acetate, polyamide resins such as vinyl acetate copolymer nylon, copolymerized nylon, N-alkoxymethylated nylon, and N-dimethylaminated nylon, and the like.

The thickness of the thermoplastic resin layer is preferably 3 to 30 µm. In a case in which the thickness of the thermoplastic resin layer is less than 3 µm, there are cases in which followability during lamination is insufficient and protrusions and recesses on the base surface cannot be fully absorbed. In addition, in a case in which the thickness exceeds 30 µm, there are cases in which loads are applied to drying (solvent removal) during the formation of the thermoplastic resin layer on the temporary support, time is taken for the development of the thermoplastic resin layer, or the process suitability is deteriorated. The thickness of the thermoplastic resin layer is more preferably 4 to 25 µm and particularly preferably 5 to 20 µm.

The thermoplastic resin layer can be formed by means of the application or the like of a prepared liquid including a thermoplastic organic macromolecule, and the prepared liquid that is used in the case of application or the like can be prepared using a solvent. The solvent is not particularly limited as long as the solvent is capable of dissolving macromolecular components constituting the thermoplastic resin layer, and examples thereof include methyl ethyl ketone, cyclohexanone, propylene glycol monomethyl ether acetate, n-propanol, 2-propanol, and the like.

(Viscosities of Thermoplastic Resin Layer and Photocurable Resin Layer)

It is preferable that the viscosity of the thermoplastic resin layer measured at 100° C. is in a region of 1,000 to 10,000 Pa·s and the viscosity of the photocurable resin layer measured at 100° C. is in a region of 2,000 to 50,000 Pa·s.

<Interlayer>

In the transfer film of the present invention, it is also possible to provide an interlayer between the thermoplastic resin layer and the photosensitive transparent resin layer. The interlayer is preferably the layer described in JP1993-72724A (JP-H05-72724A) as "separation layer".

<Protective Film>

The transfer film of the present invention is preferably further provided with a protective film or the like on the surface of the second transparent resin layer.

As the protective film, it is possible to appropriately use the protective film described in Paragraphs 0083 to 0087 and 0093 of JP2006-259138A.

Figure 12:
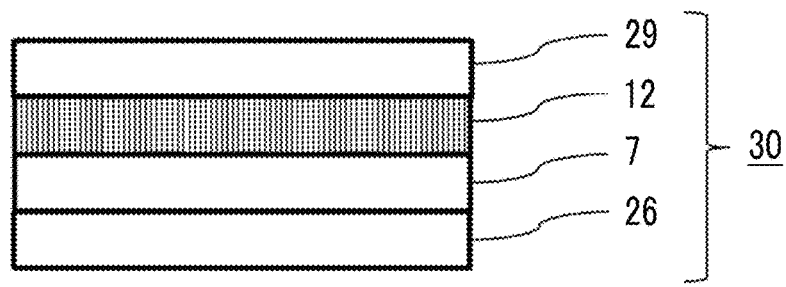
FIG. 12 is a schematic cross-sectional view illustrating an example of a constitution of a transfer film of the present invention.

FIG. 12 illustrates an example of a preferred constitution of the transfer film of the present invention. FIG. 12 is a schematic cross-sectional view of a transfer film 30 of the present invention in which a temporary support 26, a photosensitive transparent resin layer 7, a second transparent resin layer 12, and a protective peeling layer (protective film) 29 are laminated adjacent to each other in this order.

<Method for Manufacturing Transfer Film>

A method for manufacturing the transfer film is not particularly limited, and well-known methods can be used.

In a case in which the transfer film further having the second transparent resin layer in addition to the photosensitive transparent resin layer on the temporary support is manufactured, the method for manufacturing the above-described transfer film preferably includes a step of forming the photosensitive transparent resin layer on the temporary support and a step of directly forming the second transparent resin layer on the photosensitive transparent resin layer. The step of forming the photosensitive transparent resin layer is preferably a step of applying an organic solvent-based resin composition onto the temporary support. The step of forming the second transparent resin layer preferably has a step of forming the second transparent resin layer directly on the photosensitive transparent resin layer and is more preferably a step of applying a water-based resin composition including an ammonium salt of a monomer having an acidic group or an ammonium salt of a resin having an acidic group. In a case in which the above-described constitution is provided, the layers are favorably differentiated from each other, and it is possible to suppress problems caused by the absorption of moisture by the transparent resin layer formed using a water-based resin composition in the case of being aged at a high temperature and a high humidity. In a case in which the water-based resin composition including an ammonium salt of a monomer having an acidic group or an ammonium salt of a resin having an acidic group is applied onto the photosensitive transparent resin layer obtained using the organic solvent-based resin composition, even in a case in which the second transparent resin layer is formed without curing the photosensitive transparent resin layer, interlaminar mixing does not occur, and the layers are favorably differentiated from each other. Furthermore, when coated film formed using the water-based resin composition including an ammonium salt of a monomer having an acidic group or an ammonium salt of a resin having an acidic group are dried, ammonia having a lower boiling point than water is likely to volatilize from the ammonium salt of a monomer having an acidic group or the ammonium salt of a resin having an acidic group in the drying step, and thus it is possible to generate (regenerate) and provide acidic groups in the second transparent resin layer as the monomer having an acidic group or the resin having an acidic group. Therefore, in a case in which the transfer film is stored at a high temperature and a high humidity and moisture is absorbed, the monomer having an acidic group or the resin having an acidic group which constitutes the second transparent resin layer has already become insoluble in water, and thus it is possible to suppress problems caused when the transfer film absorbs moisture.

(Step of Forming Photosensitive Transparent Resin Layer on Temporary Support)

The method for manufacturing the transfer film has a step of forming the photosensitive transparent resin layer on the temporary support, and the step of forming the photosensitive transparent resin layer is preferably a step of applying a resin composition onto the temporary support and more preferably a step of applying an organic solvent-based resin composition onto the temporary support.

—Organic Solvent-Based Resin Composition—

The organic solvent-based resin composition refers to a resin composition that is soluble in organic solvents.

As the organic solvents, ordinary organic solvents can be used. Examples of the organic solvents include methyl ethyl ketone, propylene glycol monomethyl ether, propylene glycol monomethyl ether acetate, cyclohexanone, methyl isobutyl ketone, ethyl lactate, methyl lactate, caprolactam, and the like.

In the method for manufacturing the transfer film, the organic solvent-based resin composition that is used to form the photosensitive transparent resin layer preferably includes a binder polymer, a photopolymerizable compound, and a photopolymerization initiator.

(Step of Forming Second Transparent Resin Layer)

The method for manufacturing the transfer film preferably has a step of forming the second transparent resin layer directly on the photosensitive transparent resin layer. The step of forming the second transparent resin layer is preferably a step of applying a resin composition and more preferably a step of applying a water-based resin composition. The step of forming the second transparent resin layer is particularly preferably a step of applying a water-based resin composition including an ammonium salt of a monomer having an acidic group or an ammonium salt of a resin having an acidic group.

—Water-Based Resin Composition—

The water-based resin composition refers to a resin composition that is soluble in water-based solvents.

The water-based solvent is preferably water or a solvent mixture of a lower alcohol having 1 to 3 carbon atoms and water. In a preferred aspect of the method for manufacturing the transfer film, a solvent in the water-based resin composition that is used to form the second transparent resin layer preferably includes water and an alcohol having 1 to 3 carbon atoms and is more preferably water or a solvent mixture in which the content ratio of an alcohol having 1 to 3 carbon atoms to water is 58/42 to 100/0 in terms of the mass ratio. The content ratio of the alcohol having 1 to 3 carbon atoms to water is particularly preferably in a range of 59/41 to 100/0 in terms of the mass ratio, more particularly preferably in a range of 60/40 to 97/3 from the viewpoint of improving the coloration of the laminate of the present invention, still more particularly preferably in a range of 62/38 to 95/5 from the viewpoint of improving the substrate adhesion of the laminate of the present invention, and most preferably 62/38 to 85/15.

Water, a solvent mixture of water and methanol, and a solvent mixture of water and ethanol are preferred, and a solvent mixture of water and methanol is preferred from the viewpoint of drying and coatability.

Particularly, in a case in which a solvent mixture of water and methanol is used during the formation of the second transparent resin layer, the mass ratio (% by mass ratio) of water/methanol is preferably 58/42 to 100/0, more preferably in a range of 59/41 to 100/0, particularly preferably 60/40 to 97/3, more particularly preferably 62/38 to 95/5, and still more particularly preferably 62/38 to 85/15. In a case in which the amount of methanol becomes smaller than the range of the content ratio of the alcohol having 1 to 3 carbon atoms to water being 58/42 in terms of the mass ratio, the photosensitive transparent resin layer does not easily dissolve and become white-turbid, which is preferable.

In a case in which the mass ratio is controlled in the above-described range, it is possible to realize coating and fast drying without causing interlamellar mixing with the second transparent resin layer.

The power of hydrogen (pH) of the water-based resin composition at 25° C. is preferably 7.0 or more and 12.0 or less, more preferably 7.0 to 10.0, and particularly preferably 7.0 to 8.5. The pH of the water-based resin composition can be adjusted to the above-described preferred range by, for example, adding the monomer having an acidic group or the resin having an acidic group to the acidic groups using an excess amount of ammonia.

In addition, in the method for manufacturing the transfer film, the water-based resin composition that is used to form the second transparent resin layer is preferably at least one of a thermocurable resin composition or a photocurable resin composition. In a case in which the photosensitive transparent resin layer and the second transparent resin layer are the curable transparent resin layers, according to the method for manufacturing the transfer film, it is preferable that, even in a case in which the photosensitive transparent resin layer is laminated and then the second transparent resin layer is laminated without curing the photosensitive transparent resin layer, the layers are favorably differentiated from each other, and thus it is possible to improve the transparent electrode pattern-masking property. In a case in which the photosensitive transparent resin layer and the second transparent resin layer are curable transparent resin layers, it is possible to develop in a desired pattern the photosensitive transparent resin layer which becomes a layer closer to the outside than the second transparent resin layer by means of photolithography at least after the transfer after the photosensitive transparent resin layer and the second transparent resin layer are transferred at the same time onto the transparent electrode pattern from an additionally obtained transfer film. Furthermore, an aspect in which the second transparent resin layer is curable is more preferred, and, in this aspect, it is possible to develop in a desired pattern the photosensitive transparent resin layer and the second transparent resin layer by means of photolithography after the photosensitive transparent resin layer and the second transparent resin layer are transferred at the same time onto the transparent electrode pattern.

The resin composition that is used to form the second transparent resin layer preferably includes a binder polymer, a photo- or thermopolymerizable compound, and a photo- or thermopolymerization initiator.

The resin composition that is used to form the second transparent resin layer more preferably has an ammonium salt of a monomer having an acidic group or an ammonium salt of a resin having an acidic group.

The ammonium salt of a monomer having an acidic group or the ammonium salt of a resin having an acidic group is not particularly limited. The ammonium salt of a monomer having an acidic group or the ammonium salt of a resin having an acidic group in the second transparent resin layer is preferably an ammonium salt of an acrylic monomer or acrylic resin having an acidic group. In the resin composition that is used to form the second transparent resin layer, only the ammonium salt of a resin having an acidic group may serve as the binder polymer, and another binder polymer other than the ammonium salt of a resin having an acidic group may be jointly used. In the resin composition that is used to form the second transparent resin layer, the ammonium salt of a monomer having an acidic group may be a photo- or thermopolymerizable compound, and another photo- or thermopolymerizable compound other than the ammonium salt of a monomer having an acidic group may be jointly used.

A step of preparing a water-based resin composition including a monomer or a resin in which at least some of acidic groups are turned into ammonium salts by dissolving the monomer having an acidic group or the resin having an acidic group in an ammonia aqueous solution is preferably included.

Among the ammonium salt of a monomer having an acidic group and the ammonium salt of a resin having an acidic group, the ammonium salt of a resin having an acidic group is preferably used.

<Volatilization of Ammonia>

Furthermore, the method for manufacturing the transfer film preferably includes a step of generating acidic groups by volatilizing ammonia from the ammonium salt of a monomer having an acidic group or the ammonium salt of a resin having an acidic group. In a case in which ammonia is volatilized from the ammonium salt of a monomer having an acidic group or the ammonium salt of a resin having an acidic group of the resin composition which is used to form the second transparent resin layer, it is possible to add the monomer having an acidic group and the resin having an acidic group to the second transparent resin layer. The step of generating acidic groups by volatilizing ammonia from the ammonium salt of a monomer having an acidic group or the ammonium salt of a resin having an acidic group is preferably a step of heating the resin composition that is used to form the applied second transparent resin layer.

Preferred ranges of the detailed conditions of the step of heating the coated water-based resin composition will be described below.

Examples of the heating and drying method include a method in which the composition is passed through a furnace including a heating device and a method in which the composition is heated and dried by means of blasting. The heating and drying conditions may be appropriately set depending on organic solvents and the like being used, and the composition may be heated to a temperature of 40° C. to 150° C. or the like. Among these conditions, the composition is preferably heated to a temperature of 50° C. to 120° C. and more preferably heated to a temperature of 60° C. to 100° C. In the heated and dried composition, the moisture content in the wet standard is preferably set to 5% by mass or less, more preferably set to 3% by mass or less, and particularly preferably set to 1% by mass or less.

<Other Steps>

The method for manufacturing the transfer film may include a step of further forming the thermoplastic resin layer before the formation of the photosensitive transparent resin layer on the temporary support.

After the step of further forming the thermoplastic resin layer, a step of forming the interlayer between the thermoplastic resin layer and the photosensitive transparent resin layer may be provided. In the case of forming a transfer film having the interlayer, it is preferable to provide a thermoplastic resin layer by applying and drying a solution obtained by dissolving additives together with a thermoplastic organic macromolecule (coating fluid for the thermoplastic resin layer) on the temporary support and then laminate the interlayer by applying and drying a preparation liquid obtained by adding resins or additives to a solvent that does not dissolve the thermoplastic resin layer (coating fluid for the interlayer) on the thermoplastic resin layer. It is preferable to further apply and dry a coating fluid for the photosensitive transparent resin layer which is prepared using a solvent that does not dissolve the interlayer onto this interlayer so as to laminate the photosensitive transparent resin layer.

As a method for manufacturing other transparent resin layers, it is possible to employ the method for producing a photosensitive transfer material described in Paragraphs 0094 to 0098 of JP2006-259138A.

<Uses>

The transfer film of the present invention is preferably used for electrode protective films for electrostatic capacitance-type input devices and more preferably used for, among electrode protective films, transparent insulating layers or transparent protective layers. The transfer film of the present invention may have the photosensitive transparent resin layer in a non-cured state, and, in such a case, the transfer film can be preferably used as a transfer film for forming a laminate pattern of an electrode protective film for an electrostatic capacitance-type input device on a transparent electrode pattern by means of a photolithography method and more preferably used as a transfer film for forming laminate patterns of the second transparent resin layer (refractive index-adjusting layer) and the photosensitive transparent resin layer (overcoat layer). In the present specification, the photosensitive transparent resin layer being non-cured refers to the fact that the consumption percentage of curable groups in the photosensitive transparent resin layer is less than 10%.

[Electrode Protective Film for Electrostatic Capacitance-Type Input Device]

An electrode protective film for an electrostatic capacitance-type input device of the present invention is the transfer film of the present invention from which the temporary support is removed.

The moisture permeability of the electrode protective film for an electrostatic capacitance-type input device of the present invention is low. The moisture permeability of the electrode protective film has a positive correlation with the thickness of the electrode protective film. In consideration of an intensifying demand for decreasing the thickness of the electrode protective film for an electrostatic capacitance-type input device from the viewpoint of weight reduction, the moisture permeability of the electrode protective film is preferably lower.

The electrode protective film for an electrostatic capacitance-type input device of the present invention has a low moisture permeability and is thus excellent in terms of heat and moisture resistance and excellent in terms of heat and moisture resistance after the supply of saline water which become particularly important in uses of electrostatic capacitance-type input devices. Therefore, the electrode protective film for an electrostatic capacitance-type input device is preferably used for electrode protective films for film sensor-type electrostatic capacitance-type input devices.

The laminate of the present invention described below has the electrode protective film for an electrostatic capacitance-type input device of the present invention.

[Laminate]

A first aspect of the laminate of the present invention is a laminate which has a substrate including an electrode of an electrostatic capacitance-type input device and a photosensitive transparent resin layer located on the substrate, and which is formed by transferring the photosensitive transparent resin layer from the transfer film of the present invention onto the substrate.

A second aspect of the laminate of the present invention is a laminate having a substrate including an electrode of an electrostatic capacitance-type input device and a photosensitive transparent resin layer located on the substrate, in which the photosensitive transparent resin layer includes (A) the binder polymer, (B) the photopolymerizable compound having an ethylenic unsaturated group, (C) the photopolymerization initiator, and (D) the rosin compound.

A third aspect of the laminate of the present invention is a laminate manufactured using the method for manufacturing a laminate of the present invention described below.

Since the laminates have the above-described constitutions, the laminate of the present invention has a low moisture permeability and is excellent in terms of the heat and moisture resistance after the supply of saline water.

Meanwhile, a film obtained by transferring the photosensitive transparent resin layer in the transfer film of the present invention onto a transparent electrode pattern and photocuring this layer is also referred to as an electrode protective film. The laminate of the present invention preferably has the electrode protective film that is formed by heating the photosensitive transparent resin layer on the substrate.

The electrode of the electrostatic capacitance-type input device may be a transparent electrode pattern or a guidance wire. In the laminate of the present invention, the electrode of the electrostatic capacitance-type input device is preferably an electrode pattern and more preferably a transparent electrode pattern.

The laminate of the present invention has a substrate including an electrode of an electrostatic capacitance-type input device and a photosensitive transparent resin layer formed on the substrate, preferably has at least a substrate, a transparent electrode pattern, or a photosensitive transparent resin layer, and more preferably has a substrate, a transparent electrode pattern, a second transparent resin layer disposed adjacent to the transparent electrode pattern, and a photosensitive transparent resin layer disposed adjacent to the second transparent resin layer.

The laminate of the present invention has a substrate, a transparent electrode pattern, a second transparent resin layer disposed adjacent to the transparent electrode pattern, and a photosensitive transparent resin layer disposed adjacent to the second transparent resin layer, the refractive index of the second transparent resin layer is particularly preferably higher than the refractive index of the photosensitive transparent resin layer, and the refractive index of the second transparent resin layer is more particularly preferably 1.6 or higher. In a case in which the above-described constitution is provided, it is possible to solve the problem of the transparent electrode pattern becoming visible, and the patterning property becomes favorable.

<Constitution of Laminate>

The laminate of the present invention preferably further has a transparent film having a refractive index of 1.6 to 1.78 and a thickness of 55 to 110 nm or a transparent film having a different refractive index or thickness on a side of the transparent electrode pattern opposite to the side on which the second transparent resin layer is formed from the viewpoint of further improving the transparent electrode pattern-masking property. Meanwhile, in the present specification, in the case of being simply mentioned, "transparent films" refer to "transparent film having a refractive index of 1.6 to 1.78 and a film thickness of 55 to 110 nm".

The laminate of the present invention preferably further has a substrate on a side of the transparent film having a refractive index of 1.6 to 1.78 and a thickness of 55 to 110 nm opposite to the side on which the transparent electrode pattern is formed.

Figure 11:
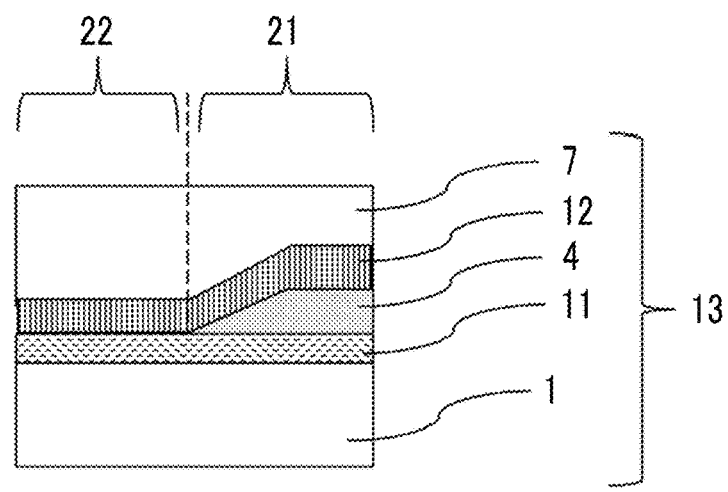
FIG. 11 is a schematic cross-sectional view illustrating an example of a constitution of a laminate of the present invention.

FIG. 11 illustrates an example of the constitution of the laminate of the present invention.

In FIG. 11, a laminate 13 has a substrate 1 and a transparent film 11 having a refractive index of 1.6 to 1.78 and a thickness of 55 to 110 nm, and, furthermore, a region 21 in which a second transparent electrode pattern 4, the second transparent resin layer 12, and a photosensitive transparent resin layer 7 are laminated in this order is provided in a plane. In addition, FIG. 11 illustrates that the laminate 13 includes, in addition to the above-described region 21, a region in which the substrate 1 and the transparent film 11 are laminated in this order (in the constitution of FIG. 11, a region 22 in which the second transparent resin layer 12 and the photosensitive transparent resin layer 7 are laminated in this order (that is, a non-patterned region 22 in which the transparent electrode pattern is not formed)).

In other words, the laminate 13 includes the region 21 in which the substrate 1, the transparent film 11, the second transparent electrode pattern 4, the second transparent resin layer 12, and the photosensitive transparent resin layer 7 are laminated in this order in the in-plane direction.

The in-plane direction refers to a direction that is substantially parallel to a surface parallel to the main surface of the substrate in the laminate. Therefore, the fact that the region in which the second transparent electrode pattern 4, the second transparent resin layer 12, and the photosensitive transparent resin layer 7 are laminated in this order is included in the in-plane direction means that the orthogonal projection of the region in which the second transparent electrode pattern 4, the second transparent resin layer 12, and the photosensitive transparent resin layer 7 are laminated in this order on the surface parallel to the substrate in the laminate is present in a plane parallel to the substrate in the laminate.

Figure 3:
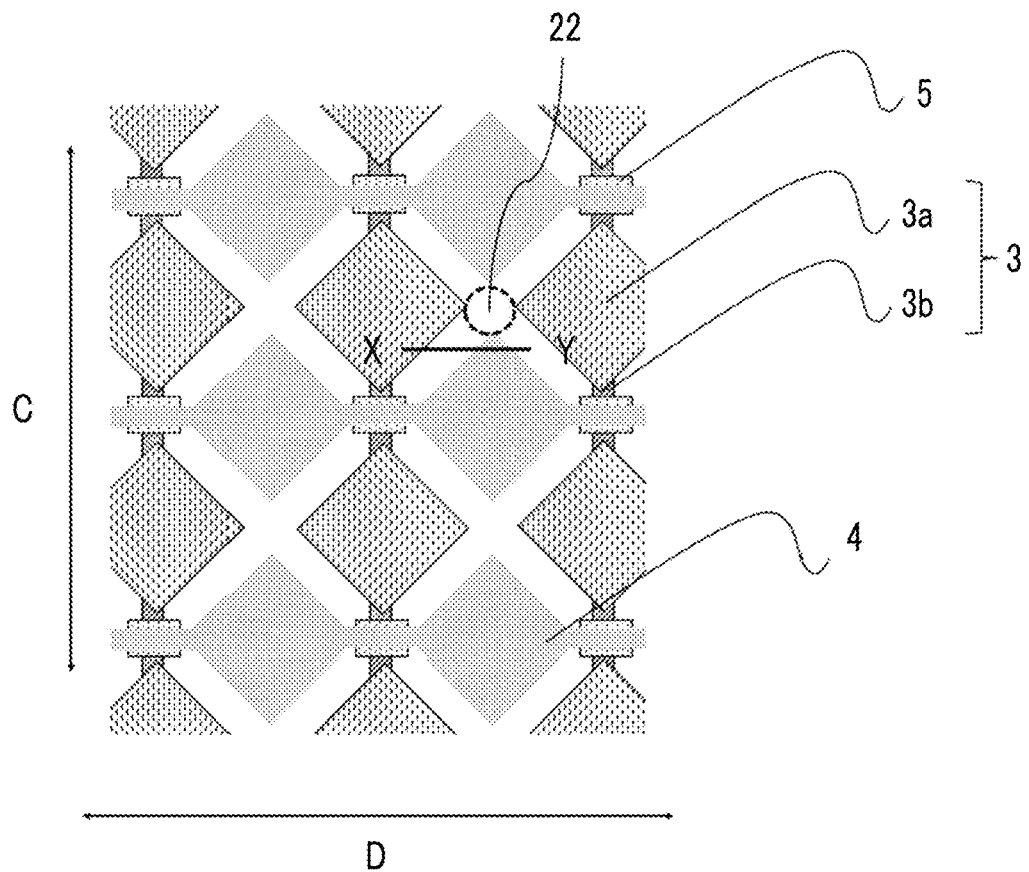
FIG. 3 is an explanatory view illustrating an example of a relationship between a transparent electrode pattern and non-patterned regions in the present invention.

Here, in a case in which the laminate of the present invention is used in an electrostatic capacitance-type input device described below, there are cases in which a transparent electrode pattern is provided in two substantially orthogonal directions that are the row direction and the column direction as a first transparent electrode pattern and a second transparent electrode pattern (for example, refer to FIG. 3). For example, in the constitution of FIG. 3, the transparent electrode pattern in the laminate of the present invention may be the second transparent electrode pattern 4 or a pad portion 3a of a first transparent electrode pattern 3. In other words, in the following description of the laminate of the present invention, there are cases in which the transparent electrode pattern is representatively indicated using a reference sign "4", but the application of the transparent electrode pattern in the laminate of the present invention is not limited to the second transparent electrode pattern 4 in the electrostatic capacitance-type input device of the present invention, and the transparent electrode pattern may be used as the pad portion 3a of the first transparent electrode pattern 3.

The laminate of the present invention preferably includes a non-patterned region in which the transparent electrode pattern is not formed. In the present specification, the non-patterned region refers to a region in which the second transparent electrode pattern 4 is not formed.

FIG. 11 illustrates an aspect in which the laminate of the present invention includes the non-patterned region 22.

The laminate of the present invention preferably includes the region in which the substrate, the transparent film, and the second transparent resin layer are laminated in this order in the plane at least in a part of the non-patterned region 22 in which the transparent electrode pattern is not formed.

In the laminate of the present invention, in the region in which the substrate, the transparent film, and the second transparent resin layer are laminated in this order, the transparent film and the second transparent resin layer are preferably adjacent to each other.

In the other region of the non-patterned region 22, other members may be disposed in arbitrary locations within the scope of the gist of the present invention, and, for example, in a case in which the laminate of the present invention is used in the electrostatic capacitance-type input device described below, it is possible to laminate a mask layer 2, an insulating layer 5, an additional conductive element 6, and the like in FIG. 1.

In the laminate of the present invention, the substrate and the transparent film are preferably adjacent to each other.

FIG. 11 illustrates an aspect in which the transparent film 11 is adjacently laminated on the substrate 1.

Here, within the scope of the gist of the present invention, a third transparent film may be laminated between the substrate and the transparent film. For example, a third transparent film having a refractive index of 1.5 to 1.52 (not illustrated in FIG. 11) is preferably provided between the substrate and the transparent film.

In the laminate of the present invention, the thickness of the transparent film is preferably 55 to 110 nm, more preferably 60 to 110 nm, and particularly preferably 70 to 90 nm.

Here, the transparent film may have a monolayer structure or a laminate structure of two or more layers. In a case in which the transparent film has a laminate structure of two or more layers, the thickness of the transparent film refers to the total thickness of all the layers.

In the laminate of the present invention, the transparent film and the transparent electrode pattern are preferably adjacent to each other.

FIG. 11 illustrates an aspect in which the second transparent electrode pattern 4 is adjacently laminated on a region of a part of the transparent film 11.

The shape of the end portion of the second transparent electrode pattern 4 is not particularly limited and may be a taper shape as illustrated in FIG. 11, and, for example, the end portion may have a taper shape in which the surface on the substrate side is wider than the surface on the side opposite to the substrate.

Here, when the end portion of the transparent electrode pattern has a taper shape, the angle of the end portion of the transparent electrode pattern (hereinafter, also referred to as the taper angle) is preferably 30° or less, more preferably 0.1° to 15°, and particularly preferably 0.5° to 5°.

In the present specification, the taper angle can be obtained using the following method for measuring the taper angle: a microscopic photograph of a cross section of the end portion of the transparent electrode pattern is captured, the taper portion in the microscopic photograph is approximated to a triangle, and the taper angle is directly measured.

Figure 10:
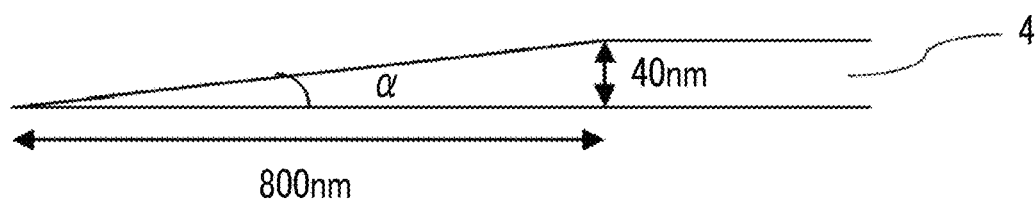
FIG. 10 is an explanatory view illustrating an example of a taper shape of an end portion of the transparent electrode pattern.

FIG. 10 illustrates an example of a case in which the end portion of the transparent electrode pattern has a taper shape.

In a triangle obtained by approximating a taper portion in FIG. 10, the bottom surface is 800 nm, the height (the thickness at the top portion substantially parallel to the bottom surface) is 40 nm, and the taper angle α at this time is approximately 3°. The bottom surface of the triangle obtained by approximating the taper portion is preferably 10 to 3,000 nm, more preferably 100 to 1,500 nm, and particularly preferably 300 to 1,000 nm.

Meanwhile, a preferred range of the height of the triangle obtained by approximating the taper portion is the same as the preferred range of the thickness of the transparent electrode pattern.

The laminate of the present invention preferably includes a region in which the transparent electrode pattern and the second transparent resin layer are adjacent to each other.

FIG. 11 illustrates an aspect in which the transparent electrode pattern, the second transparent resin layer, and the photosensitive transparent resin layer are adjacent to each other in the region 21 in which the transparent electrode pattern, the second transparent resin layer, and the photosensitive transparent resin layer are laminated in this order.

In addition, in the laminate of the present invention, both of the transparent electrode pattern and the non-patterned region 22 in which the transparent electrode pattern is not formed are preferably continuously coated with the transparent film and the second transparent resin layer directly or through other layers.

Here, "being continuously coated" means that the transparent film and the second transparent resin layer are not patterned films but continuous films. That is, the transparent film and the second transparent resin layer preferably have no opening portions since the transparent electrode pattern is made to be rarely visible.

In addition, the transparent electrode pattern and the non-patterned region 22 are more preferably directly coated with the transparent film and the second transparent resin layer than coated through other layers. In a case in which the transparent electrode pattern and the non-patterned region are coated through other layers, examples of "other layers" include the insulating layer 5 included in the electrostatic capacitance-type input device of the present invention described below, a transparent electrode pattern on the second layer in a case in which two or more transparent electrode patterns are included as in the electrostatic capacitance-type input device of the present invention described below, and the like.

FIG. 11 illustrates an aspect in which the second transparent resin layer 12 is laminated. The second transparent resin layer 12 is laminated so as to astride the region in which the second transparent electrode pattern 4 on the transparent film 11 is not laminated and the region in which the second transparent electrode pattern 4 is laminated. That is, the second transparent resin layer 12 is adjacent to the transparent film 11 and, furthermore, the second transparent resin layer 12 is adjacent to the second transparent electrode pattern 4.

In addition, in a case in which the end portion of the second transparent electrode pattern 4 has a taper shape, the second transparent resin layer 12 is preferably laminated along the taper shape (at the same slope as the taper angle).

FIG. 11 illustrates an aspect in which the photosensitive transparent resin layer 7 is laminated on, between surfaces of the second transparent resin layer 12, the surface on a side opposite to the surface of the second transparent resin layer 12 on which the transparent electrode pattern is formed.

<Material of Laminate>
(Substrate)

The laminate of the present invention has a substrate including the electrode of the electrostatic capacitance-type input device. In the substrate including the electrode of the electrostatic capacitance-type input device, the substrate and the electrode are preferably separate members.

The substrate is preferably a glass substrate or a transparent film substrate and more preferably a film substrate. In addition, the substrate is preferably a transparent substrate. That is, in the laminate of the present invention, the substrate is more preferably a transparent film substrate.

The refractive index of the substrate is particularly preferably 1.5 to 1.52.

The substrate may be constituted of a glass substrate, and, as the glass substrate, it is possible to use reinforced glass or the like represented by Corning's GORILLA glass.

In addition, as the transparent substrate, it is possible to preferably use the materials used in JP2010-86684A, JP2010-152809A, and JP2010-257492A.

In a case in which a film substrate is used as the substrate, a transparent film substrate causing no optical distortion or a transparent film substrate having high transparency is more preferably used, and specific examples include polyethylene terephthalate, polyethylene naphthalate, polycarbonate, triacetyl cellulose, or cycloolefin polymers.

The laminate is also preferably a constitution in which the transparent electrode pattern, the second transparent resin layer, and the photosensitive transparent resin layer are provided on both surfaces of the substrate respectively. In this case, the laminate is preferably used as a film sensor.

(Transparent Electrode Pattern)

The refractive index of the transparent electrode pattern in the laminate is preferably 1.75 to 2.1.

The material of the transparent electrode pattern is not particularly limited, and well-known materials can be used. Examples of the material of the transparent electrode pattern include metal films or translucent conductive metal oxide films such as ITO or indium zinc oxide (IZO). Examples of the above-described metal film and the metal oxide film include metal films of Al, Zn, Cu, Fe, Ni, Cr, Mo, and the like; metal oxide films of ITO, $SiO_2$, and the like. At this time, the thickness of the transparent electrode pattern can be set to 10 to 200 nm.

In addition, in a case in which amorphous ITO films are turned into polycrystalline ITO films by means of firing, it is also possible to reduce the electrical resistance.

In addition, a method for manufacturing the transparent electrode pattern is not particularly limited. For example, the first transparent electrode pattern 3, the second transparent electrode pattern 4, and the additional conductive element 6 described below can also be manufactured using the photosensitive film having a photocurable resin layer for which a well-known conductive fiber is used. Additionally, in a case in which the first transparent electrode pattern and the like are formed using ITO or the like, it is possible to refer to Paragraphs 0014 to 0016 of JP4506785B.

The transparent electrode pattern is preferably an ITO film.

In the laminate of the present invention, the transparent electrode pattern is more preferably an ITO film having a refractive index of 1.75 to 2.1.

(Photosensitive Transparent Resin Layer and Second Transparent Resin Layer)

Preferred ranges of the photosensitive transparent resin layer and the second transparent resin layer included in the laminate of the present invention are the same as the preferred ranges of the above-described photosensitive transparent resin layer and the above-described second transparent resin layer in the transfer film of the present invention.

Among those, in the laminate of the present invention, the photosensitive transparent resin layer preferably includes a carboxylic acid anhydride from the viewpoint of the photosensitive transparent resin layer serving as an electrode protective film being excellent in terms of both heat and moisture resistance after the supply of saline water and development residues in an electrostatic capacitance-type input device. It is assumed that, in a case in which a carboxy group-containing resin in the photosensitive transparent resin layer is thermally crosslinked by adding a blocked isocyanate, the three-dimensional crosslinking density increases, an anhydride of the carboxy group in the carboxy group-containing resin is formed and hydrophobilized, or the like, which contributes to the improvement of the heat and moisture resistance after the supply of saline water.

A method for adding a carboxylic acid anhydride to the photosensitive transparent resin layer is not particularly limited, but is preferably a method in which at least a part of a carboxy group-containing acrylic resin is turned into a carboxylic acid anhydride by heating the transferred photosensitive transparent resin layer. In addition, in a case in which at least one photopolymerizable compound having an ethylenic unsaturated group contains a carboxy group, a carboxy group-containing acrylic resin and the photopolymerizable compound having an ethylenic unsaturated group which contains a carboxy group may form a carboxylic acid anhydride or photopolymerizable compounds having an ethylenic unsaturated group which contains a carboxy group may form a carboxylic acid anhydride.

(Transparent Film)

In the laminate of the present invention, the refractive index of the transparent film is preferably 1.6 to 1.78 and more preferably 1.65 to 1.74. Here, the transparent film may have a monolayer structure or a laminate structure of two or more layers. In a case in which the transparent film has a laminate structure of two or more layers, the refractive index of the transparent film refers to the refractive index of all the layers.

The material of the transparent film is not particularly limited, and materials satisfying the range of this refractive index are preferred.

A preferred range of the material of the transparent film and a preferred range of the physical properties such as the refractive index are the same as the preferred ranges of those of the second transparent resin layer.

In the laminate of the present invention, the transparent film and the second transparent resin layer are preferably constituted of the same material from the viewpoint of optical homogeneity.

In the laminate of the present invention, the transparent film is preferably a transparent resin film.

The metal oxide particles, the binder polymer, and other additives that are used in the transparent resin film are not particularly limited within the scope of the gist of the present invention, and it is possible to preferably use the binder polymer and other additives that are used in the second transparent resin layer in the transfer film of the present invention.

In the laminate of the present invention, the transparent film may be an inorganic film. As the material that is used in the inorganic film, it is possible to preferably use the materials that are used in JP2010-86684A, JP2010-

152809A, and JP2010-257492A, the contents of which are incorporated into the present specification.

(Third Transparent Film)

The refractive index of the third transparent film is preferably 1.5 to 1.55 since the refractive index is approximated to the refractive index of the substrate and the transparent electrode pattern-masking property improves and more preferably 1.5 to 1.52.

[Method for Manufacturing Laminate]

The method for manufacturing the laminate of the present invention includes a step of transferring the photosensitive transparent resin layer of the transfer film of the present invention onto the substrate including the electrode of the electrostatic capacitance-type input device.

The method for manufacturing the laminate preferably includes a step of laminating the second transparent resin layer and the photosensitive transparent resin layer of the transfer film of the present invention in this order on the transparent electrode pattern.

In a case in which the above-described constitution is provided, it is possible to collectively transfer the second transparent resin layer and the photosensitive transparent resin layer of the laminate and easily manufacture laminates having no problems of the transparent electrode pattern being visible with favorable productivity.

Meanwhile, the second transparent resin layer is formed on the transparent electrode pattern and, in the non-patterned region, on the transparent film directly or through other layers.

(Surface Treatment of Substrate)

In addition, in order to enhance the adhesion of the respective layers after lamination is carried out in the subsequent transfer step, it is possible to carry out a surface treatment on the noncontact surface of the substrate (between surfaces of the substrate constituting the electrostatic capacitance-type input device, the surface on a side opposite to the surface which is contacted with input means such as fingers) in advance. As the surface treatment, it is preferable to carry out a surface treatment using a silane compound (silane coupling treatment). A silane coupling agent is preferably an agent having a functional group that interacts with photosensitive resins. For example, a silane coupling liquid (an aqueous solution of 0.3% by mass of N-β(aminoethyl) γ-aminopropyltrimethoxysilane, trade name: KBM603, manufactured by Shin-Etsu Chemical Co., Ltd.) is showered on the surface for 20 seconds, and the surface is cleaned by means of pure water showering. After that, a reaction is preferably caused by means of heating. A heating tank may be used, and preliminary heating by a laminator may be used, and the reaction can be accelerated in any cases.

(Formation of Transparent Electrode Pattern)

The transparent electrode pattern can be formed on the substrate or the transparent film having a refractive index of 1.6 to 1.78 and a thickness of 55 to 110 nm using a method for forming the first transparent electrode pattern 3, the second transparent electrode pattern 4, and the additional conductive element 6 or the like in the description of the electrostatic capacitance-type input device of the present invention described below or the like, and a method in which a photosensitive film is used is preferred.

(Formation of Photosensitive Transparent Resin Layer and Second Transparent Resin Layer)

Examples of a method for forming the photosensitive transparent resin layer and the second transparent resin layer include methods having a protective film-removing step of removing the protective film from the transfer film of the present invention, a transfer step of transferring the photosensitive transparent resin layer and the second transparent resin layer in the transfer film of the present invention from which the protective film has been removed onto the transparent electrode pattern, an exposure step of exposing the photosensitive transparent resin layer and the second transparent resin layer which have been transferred onto the transparent electrode pattern, and a development step of developing the photosensitive transparent resin layer and the second transparent resin layer which have been exposed.

—Transfer Step—

The transfer step is preferably a step of transferring the photosensitive transparent resin layer and the second transparent resin layer in the transfer film of the present invention from which the protective film has been removed onto the transparent electrode pattern.

In this case, a method including a step of removing the temporary support after laminating the photosensitive transparent resin layer and the second transparent resin layer in the transfer film of the present invention on the transparent electrode pattern is preferred.

The photosensitive transparent resin layer and the second transparent resin layer are transferred (attached) onto the surface of the transparent electrode pattern by overlaying, pressurizing, and heating the photosensitive transparent resin layer and the second transparent resin layer on the surface of the transparent electrode pattern. For the attachment, well-known laminators such as a laminator, a vacuum laminator, and an auto-cut laminator capable of enhancing productivity can be used.

—Exposure Step, Development Step, and Other Steps—

As examples of the exposure step, the development step, and other steps, it is possible to preferably use the method described in Paragraphs 0035 to 0051 of JP2006-23696A even in the present invention.

The exposure step is preferably a step of exposing the photosensitive transparent resin layer and the second transparent resin layer which have been transferred onto the transparent electrode pattern.

Specific examples thereof include a method in which a predetermined mask is disposed above the photosensitive transparent resin layer, the second transparent resin layer, and the temporary support which have been formed on the transparent electrode patterns and then the photosensitive transparent resin layer and the second transparent resin layer are exposed to light sources above the mask (through the mask and the temporary support).

Here, as the light sources for the exposure, it is possible to appropriately select and use light sources as long as the light sources are capable of radiating light having wavelengths in a range (for example, 365 nm, 405 nm, or the like) with which the photosensitive transparent resin layer and the second transparent resin layer can be cured. Specific examples thereof include an ultrahigh-pressure mercury lamp, a high-pressure mercury lamp, a metal halide lamp, and the like. The exposure amount is generally approximately 5 to 200 $mJ/cm^2$ and preferably approximately 10 to 100 $mJ/cm^2$.

The development step is a step of developing the exposed photocurable resin layers.

In the present invention, the development step is a narrowly-defined development step in which the photosensitive transparent resin layer and the second transparent resin layer which have been pattern-exposed are pattern-developed using a developer.

The development can be carried out using a developer. The developer is not particularly limited, and it is possible to use well-known developers such as the developer described in JP1993-72724A (JP-HOS-72724A). Furthermore, the developer is preferably a developer in which photocurable resin layers perform dissolution-type development behaviors and, for example, preferably a developer including a compound having a power of Ka (pKa; Ka represents the acid dissociation constant) of 7 to 13 at a concentration of 0.05 to 5 mol/L. Meanwhile, in a case in which the photosensitive transparent resin layer and the second transparent resin layer do not form any patterns, the developer is preferably a developer which performs development behaviors so as not to dissolve the non-alkali development-type coloring composition layer and, for example, preferably a developer including a compound having a pKa of 7 to 13 at a concentration of 0.05 to 5 mol/L. To the developer, a small amount of a water-miscible organic solvent may be further added. Examples of the water-miscible organic solvent include methanol, ethanol, 2-propanol, 1-propanol, butanol, diacetone alcohol, ethylene glycol monomethyl ether, ethylene glycol monoethyl ether, ethylene glycol mono-n-butyl ether, pentyl alcohol, acetone, methyl ethyl ketone, cyclohexanone, ε-caprolactone, γ-butyrolactone, dimethylformamide, dimethylacetamide, hexamethylphosphoramide, ethyl lactate, methyl lactate, ε-caprolactam, N-methyl pyrrolidone, and the like. The concentration of the organic solvent is preferably 0.1% by mass to 30% by mass.

In addition, to the developer, it is possible to further add a well-known surfactant. The concentration of the surfactant is preferably 0.01% by mass to 10% by mass.

The development method may be any one of puddle development, shower development, shower and spin development, dip development, and the like. In the case of the shower development, a developer is showered onto the photosensitive transparent resin layer and the second transparent resin layer which have been exposed, whereby it is possible to remove non-cured portions. Furthermore, in a case in which the thermoplastic resin layer or the interlayer is provided, it is preferable to shower an alkaline liquid that does not easily dissolve photocurable resin layers and remove the thermoplastic resin layer, the interlayer, and the like before development. In addition, after the development, it is preferable to shower a cleaning agent or the like and remove development residue by rubbing the surface with a brush or the like. The liquid temperature of the developer is preferably 20° C. to 40° C. The pH of the developer is preferably 8 to 13.

The method for manufacturing the laminate may have other steps such as a post exposure step.

Furthermore, patterning exposure or full-surface exposure may be carried out after the peeling of the temporary support or may be carried out before the peeling of the temporary support, which is followed by the peeling of the temporary support. The exposure may be exposure through a mask or digital exposure using a laser or the like.

—Heating Step—

The method for manufacturing the laminate of the present invention preferably includes a step of heating the transferred photosensitive transparent resin layer and more preferably includes a step of turning at least a part of the carboxy group-containing acrylic resin into a carboxylic acid anhydride by heating the transferred photosensitive transparent resin layer from the viewpoint of improving heat and moisture resistance after the supply of saline water. The transferred photosensitive transparent resin layer is preferably heated after exposure and development, that is, the step is preferably a post-baking step carried out after exposure and development. In a case in which the photosensitive transparent resin layer and the second transparent resin layer are thermocurable, particularly, a post-baking step is preferably carried out. In addition, the post baking step is preferably carried out from the viewpoint of adjusting the resistance value of the transparent electrode such as ITO.

The heating temperature in the step of turning at least a part of the carboxy group-containing acrylic resin into a carboxylic acid anhydride by heating the transferred photosensitive transparent resin layer is preferably 100° C. to 160° C. in a case in which a film substrate is used as the substrate and more preferably 140° C. to 150° C.

(Formation of Transparent Film)

In a case in which the laminate of the present invention further has a transparent film having a refractive index of 1.6 to 1.78 and a thickness of 55 to 110 nm on a side of the transparent electrode pattern opposite to the side on which the second transparent resin layer is formed, the transparent film can be produced on the substrate directly or through other layers such as the third transparent film. The transparent film is preferably produced directly on the substrate.

A method for manufacturing the transparent film is not particularly limited, but the transparent film is preferably formed by means of transfer or sputtering.

Among these, the transparent film is preferably formed by means of transferring and more preferably formed by transferring and then curing. Examples of a method for transferring and curing include a method in which the photosensitive film described in the section of the electrostatic capacitance-type input device of the present invention described below is used and transfer, exposure, development, and other steps are carried out in the same manner as in the method for transferring the photosensitive transparent resin layer and the second transparent resin layer in the method for manufacturing the laminate. In this case, the photosensitive film preferably has a photocurable resin layer on the temporary support. Furthermore, the refractive index of the transparent film is more preferably adjusted to the above-described range by dispersing the metal oxide particles in the photocurable resin layer in the photosensitive film.

Meanwhile, in a case in which the transparent film is an inorganic film, the transparent film is preferably formed by means of sputtering. That is, in the laminate of the present invention, the transparent film is also preferably formed by means of sputtering.

As a method for sputtering, it is possible to preferably use the method used in JP2010-86684A, JP2010-152809A, and JP2010-257492A.

(Formation of Third Transparent Film)

A method for manufacturing the third transparent film is the same as a method for forming the transparent film having a refractive index of 1.6 to 1.78 and a thickness of 55 to 110 nm on the substrate.

The method for manufacturing the laminate preferably includes a step of curing the photosensitive transparent resin layer and the second transparent resin layer at the same time and more preferably includes a step of pattern-curing the layers at the same time. For the transfer film, it is preferable to laminate the photosensitive transparent resin layer and then laminate the second transparent resin layer without curing the photosensitive transparent resin layer. The photosensitive transparent resin layer and the second transparent resin layer which have been transferred from the transfer film obtained in the above-described manner can be cured at the same time. Therefore, the photosensitive transparent resin layer and the second transparent resin layer can be developed in a desired pattern by means of photolithography after being transferred onto the transparent electrode pattern from the transfer film of the present invention.

The method for manufacturing the laminate more preferably includes a step of developing and removing non-cured portions (in the case of light-curing, only non-exposed portions or only exposed portions) in the photosensitive transparent resin layer and the second transparent resin layer after the step of curing the photosensitive transparent resin layer and the second transparent resin layer at the same time.

[Electrostatic Capacitance-Type Input Device]

The electrostatic capacitance-type input device of the present invention includes the laminate of the present invention.

The electrostatic capacitance-type input device of the present invention is preferably produced by transferring the second transparent resin layer and the photosensitive transparent resin layer disposed adjacent to the second transparent resin layer from the transfer film of the present invention onto the transparent electrode pattern in the electrostatic capacitance-type input device.

The electrostatic capacitance-type input device of the present invention is preferably produced by curing the photosensitive transparent resin layer and the second transparent resin layer which have been transferred from the transfer film of the present invention at the same time and more preferably produced by pattern-curing the photosensitive transparent resin layer and the second transparent resin layer at the same time. Meanwhile, in a case in which the photosensitive transparent resin layer and the second transparent resin layer transferred from the transfer film of the present invention are cured at the same time, it is preferable not to peel the temporary support from the transfer film of the present invention.

The electrostatic capacitance-type input device of the present invention is more preferably produced by developing and removing the non-cured portion of the photosensitive transparent resin layer and the second transparent resin layer which have been transferred from the transfer film of the present invention and pattern-cured at the same time. Meanwhile, it is preferable to cure the photosensitive transparent resin layer and the second transparent resin layer transferred from the transfer film of the present invention at the same time and then peel the temporary support from the transfer film of the present invention before development. The electrostatic capacitance-type input device of the present invention needs to be connected to a flexible wire formed on a polyimide film at the terminal portion of a guidance wire, and is thus preferably not covered with the photosensitive transparent resin layer (and the second transparent resin layer).

Figure 13:
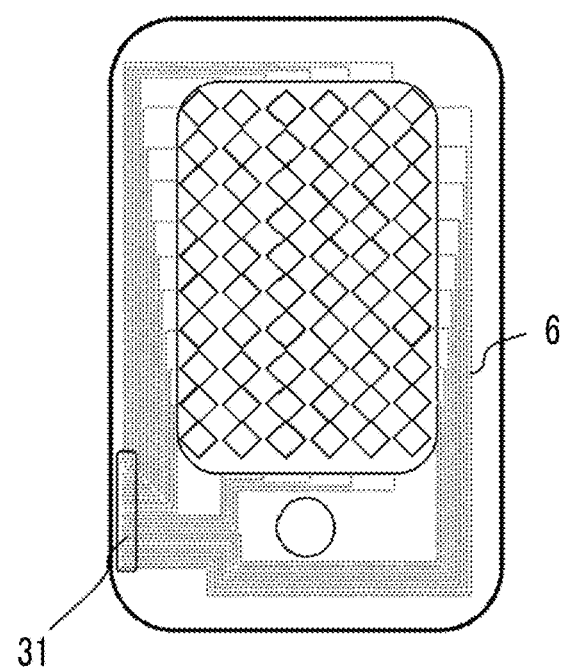
FIG. 13 is a top view illustrating still another example of the constitution of the electrostatic capacitance-type input device of the present invention and illustrates an aspect including a terminal portion (end portion. a portion that is not covered with a photosensitive transparent resin layer) of a guidance wire obtained by pattern exposure and development.

The above-described aspect is illustrated in FIG. 13. FIG. 13 illustrates an electrostatic capacitance-type input device having the following constitution which includes a guidance wire (the additional conductive element 6) of the transparent electrode pattern and a terminal portion 31 of the guidance wire.

The photosensitive transparent resin layer on the terminal portion 31 of the guidance wire forms a non-cured portion (non-exposed portion) and is thus removed by means of development, whereby the terminal portion 31 of the guidance wire is exposed.

Figure 14:
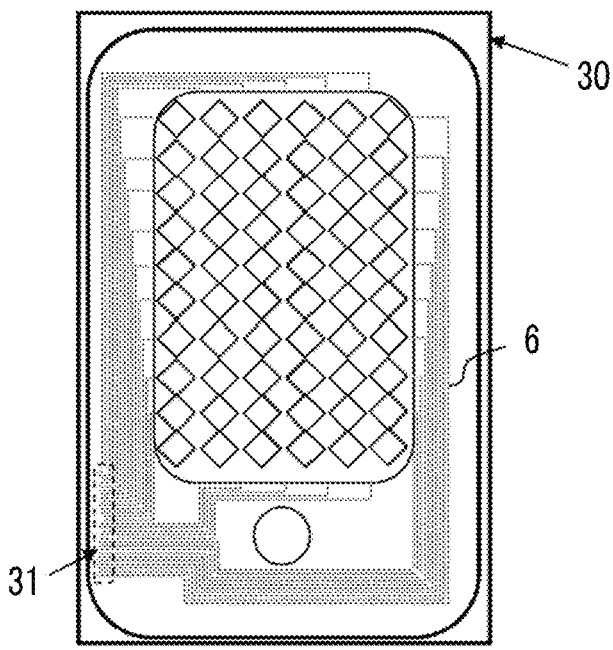
Figure 15:
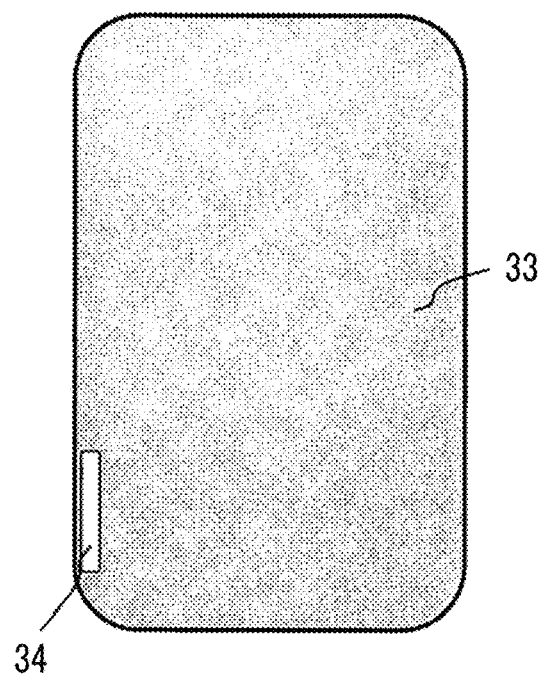
FIG. 15 is a schematic view illustrating an example of a desired pattern in which the photosensitive transparent resin layer and the second transparent resin layer are cured.

Specific exposure and development aspects are illustrated in FIGS. 14 and 15. FIG. 14 illustrates a state in which the transfer film 30 of the present invention having the photosensitive transparent resin layer and the second transparent resin layer is laminated on the transparent electrode pattern in the electrostatic capacitance-type input device by means of lamination and is to be cured by means of exposure or the like. In a case in which photolithography is used, that is, a case in which the transfer film is cured by means of exposure, the electrostatic capacitance-type input device can be obtained by pattern-exposing the cured portion (exposed portion) 33 of the photosensitive transparent resin layer and the second transparent resin layer having a shape illustrated in FIG. 15 using a mask and developing the non-exposed portions. Specifically, in FIG. 15, a cured portion (desired pattern) of the photosensitive transparent resin layer and the second transparent resin layer for preventing the terminal portion (the ejection wire portion) of the guidance wire from being covered, from which an opening portion 34 corresponding to the terminal portion of the guidance wire as the non-cured portion of the photosensitive transparent resin layer and the second transparent resin layer and the end portions of the transfer film of the present invention having the photosensitive transparent resin layer and the second transparent resin layer which protrude outside the contour of the frame portion of the electrostatic capacitance-type input device has been removed, are obtained.

Therefore, it is possible to directly connect the flexible wire produced on the polyimide film to the terminal portion 31 of the guidance wire, and thus it becomes possible to send signals from sensors to electric circuits.

The electrostatic capacitance-type input device of the present invention preferably has a laminate having the transparent electrode pattern, the second transparent resin layer disposed adjacent to the transparent electrode pattern, and the photosensitive transparent resin layer disposed adjacent to the second transparent resin layer, in which the refractive index of the second transparent resin layer is higher than the refractive index of the photosensitive transparent resin layer and the refractive index of the second transparent resin layer is 1.6 or higher.

Hereinafter, the detail of a preferred aspect of the electrostatic capacitance-type input device of the present invention will be described.

The electrostatic capacitance-type input device of the present invention has a substrate (corresponding to the substrate in the laminate of the present invention. Also referred to as the front surface plate) and at least the following elements (3) to (5), (7), or (8) on the noncontact surface side of the substrate and preferably has the laminate of the present invention:

(3) a plurality of first transparent electrode patterns in which a plurality of pad portions are formed so as to extend in a first direction through a connection portion;

(4) a plurality of second electrode patterns which are electrically insulated from the first transparent electrode patterns and are made of a plurality of pad portions formed so as to extend in a direction orthogonal to the above-described first direction;

(5) an insulating layer that electrically insulates the first transparent electrode pattern and the second electrode pattern;

(7) a second transparent resin layer formed so as to fully or partially cover the elements (3) to (5); and (8) a photosensitive transparent resin layer adjacently formed so as to cover the element (7).

Here, the second transparent resin layer (7) corresponds to the second transparent resin layer in the laminate of the present invention. In addition, the photosensitive transparent resin layer (8) corresponds to the photosensitive transparent resin layer in the laminate of the present invention. Meanwhile, generally, the photosensitive transparent resin layer is preferably a so-called transparent protective layer in well-known electrostatic capacitance-type input devices.

In the electrostatic capacitance-type input device of the present invention, the second electrode pattern (4) may or may not be a transparent electrode pattern but is preferably a transparent electrode pattern.

The electrostatic capacitance-type input device of the present invention preferably further has an additional conductive element other than the first transparent electrode pattern and the second electrode pattern which is electrically connected to at least one of the first transparent electrode pattern or the second electrode pattern (6).

Here, in a case in which the second electrode pattern (4) is not a transparent electrode pattern and the additional conductive element (6) is not provided, the first transparent electrode pattern (3) corresponds to the transparent electrode pattern in the laminate of the present invention.

In a case in which the second electrode pattern (4) is a transparent electrode pattern and the additional conductive element (6) is not provided, at least one of the first transparent electrode pattern (3) or the second electrode pattern (4) corresponds to the transparent electrode pattern in the laminate of the present invention.

In a case in which the second electrode pattern (4) is not a transparent electrode pattern and the additional conductive element (6) is provided, at least one of the first transparent electrode pattern (3) or the additional conductive element (6) corresponds to the transparent electrode pattern in the laminate of the present invention.

In a case in which the second electrode pattern (4) is a transparent electrode pattern and the additional conductive element (6) is provided, at least one of the first transparent electrode pattern (3), the second electrode pattern (4), or the additional conductive element (6) corresponds to the transparent electrode pattern in the laminate of the present invention.

The electrostatic capacitance-type input device of the present invention preferably further has the transparent film (2) between the first transparent electrode pattern (3) and the substrate, between the second electrode pattern (4) and the substrate, or between the additional conductive element (6) and the substrate. Here, the transparent film (2) preferably corresponds to the transparent film having a refractive index of 1.6 to 1.78 and a thickness of 55 to 110 nm in the laminate of the present invention from the viewpoint of further improving the transparent electrode pattern-masking property.

The electrostatic capacitance-type input device of the present invention preferably has the mask layer (1) and/or a decorative layer as necessary. The mask layer is also provided as a black trim around a region touched by a finger, a stylus, or the like in order to prevent the guidance wire of the transparent electrode pattern from being visible from the touch side or decorate the input device. The decorative layer is provided as a trim around the region touched by a finger, a stylus, or the like in order for decoration, and, for example, a white decorative layer is preferably provided.

The mask layer (1) and/or the decorative layer are preferably provided between the transparent film (2) and the substrate, between the first transparent electrode pattern (3) and the front surface plate, between the second transparent electrode pattern (4) and the substrate, or between the additional conductive element (6) and substrate. The mask layer (1) and/or the decorative layer are more preferably provided adjacent to the substrate.

Even in a case in which the electrostatic capacitance-type input device includes a variety of members, in a case in which the electrostatic capacitance-type input device of the present invention includes the second transparent resin layer disposed adjacent to the transparent electrode pattern and the photosensitive transparent resin layer disposed adjacent to the second transparent resin layer, it is possible to prevent the transparent electrode pattern from becoming visible and solve the problem of the transparent electrode pattern-masking property. Furthermore, as described above, in a case in which a constitution in which the transparent electrode pattern is sandwiched using the transparent film having a refractive index of 1.6 to 1.78 and a thickness of 55 to 110 nm and the second transparent resin layer is provided, it is possible to further improve the problem of the transparent electrode pattern-masking property.

<Constitution of Electrostatic Capacitance-Type Input Device>

First, a preferred constitution of the electrostatic capacitance-type input device of the present invention will be described together with methods for manufacturing the respective members constituting the device. FIG. 1 is a cross-sectional view illustrating a preferred constitution of the electrostatic capacitance-type input device of the present invention. FIG. 1 illustrates an aspect in which an electrostatic capacitance-type input device 10 is composed of the substrate 1, the mask layer 2, the transparent film 11 having a refractive index of 1.6 to 1.78 and a thickness of 55 to 110 nm, the first transparent electrode pattern (what is illustrated is a connection portion 3b of the first transparent electrode pattern), the second transparent electrode pattern 4, the insulating layer 5, the additional conductive element 6, the second transparent resin layer 12, and the photosensitive transparent resin layer 7.

Figure 9:
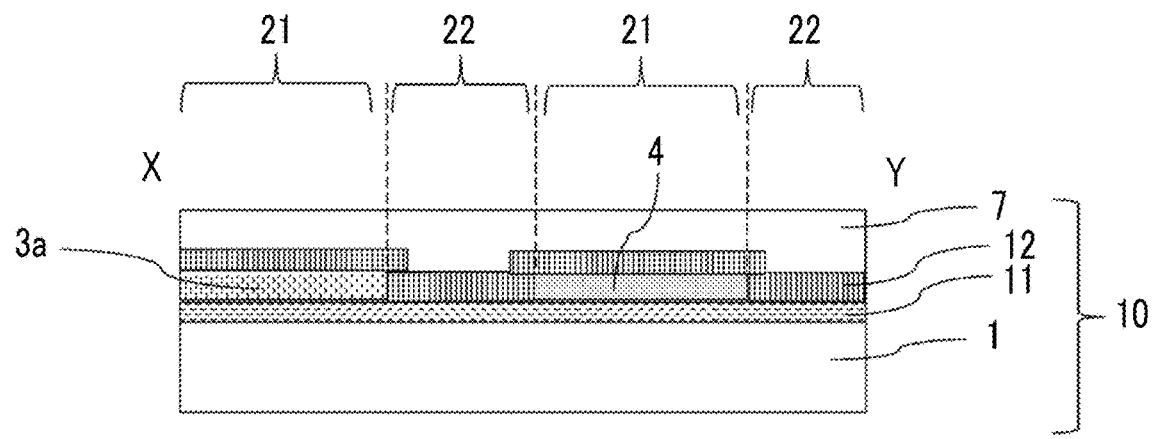
FIG. 9 is a schematic cross-sectional view illustrating another example of the constitution of the electrostatic capacitance-type input device of the present invention.

In addition, FIG. 9 which illustrates a cross-sectional view in a direction of X-Y direction in FIG. 3 described below is also, similarly, a cross-sectional view illustrating a preferred constitution of the electrostatic capacitance-type input device of the present invention. FIG. 9 illustrates an aspect in which the electrostatic capacitance-type input device 10 is composed of the substrate 1, the transparent film 11 having a refractive index of 1.6 to 1.78 and a thickness of 55 to 110 nm, the first transparent electrode pattern 3, the second transparent electrode pattern 4, the second transparent resin layer 12, and the photosensitive transparent resin layer 7.

For the substrate 1, the material exemplified as the material of the substrate in the laminate of the present invention can be used. In addition, in FIG. 1, the side of the substrate 1 on which the respective elements are provided is referred to as the noncontact surface side. In the electrostatic capacitance-type input device 10 of the present invention, input is carried out by bringing a finger or the like into contact with the contact surface (the surface opposite to the noncontact surface) of the substrate 1.

In addition, on the noncontact surface side of the substrate 1, the mask layer 2 is provided. The mask layer 2 is a trim-shaped pattern around a display region formed on the noncontact surface side of a touch panel substrate and is formed in order to prevent the guidance wire and the like from being visible.

Figure 2:
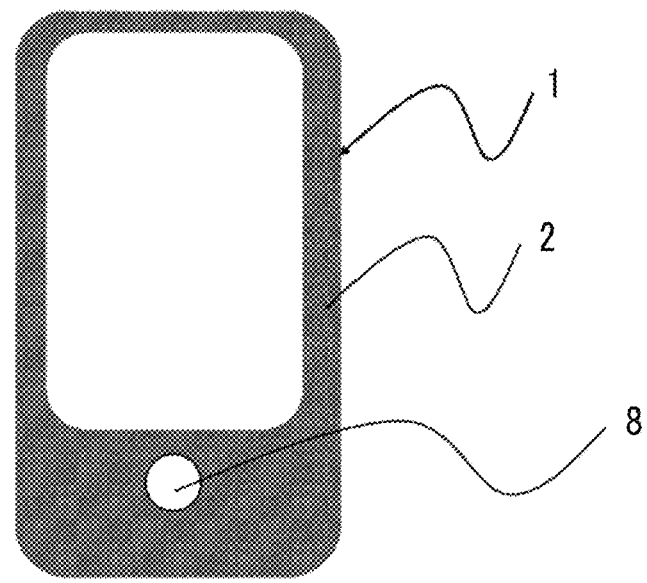
FIG. 2 is an explanatory view illustrating an example of a substrate in the present invention.

In the electrostatic capacitance-type input device 10 of the present invention, the mask layer 2 is provided so as to cover a part of the region (a region other than the input surface in FIG. 2) of the substrate 1 as illustrated in FIG. 2. Furthermore, an opening portion 8 can be provided in a part of the substrate 1 as illustrated in FIG. 2. In the opening portion 8, a press-type mechanical switch can be installed.

In FIG. 1, on the noncontact surface of the substrate 1, a plurality of first transparent electrode patterns 3 (what is illustrated in FIG. 1 is the connection portion 3b of the first transparent electrode pattern) in which a plurality of the pad portions are formed so as to extend in the first direction through the connection portions, a plurality of second transparent electrode patterns 4 which are electrically insulated from the first transparent electrode pattern 3 and are made of a plurality of pad portions formed so as to extend in a direction orthogonal to the first direction, and the insulating layer 5 that electrically insulates the first transparent electrode pattern 3 and the second transparent electrode pattern 4 is formed. For the first transparent electrode pattern 3, the second transparent electrode pattern 4, and the additional conductive element 6 described below, the materials exemplified as the material of the transparent electrode pattern in the laminate of the present invention can be used, and ITO films are preferred.

In addition, at least one of the first transparent electrode pattern 3 or the second transparent electrode pattern 4 can be installed so as to astride both regions of the noncontact surface of the transparent substrate 1 and the surface of the mask layer 2 opposite to the substrate 1. FIG. 1 illustrates a view in which the second transparent electrode pattern 4 is installed so as to astride both regions of the noncontact surface of the substrate 1 and the surface of the mask layer 2 opposite to the substrate 1.

As described above, even in a case in which a photosensitive film is laminated so as to astride the mask layer which requires a certain thickness and the noncontact surface of the substrate (the rear surface of the contact surface), in a case in which a photosensitive film having a specific layer constitution described below is used, lamination causing no generation of foam in the boundary with the mask portion becomes possible with a simple step without using an expensive facility such as a vacuum laminator.

The first transparent electrode pattern 3 and the second transparent electrode pattern 4 will be described using FIG. 3. FIG. 3 is an explanatory view illustrating an example of the first transparent electrode pattern and the second transparent electrode pattern in the present invention. As illustrated in FIG. 3, in the first transparent electrode pattern 3, the pad portions 3a are formed so as to extend in the first direction C through the connection portion 3b. In addition, the second transparent electrode pattern 4 is electrically insulated from the first transparent electrode pattern 3 using the insulating layer 5 and is composed of a plurality of the pad portions formed so as to extend in a direction orthogonal to the first direction (a second direction D in FIG. 3). Here, in a case in which the first transparent electrode pattern 3 is formed, the pad portions 3a and the connection portions 3b may be integrally produced or it is also possible to produce the connection portions 3b alone and integrally produce (pattern) the pad portions 3a and the second transparent electrode pattern 4. In a case in which the pad portions 3a and the second transparent electrode pattern 4 are integrally produced (patterned), the respective layers are formed so that some of the connection portions 3b and some of the pad portions 3a are coupled together as illustrated in FIG. 3 and the first transparent electrode pattern 3 and the second transparent electrode pattern 4 are electrically insulated from each other using the insulating layer 5.

In addition, in FIG. 3, a region in which the first transparent electrode pattern 3, the second transparent electrode pattern 4, or the additional conductive element 6 described below is not formed corresponds to the non-patterned region 22 in the laminate of the present invention.

In FIG. 1, the additional conductive element 6 is installed on the surface side of the mask layer 2 opposite to the substrate 1. The additional conductive element 6 is electrically connected to at least one of the first transparent electrode pattern 3 (what is illustrated in FIG. 1 is a connection portion 3b of the first transparent electrode pattern) or the second transparent electrode pattern 4 and is a separate element from the first transparent electrode pattern 3 and the second transparent electrode pattern 4.

FIG. 1 illustrates an aspect in which the additional conductive element 6 is connected to the second transparent electrode pattern 4.

In addition, in FIG. 1, the photosensitive transparent resin layer 7 is installed so as to cover all of the respective constituent elements. The photosensitive transparent resin layer 7 may be composed so as to cover only part of the respective constituent elements. The insulating layer 5 and the photosensitive transparent resin layer 7 may be made of the same material or different materials. As the material constituting the insulating layer 5, it is possible to preferably use the material exemplified as the material of the photosensitive transparent resin layer or the second transparent resin layer in the laminate of the present invention.

<Method for Manufacturing Electrostatic Capacitance-Type Input Device>

Figure 4:
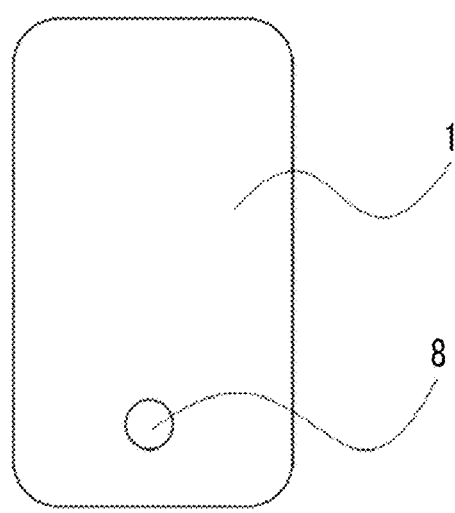
FIG. 4 is a top view illustrating an example of the substrate in which an opening portion is formed.
Figure 5:
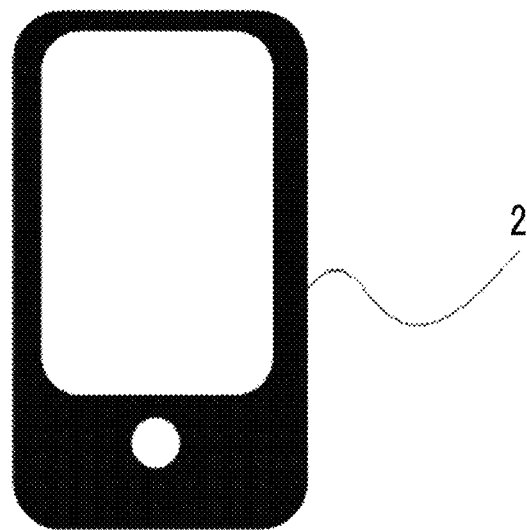
FIG. 5 is a top view illustrating an example of the substrate on which a mask layer is formed.
Figure 6:
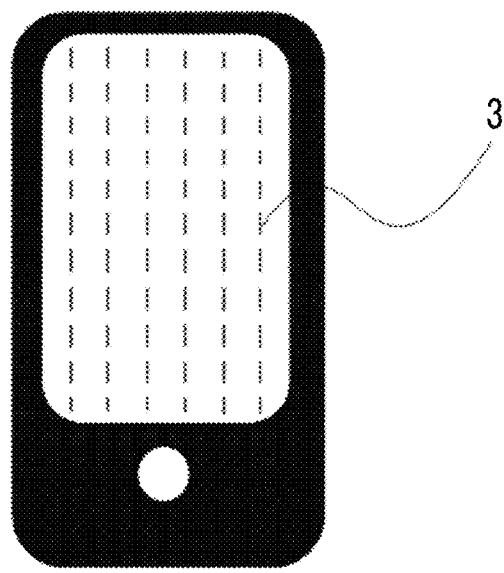
FIG. 6 is a top view illustrating an example of the substrate on which a first transparent electrode pattern is formed.
Figure 7:
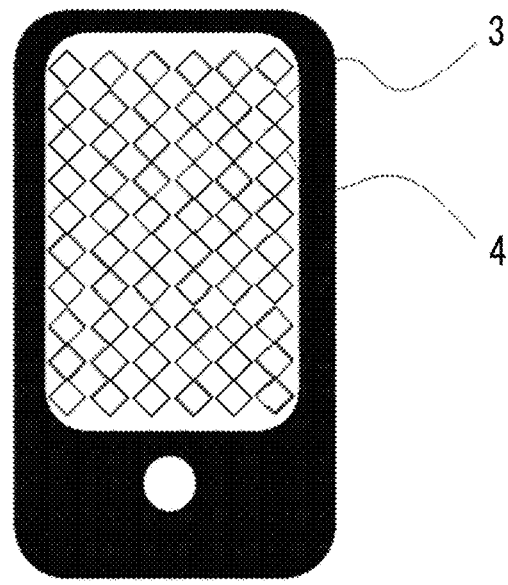
FIG. 7 is a top view illustrating an example of the substrate on which the first transparent electrode pattern and a second transparent electrode pattern are formed.
Figure 8:
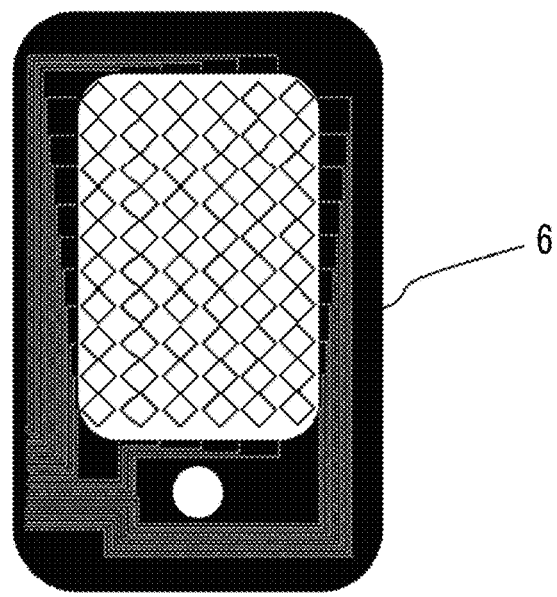
FIG. 8 is a top view illustrating an example of the substrate on which a conductive element different from the first and second transparent electrode patterns is formed.

Examples of an aspect being formed in a process for manufacturing the electrostatic capacitance-type input device of the present invention include aspects of FIGS. 4 to 8. FIG. 4 is a top view illustrating an example of the transparent substrate 1 in which the opening portion 8 is formed and which is made of reinforced glass. FIG. 5 is a top view illustrating an example of the substrate in which the mask layer 2 is formed. FIG. 6 is a top view illustrating an example of the substrate in which the first transparent electrode pattern 3 is formed. FIG. 7 is a top view illustrating an example of the substrate in which the first transparent electrode pattern 3 and the second transparent electrode pattern 4 are formed. FIG. 8 is a top view illustrating an example of the substrate in which the conductive element 6 other than the first and second transparent electrode patterns is formed. These aspects illustrate examples in which the following description is specified, and the scope of the present invention is not interpreted to be limited by these drawings.

In a method for manufacturing the electrostatic capacitance-type input device, in a case in which the second transparent resin layer 12 and the photosensitive transparent resin layer 7 are formed, the layers can be formed by transferring the second transparent resin layer and the photosensitive transparent resin layer onto the surface of the substrate 1 on which the respective elements are arbitrarily formed using the transfer film of the present invention.

In the method for manufacturing the electrostatic capacitance-type input device, at least one element of the mask layer 2, the first transparent electrode pattern 3, the second transparent electrode pattern 4, the insulating layer 5, or the additional conductive element 6 is preferably formed using the photosensitive film having the temporary support and the photocurable resin layer in this order.

In a case in which the respective elements (at least one element of the mask layer 2, the first transparent electrode pattern 3, the second transparent electrode pattern 4, the insulating layer 5, and the additional conductive element 6) are formed using the transfer film of the present invention or the photosensitive film, even in the substrate having the opening portion, resist components do not leak through the opening portion, and, particularly, in the mask layer in which a light-blocking pattern needs to be formed up to immediately above the boundary line of the edge portion of the substrate, resist components do not leak from the edge portion of the substrate. Therefore, the noncontact surface (the rear side of the contact surface) of the substrate is not contaminated, and it is possible to manufacture touch panels having a reduced thickness and a reduced weight with simple steps.

In a case in which the mask layer, the insulating layer, and the conductive photocurable resin layer are used, in a case in which the permanent materials of the first transparent electrode pattern, the second transparent electrode pattern, the additional conductive element, and the like are formed using the photosensitive film, the photosensitive film may be laminated on the substrate and then be pattern-exposed as necessary. The photosensitive film may be a negative-type material or a positive-type material. The non-exposed portions in a case in which the photosensitive film is a negative-type material or the exposed portions in the case of a positive-type material are removed by means of a development treatment, whereby patterns can be obtained. In the development, the thermoplastic resin layer and the photocurable resin layer may be developed and removed using separate fluids or may be removed using the same fluid. Well-known development facilities such as a brush and a high-pressure jet may be combined together as necessary. After the development, post exposure and post baking may be carried out as necessary.

(Photosensitive Film)

The photosensitive film other than the transfer film of the present invention which is preferably used when the electrostatic capacitance-type input device of the present invention is manufactured is described in [0222] to [0255] of JP2014-178922A, the content of which is incorporated herein by reference.

<Image Display Device>

To the electrostatic capacitance-type input device of the present invention and image display devices comprising this electrostatic capacitance-type input device as a constituent element, it is possible to apply the constitution disclosed by "Advanced touch panel technology" (published by Techno Times Co., Ltd. on Jul. 6, 2009), "Technology and development of touch panels" edited by Yuji Mitani, CMC Publishing Co., Ltd. (December 2004), FPD International 2009 Forum T-11 lecture textbook, Cypress Semiconductor Corporation application note AN2292, and the like.

EXAMPLES

Hereinafter, the present invention will be more specifically described using examples. Materials, amounts used, ratios, processing contents, processing orders, and the like described in the following examples can be appropriately modified within the scope of the gist of the present invention. Therefore, the scope of the present invention is not limited to specific examples described below. Meanwhile, unless particularly otherwise described, "parts" are mass-based.

Examples 1 to 23 and Comparative Examples 1 and 2

1. Preparation of Coating Fluid

<Preparation of Coating Fluid for Photosensitive Transparent Resin Layer>

Materials A-1 to A-19 which were coating fluids for a photosensitive transparent resin layer were prepared so as to have compositions as shown in Table 1.

TABLE 1

| | | Material A-1 | Material A-2 | Material A-3 | Material A-4 |
|---|---|---|---|---|---|
| Binder polymer | Compound G (acid value: 95 mgKOH/g) | 406.3 | 380.7 | 331.5 | 233.2 |
| Photopolymerizable compound | Tricyclodecane dimethanol diacrylate (A-DCP, manufactured by Shin-Nakamura Chemical Co., Ltd.) | 53.09 | 49.75 | 43.33 | 30.47 |
| | Carboxylic acid-containing monomer (ARONIX TO-2349, manufactured by Toagosei Co., Ltd.) | 8.85 | 8.29 | 7.22 | 5.08 |
| | Urethane acrylate 8UX-015A (manufactured by Taisei Fine Chemical Co., Ltd.) | 26.55 | 24.88 | 21.66 | 15.24 |
| Photopolymerization initiator | Ethanone, 1-[9-ethyl-6-(2-methylbenzoyl)-9H-carbazole-3-yl]-, 1-(O-acetyloxime) (trade name: OXE-02, manufactured by BASF) | 1.02 | 0.95 | 0.83 | 0.58 |
| | 2-Methyl-1-(4-methyl thiophenyl)-2-morpholino-propan-1-one (trade name: IRGACURE 907, manufactured by BASF) | 2.03 | 1.90 | 1.66 | 1.17 |
| Blocked isocyanate | Compound H | 48.22 | 48.22 | 48.22 | 48.22 |
| Rosin compound | Rosin R | | | | |
| | Acid-modified Rosin A | 14.47 | 28.93 | 57.86 | 115.72 |
| | Hydrogenated Rosin B | | | | |
| | PINECRYSTAL PR-580 (manufactured by Arakawa Chemical Industries, Ltd.) hydrogenated rosin C | | | | |
| | PINECRYSTAL KE-604 (manufactured by Arakawa Chemical Industries, Ltd.) acid-modified rosin D | | | | |
| | PINECRYSTAL KE-100 (manufactured by Arakawa Chemical Industries, Ltd.) esterified rosin E | | | | |
| Additive | MEGAFACE F551 (manufactured by DIC Corporation) | 0.78 | 0.78 | 0.78 | 0.78 |
| Solvent | Methyl ethyl ketone | 438.7 | 455.6 | 486.9 | 549.6 |
| Rosin compound in solid content of photosensitive transparent resin layer (% by mass) | | 5.0 | 10.0 | 20.0 | 40.0 |
| Total | | 1000 | 1000 | 1000 | 1000 |

| | | Material A-5 | Material A-6 | Material A-7 | Material A-8 | Material A-9 |
|---|---|---|---|---|---|---|
| Binder polymer | Compound G (acid value: 95 mgKOH/g) | 184.4 | 406.3 | 380.7 | 331.5 | 233.2 |
| Photopolymerizable compound | Tricyclodecane dimethanol diacrylate (A-DCP, manufactured by Shin-Nakamura Chemical Co., Ltd.) | 24.10 | 53.09 | 49.75 | 43.33 | 30.47 |
| | Carboxylic acid-containing monomer (ARONIX TO-2349, manufactured by Toagosei Co., Ltd.) | 12.05 | 8.85 | 8.29 | 7.22 | 5.08 |
| | Urethane acrylate 8UX-015A (manufactured by Taisei Fine Chemical Co., Ltd.) | 4.02 | 26.55 | 24.88 | 21.66 | 15.24 |

TABLE 1-continued

| | | | | | | |
|---|---|---|---|---|---|---|
| Photopolymerization initiator | Ethanone, 1-[9-ethyl-6-(2-methylbenzoyl)-9H-carbazole-3-yl]-, 1-(O-acetyloxime) (trade name: OXE-02, manufactured by BASF) | 0.46 | 1.02 | 0.95 | 0.83 | 0.58 |
| | 2-Methyl-1-(4-methyl thiophenyl)-2-morpholino-propan-1-one (trade name: IRGACURE 907, manufactured by BASF) | 0.92 | 2.03 | 1.90 | 1.66 | 1.17 |
| Blocked isocyanate | Compound H | 48.33 | 48.22 | 48.22 | 48.22 | 48.22 |
| Rosin compound | Rosin R | | | | | |
| | Acid-modified Rosin A | 145.00 | | | | |
| | Hydrogenated Rosin B PINECRYSTAL PR-580 (manufactured by Arakawa Chemical Industries, Ltd.) | | 14.47 | 28.93 | 57.86 | 115.72 |
| | hydrogenated rosin C PINECRYSTAL KE-604 (manufactured by Arakawa Chemical Industries, Ltd.) | | | | | |
| | acid-modified rosin D PINECRYSTAL KE-100 (manufactured by Arakawa Chemical Industries, Ltd.) esterified rosin E | | | | | |
| Additive | MEGAFACE F551 (manufactured by DIC Corporation) | 0.78 | 0.78 | 0.78 | 0.78 | 0.78 |
| Solvent | Methyl ethyl ketone | 571.0 | 438.7 | 455.6 | 486.9 | 549.6 |
| Rosin compound in solid content of photosensitive transparent resin layer (% by mass) | | 50.0 | 5.0 | 10.0 | 20.0 | 40.0 |
| | Total | 991 | 1000 | 1000 | 1000 | 1000 |

TABLE 2

| | | Material A-10 | Material A-11 | Material A-12 | Material A-13 | Material A-14 |
|---|---|---|---|---|---|---|
| Binder polymer | Compound G (acid value: 95 mgKOH/g) | 380.7 | 331.5 | 443.3 | 394.0 | 380.7 |
| Photopolymerizable compound | Tricyclodecane dimethanol diacrylate (A-DCP, manufactured by Shin-Nakamura Chemical Co., Ltd.) | 49.75 | 43.33 | 57.92 | 51.48 | 49.75 |
| | Carboxylic acid-containing monomer (ARONIX TO-2349, manufactured by Toagosei Co., Ltd.) | 8.29 | 7.22 | 9.65 | 8.58 | 8.29 |
| | Urethane acrylate 8UX-015A (manufactured by Taisei Fine Chemical Co., Ltd.) | 24.88 | 21.66 | 28.96 | 25.74 | 24.88 |
| Photopolymerization initiator | Ethanone, 1-[9-ethyl-6-(2-methylbenzoyl)-9H-carbazole-3-yl]-, 1-(O-acetyloxime) (trade name: OXE-02, manufactured by BASF) | 0.95 | 0.83 | 1.11 | 0.99 | 0.95 |
| | 2-Methyl-1-(4-methyl thiophenyl)-2-morpholino-propan-1-one (trade name: IRGACURE 907, manufactured by BASF) | 1.90 | 1.66 | 2.22 | 1.97 | 1.90 |
| Blocked isocyanate | Compound H | 48.22 | 48.22 | | | 48.22 |
| Rosin compound | Rosin R | | | | | |
| | Acid-modified Rosin A | | | | | |
| | Hydrogenated Rosin B PINECRYSTAL PR-580 (manufactured by Arakawa Chemical Industries, Ltd.) hydrogenated rosin C | 28.93 | 57.86 | 29.00 | 58.00 | |
| | PINECRYSTAL KE-604 (manufactured by Arakawa Chemical Industries, Ltd.) acid-modified rosin D | | | | | 28.93 |
| | PINECRYSTAL KE-100 (manufactured by Arakawa Chemical Industries, Ltd.) esterified rosin E | | | | | |
| Additive | MEGAFACE F551 (manufactured by DIC Corporation) | 0.78 | 0.78 | 0.78 | 0.78 | 0.78 |
| Solvent | Methyl ethyl ketone | 455.6 | 486.9 | 427.1 | 458.5 | 455.6 |
| Rosin compound in sold content of photosensitive transparent resin layer (% by mass) | | 10.0 | 20.0 | 10.0 | 20.0 | 10.0 |
| | Total | 1000 | 1000 | 1000 | 1000 | 1000 |

| | | Material A-15 | Material A-16 | Material A-17 | Material A-18 | Material A-19 |
|---|---|---|---|---|---|---|
| Binder polymer | Compound G (acid value: 95 mgKOH/g) | 380.7 | 380.7 | 331.5 | 429.9 | 449.3 |
| Photopolymerizable compound | Tricyclodecane dimethanol diacrylate (A-DCP, manufactured by Shin-Nakamura Chemical Co., Ltd.) | 49.75 | 49.75 | 43.33 | 56.18 | 64.37 |
| | Carboxylic acid-containing monomer (ARONIX TO-2349, manufactured by Toagosei Co., Ltd.) | 8.29 | 8.29 | 7.22 | 9.36 | 10.73 |
| | Urethane acrylate 8UX-015A (manufactured by Taisei Fine Chemical Co., Ltd.) | 24.88 | 24.88 | 21.66 | 28.09 | 32.18 |
| Photopolymerization initiator | Ethanone, 1-[9-ethyl-6-(2-methylbenzoyl)-9H-carbazole-3-yl]-, 1-(O-acetyloxime) (trade name: OXE-02, manufactured by BASF) | 0.95 | 0.95 | 0.83 | 1.08 | 1.22 |
| | 2-Methyl-1-(4-methyl thiophenyl)-2-morpholino-propan-1-one (trade name: IRGACURE 907, manufactured by BASF) | 1.90 | 1.90 | 1.66 | 2.15 | 2.46 |

TABLE 2-continued

| | | | | | | |
|---|---|---|---|---|---|---|
| Blocked isocyanate | Compound H | 48.22 | 48.22 | 48.22 | 48.22 | |
| Rosin compound | Rosin R | | 28.93 | 57.86 | | |
| | Acid-modified Rosin A | | | | | |
| | Hydrogenated Rosin B | | | | | |
| | PINECRYSTAL PR-580 (manufactured by Arakawa Chemical Industries, Ltd.) hydrogenated rosin C | | | | | |
| | PINECRYSTAL KE-604 (manufactured by Arakawa Chemical Industries, Ltd.) acid-modified rosin D | | | | | |
| | PINECRYSTAL KE-100 (manufactured by Arakawa Chemical Industries, Ltd.) esterified rosin E | 28.93 | | | | |
| Additive | MEGAFACE F551 (manufactured by DIC Corporation) | 0.78 | 0.78 | 0.78 | 0.78 | 0.78 |
| Solvent | Methyl ethyl ketone | 455.6 | 455.6 | 486.9 | 424.3 | 439.0 |
| Rosin compound in sold content of photosensitive transparent resin layer (% by mass) | | 10.0 | 10.0 | 20.0 | 0.0 | 0.0 |
| | Total | 1000 | 1000 | 1000 | 1000 | 1000 |

The details of compounds that were used for Materials A-1 to A-19 will be described below.

(Binder Polymer)

A solution of Compound G represented by the following structural formula having a solid content concentration of 36% by mass was used as a binder polymer.

Compound G

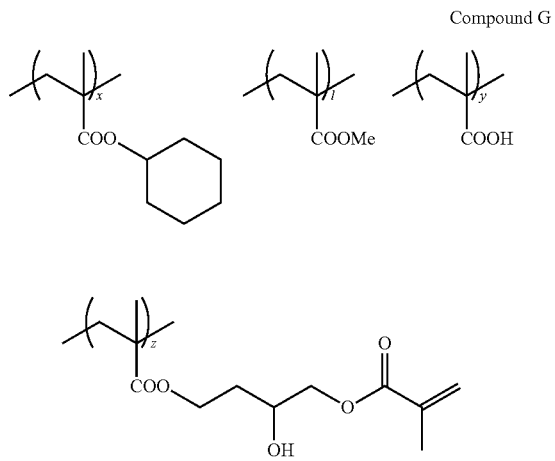

x/l/y/z = 5.15/2/26.5/20

(Blocked Isocyanate)

Compound H was synthesized using a method in Synthesis Example 1.

Synthesis Example 1

A nitrogen atmosphere was formed in a four-neck flask equipped with a stirrer, a thermometer, a reflux cooling pipe, a nitrogen blowing pipe, and a dripping funnel, hexamethylene diisocyanate (HDI) (600 parts) was prepared, and the temperature in a reactor was held at 70° C. while stirring hexamethylene diisocyanate. Tetramethylammoniumcaprylate was added thereto as an isocyanuration catalyst, and phosphoric acid was added thereto when the yield reached 40% by mass, thereby stopping the reaction. The reaction liquid was filtered, and then unreacted HDI was removed using a thin film evaporator, thereby obtaining a polyisocyanate. The viscosity at 25° C. of the obtained polyisocyanate was 3 Pa·s, the concentration of isocyanate groups was 23.0% by mass, the number-average molecular weight was 670, the average number of isocyanate groups was 3.3, and the concentration of the unreacted HDI was 0.2% by mass. The viscosity at 25° C. of a compound capable of reacting with acids by heating such as a blocked isocyanate was measured using the following method.

The viscosity at 25° C. of a polyisocyanate resin composition was measured using an E-type viscometer RE-85U (manufactured by Toki Sangyo Co., Ltd.).

The obtained polyisocyanate (100 parts) and propylene glycol-1-monomethyl ether-2-acetate which was a synthesis solvent (50 parts) were prepared in a nitrogen atmosphere using the same apparatus as described above and were mixed together at 50° C. so as to produce a homogeneous solution. After that, methoxypolyethylene glycol which was a compound having a hydrophilic group (number-average molecular weight: 680, resin-equivalent hydroxyl value: 82 mgKOH/g) (52.7 parts) was added thereto, and the solution was heated to 120° C. and held for two hours. After that, the reaction liquid was set to 70° C., and then methyl ethyl ketoxime which was a blocking agent (40.2 parts) was added thereto. After one hour, the fact that there was no absorption of isocyanate groups was confirmed by measuring the infrared spectrum of the reaction liquid, thereby obtaining a solution including Compound H which was a blocked polyisocyanate. The concentration of the solid content of this solution was set to 75% by mass by means of condensation, and the solution was used as Compound H in tests.

(Rosin Compound)
—Manufacturing of Rosin R—

Unrefined Chinese gum rosin (acid value: 171 mgKOH/g, softening point: 74° C., tone: 6G, a mixture including 15% by mass or more of abietic acid, palustric acid, and isopimaric acid with respect to the entire rosin compound) (3,000 g) was prepared in a sealable reaction container including a stirrer, a reflux cooling pipe, and a nitrogen introduction pipe and was distilled at a reduced pressure of 400 Pa under nitrogen purging, thereby obtaining a main distillate having an acid value of 176.3 mgKOH/g, a softening point of 80.5° C., and a tone Gardner of 2 (yield: 86.3% by mass) as rosin (refined gum rosin) R.

In the present specification, the acid values of individual rosin compounds are values measured according to the method described in Japanese Industrial Standards (JIS) K-5601. In addition, in the present specification, the softening points of individual rosin compounds are values measured using the ring-and-ball method of JIS K-2531.

—Manufacturing of Acid-Modified Rosin A—

The rosin produced above (refined gum rosin) R (1,000 parts by mass) was prepared in a reaction container including a stirrer, a manifold-attached reflux cooling pipe, and a thermometer and was heated up to 180° C. while being stirred in a nitrogen atmosphere, thereby melting the rosin. Next, fumaric acid (267 parts by mass) was prepared, heated up to 230° C. under stirring, held at 230° C. for one hour, and then cooled, thereby obtaining a solid-form resin of an acid-modified rosin A. The solid-form resin of the acid-modified rosin A had an acid value of 342.0 mgKOH/g and a softening point of 125° C.

—Manufacturing of Hydrogenated Rosin B—

A hydrogenated rosin B (a mixture including 20% by mass or more of an abietic acid derivative, a palustric acid derivative, and an isopimaric acid derivative with respect to the entire rosin compound) was synthesized with reference to Example 1 of JP2001-181400A.

The solid-form resin of the hydrogenated rosin B had an acid value of 176 mgKOH/g and a softening point of 80° C.

—Hydrogenated Rosin C, Acid-Modified Rosin D, and Esterified Rosin E—

PINECRYSTAL PR-580, PINECRYSTAL KE-604, and PINECRYSTAL KE-100 (all manufactured by Arakawa Chemical Industries, Ltd.) were respectively used as a hydrogenated rosin C, an acid-modified rosin D, and an esterified rosin E.

<Preparation of Coating Fluid for Second Transparent Resin Layer>

Materials B-1 and B-2 which were coating fluids for a second transparent resin layer were prepared so as to have compositions as shown in Table 3.

2. Production of Transfer Films

Any one of Materials A-1 to A-19 for a photosensitive transparent resin layer was applied onto a 16 μm-thick temporary support which was a polyethylene terephthalate film using slit-shaped nozzles while adjusting the application amount so that the thickness of the dried photosensitive transparent resin layer reached a thickness shown in Table 5, thereby forming a photosensitive transparent resin layer. After a solvent was volatilized in a drying zone at 120° C., any one of Materials B-1 and B-2 was applied using slit-shaped nozzles and dried while changing the application amount so that the dried thickness became a thickness of 0.1 μm and dried, thereby forming a second transparent resin layer.

3. Production of Transparent Electrode Pattern Films Used to Produce Laminates

<Formation of Transparent Film>

A corona discharge treatment was carried out on a cycloolefin resin film having a thickness of 38 μm and a refractive index of 1.53 for three seconds using a high-frequency oscillator and a wire electrode having a diameter of 1.2 mm at an output voltage of 100% and an output of 250 W under conditions of an electrode length of 240 mm and a distance between working electrodes of 1.5 mm, thereby reforming the surface. The obtained film was used as a transparent film substrate.

Next, the material of Material-C shown in Table 4 was applied onto the transparent film substrate using slit-shaped nozzles, then, was irradiated with ultraviolet rays (at an integral of light of 300 mJ/cm$^2$), and was dried at approximately 110° C., thereby producing a transparent film having a refractive index of 1.60 and a film thickness of 80 nm.

TABLE 3

| Material | Material B-1 | Material B-2 |
|---|---|---|
| NanoUse OZ-S30M: ZrO$_2$ particles, methanol dispersion liquid (nonvolatile component: 30.5%) manufactured by Nissan Chemical Industries, Ltd. | 0.00 | 4.20 |
| Ammonia water (2.5%) | 7.84 | 7.84 |
| Copolymer resin of methacrylic acid/allyl methacrylate (weight-average molecular weight: 25,000, compositional ratio = 40/60, nonvolatile component: 99.8%) | 6.00 | 0.50 |
| ARONIX TO-2349: Carboxylic acid-containing monomer (manufactured by Toagosei Co., Ltd.) | 0.50 | 0.04 |
| Benzotriazole BT120 (manufactured by Johoku Chemical Co., Ltd.) | 0.50 | 0.04 |
| MEGAFACE F444 (manufactured by DIC Corporation) | 0.01 | 0.01 |
| Ion-exchange water | 25.16 | 27.38 |
| Methanol | 60.00 | 60.00 |
| Total (parts by mass) | 100 | 100 |

TABLE 4

| Material | Material-C |
|---|---|
| ZrO$_2$: manufactured by Solar Co., Ltd., ZR-010 | 2.08 |
| DPHA liquid (dipentaerythritol hexaacrylate: 38%, dipentaerythritol pentaacrylate: 38%, 1-methoxy-2-propyl acetate: 24%) | 0.29 |
| Urethane-based monomer: NK OLIGOMER UA-32P, manufactured by Shin-Nakamura Chemical Co., Ltd., nonvolatile component: 75%, 1-methoxy-2-propyl acetate: 25% | 0.14 |
| Monomer mixture (the photopolymerizable compound (b2-1) described in Paragraph [0111] of JP2012-78528A, n = 1: the content ratio of tripentaerythritol octaacrylate: 85%, the sum of n = 2 and n = 3 as impurities: 15%) | 0.36 |
| Polymer solution 1 (Structural Formula P-25 described in [0058] of JP2008-146018A: the weight-average molecular weight = 35,000, solid content: 45%, 1-methoxy-2-propyl acetate: 15%, 1-methoxy-2-propanol: 40%) | 1.89 |
| Photoradical photopolymerization initiator: 2-benzyl-2-dimethylamino-1-(4-morpholinophenyl)-butanone (IRGACURE 379, manufactured by BASF) | 0.03 |
| Photopolymerization initiator: KAYACURE DETX-S (alkylthioxanthone manufactured by Nippon Kayaku Co., Ltd.) | 0.03 |
| Polymer solution 2 (polymer having a structural formula represented by Formula (3): solution having a weight-average molecular weight = 15,000, nonvolatile content: 30% by mass, methyl ethyl ketone: 70% by mass) | 0.01 |
| 1-Methoxy-2-propyl acetate | 38.73 |
| Methyl ethyl ketone | 56.80 |
| Total (parts by mass) | 100 |

"%" in the table is identical to "% by mass". Meanwhile, "wt %" in the specification is identical to "% by mass".

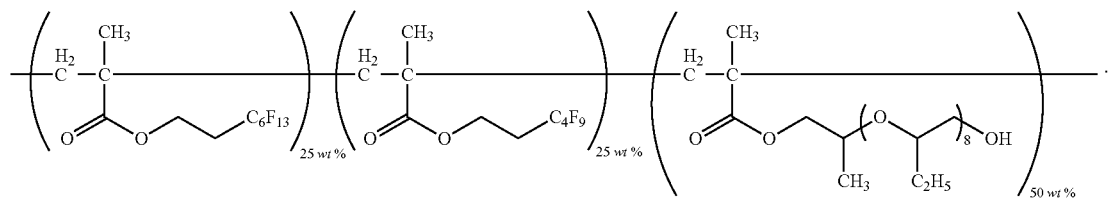

<Formation of Transparent Electrode Pattern>

A film having the transparent film laminated on the transparent film substrate obtained above was introduced into a vacuum chamber, and a 40 nm-thick ITO thin film having a refractive index of 1.82 was formed using an ITO target (indium:tin=95:5 (molar ratio)) in which the content ratio of SnO$_2$ was 10% by mass by means of direct current (DC) magnetron sputtering (conditions: the temperature of the transparent film substrate was 150° C., the argon pressure was 0.13 Pa, and the oxygen pressure was 0.01 Pa), thereby obtaining a film having the transparent film and a transparent electrode layer formed on the transparent film substrate. The surface electrical resistance of the ITO thin film was 80Ω/☐ (Ω per square).

(Preparation of Photosensitive Film for Etching E1)

A coating fluid for a thermoplastic resin layer made of Formulation H1 was applied and dried on a 75 μm-thick polyethylene terephthalate film temporary base material using slit-shaped nozzles. Next, a coating fluid for an interlayer made of Formulation P1 was applied and dried. Furthermore, a coating fluid for a photocurable resin layer for etching made of Formulation E1 was applied and dried. A laminate made up of a thermoplastic resin layer having a dried film thickness of 15.1 μm, an interlayer having a dried film thickness of 1.6 μm, and a photocurable resin layer for etching having a dried film thickness of 2.0 μm was obtained on a temporary base material in the above-described manner, and finally, a protective film (12 μm-thick polypropylene film) was pressed thereonto. A photosensitive film for etching E1 in which the temporary base material, the thermoplastic resin layer, the interlayer, and the photocurable resin layer for etching were integrated together was produced.

—Coating Fluid for Photocurable Resin Layer for Etching: Formulation E1—

Methyl methacrylate/styrene/methacrylic acid copolymer (copolymer composition (% by mass): 31/40/29, weight-average molecular weight of 60,000, acid value: 163 mgKOH/g): 16 parts by mass Monomer 1 (trade name: BPE-500, manufactured by Shin-Nakamura Chemical Co., Ltd.): 5.6 parts by mass Adduct of hexamethylene diisocyanate and 0.5 mol of tetraethylene oxide monomethacrylate: 7 parts by mass Cyclohexane dimethanol monoacrylate as a compound having one polymerizable group in the molecule: 2.8 parts by mass 2-Chloro-N-butylacridone: 0.42 parts by mass 2,2-Bis(ortho-chlorophenyl)-4,4',5,5'-tetraphenyl biimidazole: 2.17 parts by mass Malachite green oxalate: 0.02 parts by mass Leuco crystal violet: 0.26 parts by mass Phenothiazine: 0.013 parts by mass Surfactant (trade name: MEGAFACE F-780F, manufactured by DIC Corporation): 0.03 parts by mass Methyl ethyl ketone: 40 parts by mass 1-Methoxy-2-propanol: 20 parts by mass Meanwhile, the viscosity of the coating fluid for a photocurable resin layer for etching E1 after the removal of the solvent at 100° C. was 2,500 Pa·sec.

——Coating Fluid for Thermoplastic Resin Layer: Formulation H1——

Methanol: 11.1 parts by mass

Propylene glycol monomethyl ether acetate: 6.36 parts by mass

Methyl ethyl ketone: 52.4 parts by mass

Methyl methacrylate/2-ethylhexyl acrylate/benzyl methacrylate/methacrylic acid copolymer (copolymerization compositional ratio (molar ratio)=55/11.7/4.5/28.8, molecular weight=100,000, Tg≈70° C.): 5.83 parts by mass Styrene/acrylic acid copolymer (copolymerization compositional ratio (molar ratio)=63/37, weight-average molecular weight=10,000, Tg≈100° C.): 13.6 parts by mass Monomer 1 (trade name: BPE-500, manufactured by Shin-Nakamura Chemical Co., Ltd.): 9.1 parts by mass Fluorine-based polymer: 0.54 parts by mass The fluorine-based polymer was a copolymer of 40 parts of $C_6F_{13}CH_2CH_2OCOCH\!\!=\!\!CH_2$, 55 parts of $H(OCH(CH_3)CH_2)_7OCOCH\!\!=\!\!CH_2$, and 5 parts of $H(OCH_2CH_2)_7OCOCH\!\!=\!\!CH_2$ and a solution of 30% by mass of methyl ethyl ketone having a weight-average molecular weight of 30,000 (trade name: MEGAFACE F780F, manufactured by DIC Corporation).

——Coating Fluid for Interlayer: Formulation P1——

Polyvinyl alcohol: 32.2 parts by mass (trade name: PVA205, manufactured by Kuraray Co., Ltd., degree of saponification=88 mol %, degree of polymerization 550)

Polyvinyl pyrrolidone: 14.9 parts by mass (trade name: K-30, manufactured by ISB Corporation)

Distilled water: 524 parts by mass

Methanol: 429 parts by mass (Formation of Transparent Electrode Pattern)

The film having the transparent film and the transparent electrode layer formed on the transparent film substrate was washed, and the photosensitive film for etching E1 from which the protective film had been removed was laminated on this film so that a surface of the transparent electrode layer and a surface of the photocurable resin layer for etching faced each other (the temperature of the transparent film substrate: 130° C., the rubber roller temperature: 120° C., the linear pressure: 100 N/cm, and the transportation rate: 2.2 m/minute). As a result of peeling the temporary base material, the thermoplastic resin layer and the interlayer were transferred to the surface of the transparent electrode layer together with the photocurable resin layer for etching. The distance between a surface of an exposure mask (a silica exposure mask having a transparent electrode pattern) and the photocurable resin layer for etching was set to 200 µm, and pattern exposure was carried out on the photocurable resin layer for etching through the thermoplastic resin layer and the interlayer at an exposure amount of 50 mJ/cm² (i rays).

Next, a development treatment was carried out at 25° C. for 100 seconds using a triethanolamine-based developer (containing 30% by mass of triethanolamine, a liquid obtained by diluting T-PD2 (trade name, manufactured by Fujifilm Corporation) with pure water ten times), the thermoplastic resin layer and the interlayer were dissolved, and a washing treatment was carried out at 33° C. for 20 seconds using a surfactant-containing washing liquid (a liquid obtained by diluting T-SD3 (trade name, manufactured by Fujifilm Corporation) with pure water ten times). Pure water was sprayed from ultrahigh-pressure washing nozzles, residues on the thermoplastic resin layer were removed using a rotary brush, and furthermore, a post-baking treatment was carried out at 130° C. for 30 minutes, thereby obtaining a film having the transparent film, the transparent electrode layer, and a photocurable resin layer pattern for etching formed on the transparent film substrate.

The film having the transparent film, the transparent electrode layer, and the photocurable resin layer pattern for etching formed on the transparent film substrate was immersed in an etching tank filled with ITO etchants (hydrochloric acid and an aqueous solution of potassium chloride, liquid temperatures: 30° C.), was treated (etching treatment) for 100 seconds, and the transparent electrode layer in exposed regions which were not covered with the photocurable resin layer for etching was dissolved and removed, thereby obtaining a transparent electrode pattern-attached film to which the photocurable resin layer pattern for etching was attached.

Next, this transparent electrode pattern-attached film was immersed in a resist peeling tank filled with a resist peeling liquid (N-methyl-2-pyrrolidone, monoethanolamine, surfactant (trade name: SURFYNOL 465, manufactured by Air Products and Chemicals, Inc.), liquid temperatures: 45° C.) and treated for 200 seconds, and the photocurable resin layer for etching was removed, thereby obtaining a film having the transparent film and a transparent electrode pattern (an electrode of an electrostatic capacitance-type input device) formed on the transparent film substrate.

4. Production of Laminates of Examples and Comparative Examples

Using the transfer film of each of the examples and the comparative examples, from which the protective film had been peeled off, the second transparent resin layer, the photosensitive transparent resin layer, and the temporary support were transferred in this order so that the second transparent resin layer covered the transparent film and the transparent electrode pattern (the electrode of the electrostatic capacitance-type input device) of the film having the transparent film and the transparent electrode pattern formed on the transparent film substrate (a substrate including the electrode of the electrostatic capacitance-type input device), thereby obtaining a laminate having the temporary support (the temperature of the transparent film substrate of 40° C., the rubber roller temperature of 110° C., the linear pressure of 3 N/cm, and the transportation rate of 2 m/minute).

After that, using a proximity-type stepper having an ultrahigh-pressure mercury lamp (manufactured by Hitachi High-Tech Fielding Corporation), the distance between an exposure mask (a silica exposure mask having a pattern for forming an overcoat layer) surface and the temporary support was set to 125 µm, and the obtained laminate having the temporary support was pattern-exposed through the temporary support at an exposure amount of 100 mJ/cm² (i rays). After the temporary support was peeled off, a washing treatment was carried out on the pattern-exposed laminate (film substrate) at 32° C. for 60 seconds using an aqueous solution of 2% by mass of sodium carbonate. Ultrapure water was sprayed to the washing-treated transparent film substrate from ultrahigh-pressure washing nozzles, thereby removing residues. Subsequently, moisture on the transparent film substrate was removed by blowing the air, and a heating (post-basking) treatment was carried out at 145° C. for 30 minutes, thereby obtaining a laminate in which the transparent film, the transparent electrode pattern (the electrode of the electrostatic capacitance-type input device), the second transparent resin layer, and the photosensitive transparent resin layer were continuously provided in this order on the transparent film substrate.

[Evaluation of Transfer Film]

<Measurement of Refractive Indexes and Thicknesses of Individual Layers of Transfer Film>

As the method for measuring refractive indexes and thicknesses, there are a method in which refractive indexes and thicknesses are computed by means of fitting to theoretical values from spectral reflectivity spectra, a method in which refractive indexes and thicknesses are obtained by means of ellipsometry, and the like. In the respective examples and the respective comparative examples, the refractive indexes and thicknesses of the respective layers were computed from spectral reflectivity spectra. As a measurement instrument, a thickness monitor FE-3000 (manufactured by Otsuka Electronics Co., Ltd.) was used.

(1) A laminate was produced by adhering PT100 NB (manufactured by Lintec Corporation) which was a black polyethylene terephthalate (PET) material to one surface of the temporary support that was used in each of the examples and the comparative examples through transparent adhesive tape (trade name: OCA tape 8171CL: manufactured by The 3M Company. OCA is the abbreviation of Optically Clear Adhesive). The reflection spectrum (wavelength: 430 to 800 nm) of the laminate of the temporary support and the black PET was measured using the thickness monitor FE-3000, and the refractive indexes of the temporary support at the respective wavelengths were obtained by means of computation.

(2) A laminate was produced by bringing a black PET material into contact with the temporary support surface of a sample obtained by forming only the photosensitive transparent resin layer and the second transparent resin layer on the temporary support in the same manner as in the respective examples and the respective comparative examples through transparent adhesive tape (OCA tape 8171CL: manufactured by The 3M Company). The reflection spectrum (wavelength: 430 to 800 nm) of the laminate of the photosensitive transparent resin layer, the temporary support, and the black PET was measured using the thickness monitor FE-3000, and the refractive indexes of the photosensitive transparent resin layer and the thickness of the photosensitive transparent resin layer at the respective wavelengths were obtained by means of fitting computation for which the fast Fourier transform (FFT) method and the least-square method were used. At this time, as the initial value of the thickness that was used in the computation, the thickness of the photosensitive transparent resin layer measured using a transmission electron microscope (TEM: HT7700, manufactured by Hitachi High-Tech Fielding Corporation) was used.

(3) Similarly, the reflection spectra of laminates obtained by adhering a black PET material to samples of a laminate of the temporary support, the photosensitive resin protective layer, and the second transparent resin layer were sequentially measured, and the refractive indexes and thicknesses of the respective layers were computed.

The refractive indexes of the second transparent resin layers and the thicknesses of the photosensitive transparent resin layers which were used in the transfer films of the respective examples and the respective comparative examples are shown in Table 5. In addition, the refractive indexes of the photosensitive transparent resin layers that were used for the transfer films of the respective examples and the respective comparative examples were in a range of 1.50 to 1.52.

<Measurement of Moisture Permeability>

The moisture permeability of a measurement sample obtained by laminating five transfer films of each of the examples and the comparative examples was measured using the method described in JIS Z 0208 (measurement conditions: 40° C., a relative humidity of 90%, and after 24 hours).

The measurement sample was produced using the following method. Five layers of the produced transfer film of each of the examples and the comparative examples were laminated on a commercially available TEFLON (registered trademark) mesh (the temperature of a transparent film substrate: 40° C., the rubber roller temperature: 110° C., a linear pressure: 3 N/cm, and the transportation rate of 2 m/minute). After that, using a proximity-type stepper having an ultrahigh-pressure mercury lamp (manufactured by Hitachi High-Tech Fielding Corporation), the distance between a surface of an exposure mask (a silica exposure mask having a pattern for forming an overcoat layer) and the temporary support was set to 125 µm, pattern exposure was carried out at an exposure amount of 100 mJ/cm² (i rays) through the temporary support, and furthermore, a heating (post baking) treatment was carried out at 150° C. for 60 minutes, thereby producing a laminate which was used as the measurement sample.

The results are shown in Table 5.

<Evaluation of Heat and Moisture Resistance After Supply of Saline Water>

Using the transfer film of each of the examples and the comparative examples from which the protective film had been peeled off, the second transparent resin layer and the photosensitive transparent resin layer were transferred onto a PET film on which a copper foil (alternatively used as the electrode of the electrostatic capacitance-type input device) was laminated (manufactured by Geomatec Co., Ltd.) in the same manner as in the method for transferring to the film having the transparent film and the transparent electrode pattern formed on the transparent film substrate, thereby obtaining a specimen on which post processes (the peeling of the temporary support, development, post baking, and the like) were carried out.

Saline water having a concentration of 200 g/L (5 cm³) was added dropwise to the film surface of the photosensitive transparent resin layer in the specimen, was evenly spread to 50 cm², then, moisture was volatilized at normal temperature, and the specimen was stored at a high temperature and a high humidity (85° C., a relative humidity: 85%) for 120 hours. After that, the saline water was wiped, and the surface state of the specimen was observed and evaluated according to the following evaluation points.

A or B is a practically necessary level, and A is preferred. The evaluation results are shown in Table 5.

A: All of copper, the second transparent resin layer surface, and the photosensitive transparent resin layer surface did not change.

B: A small number of marks were observed on the second transparent resin layer surface or the photosensitive transparent resin layer surface, but copper did not change.

C: Marks were clearly observed on the second transparent resin layer surface or the photosensitive transparent resin layer surface, but copper did not change.

D: Copper was discolored.

[Evaluation of Laminate]

<Evaluation of Development Residues>

After the transfer film of each of the examples was transferred onto the film having the transparent film and the transparent electrode pattern formed on the transparent film substrate (the substrate including the electrode of the electrostatic capacitance-type input device), using a proximity-type stepper having an ultrahigh-pressure mercury lamp (manufactured by Hitachi High-Tech Fielding Corporation), the distance between an exposure mask (a silica exposure mask having a pattern for forming an overcoat layer) surface and the temporary support was set to 125 µm, and pattern-exposure was carried out through the temporary support at an exposure amount of 100 mJ/cm² (i rays). After the temporary support was peeled off, a washing treatment was carried out at 32° C. for 40 seconds using an aqueous solution of 2% by mass of sodium carbonate. After that, observation was carried out using an optical microscope. In all of the levels, development residues could not be confirmed.

In order to evaluate the latitude with respect to development conditions, development residue evaluation (forcible conditions) was carried out under conditions in which development was hard, that is, the development temperature was set to 30° C.

Even in a case in which the development conditions were set to be hard from standard development conditions, it is desirable that regions in which no development residues are observed are present, A or B is preferred, and A is more preferred. The evaluation results are shown in Table 5.

«Evaluation Standards»

A: It was not possible to observe development residues in the non-exposed portions even with the microscope.

B: It was not possible to visually observe development residues on the non-exposed portions, but possible to observe less than one residue per square meter with the microscope.

C: There were non-developed portions in the non-exposed portions, and it was possible to visually observe a number of development residues.

<Stickiness Evaluation>

The transfer film of each of the examples and the comparative examples was transferred onto "the film having the transparent film and the transparent electrode pattern formed on the transparent film substrate (a substrate including an electrode of an electrostatic capacitance-type input device)", then, using a proximity-type stepper having an ultrahigh-pressure mercury lamp (manufactured by Hitachi High-Tech Fielding Corporation), the distance between a surface of an exposure mask (a silica exposure mask having a pattern for forming an overcoat layer) and the temporary support was set to 125 μm, and pattern exposure was carried out at an exposure amount of 100 mJ/cm² (i rays) through the temporary support. After the temporary support was peeled off, the protective film was contacted with fingers, and the stickiness was evaluated from the deformation of the protective film by means of sensory evaluation.

A, B, or C is preferred, A or B is more preferred, and A is particularly preferred. The evaluation results are shown in Table 5.

«Evaluation Standards»

A: Traces of finger contact were not observed.

B: Traces of finger contact could be slightly observed in a case in which light was reflected on the protective film.

C: In a case in which the protective film was contacted with fingers, slight deformation could be visually observed.

D: Traces of finger contact clearly remained.

<Evaluation of Transparent Electrode Pattern-Masking Property>

The laminate in which the transparent film, the transparent electrode pattern, the second transparent resin layer, and the photosensitive transparent resin layer were laminated in this order on the transparent film substrate and a black PET material were adhered to each other through transparent adhesive tape (manufactured by The 3M Company, trade name: OCA tape 8171CL) in an order in which the black PET material and the transparent adhesive tape were adjacent to each other and the transparent adhesive tape and the photosensitive transparent resin layer were adjacent to each other, thereby producing a substrate for evaluation which was fully shielded from light.

The transparent electrode pattern-masking property was evaluated in the following manner: light was incident on the transparent film substrate surface side of the substrate for evaluation using a fluorescent lamp (light source) and the produced substrate for evaluation in a dark room, and reflected light from the surface on which the light from the transparent film substrate was incident was visually observed at an inclined angle. The transparent electrode pattern-masking property was evaluated on the basis of the following evaluation standards. The transparent electrode pattern-masking property is preferably A, B, or C, more preferably A or B, and particularly preferably A. The evaluation results are shown in Table 5.

«Evaluation Standards»

A: The transparent electrode pattern was not observed.

B: The transparent electrode pattern was slightly observed, but barely observed.

C: The transparent electrode pattern was observed (not easy to be recognized).

D: The transparent electrode pattern was observed within a practically permissible range.

E: The transparent electrode pattern was clearly observed (easy to be recognized).

TABLE 5

| | Photosensitive transparent resin layer | | | | Second transparent resin layer | | Moisture permeability g/m²/day | Heat and moisture resistance after supply of saline water | Development residues | Stickiness | Transparent electrode pattern-masking property |
|---|---|---|---|---|---|---|---|---|---|---|---|
| | | Rosin compound | | | | | | | | | |
| | Material | Kind | Amount added [% by mass] | Thickness [μm] | Material | Refractive index | | | | | |
| Example 1 | Material A-1 | Acid-modified rosin A | 5.0 | 8 | Material-B2 | 1.65 | 400 | B | A | A | A |
| Example 2 | Material A-2 | Acid-modified rosin A | 10.0 | 8 | Material-B2 | 1.65 | 310 | A | A | A | A |
| Example 3 | Material A-3 | Acid-modified rosin A | 20.0 | 8 | Material-B2 | 1.65 | 240 | A | A | A | A |
| Example 4 | Material A-4 | Acid-modified rosin A | 40.0 | 8 | Material-B2 | 1.65 | 200 | A | A | B | A |
| Example 5 | Material A-5 | Acid-modified rosin A | 50.0 | 8 | Material-B2 | 1.65 | 160 | A | B | C | A |
| Example 6 | Material A-6 | Hydrogenated rosin B | 5.0 | 8 | Material-B2 | 1.65 | 360 | B | A | A | A |
| Example 7 | Material A-7 | Hydrogenated rosin B | 10.0 | 8 | Material-B2 | 1.65 | 210 | A | A | A | A |
| Example 8 | Material A-8 | Hydrogenated rosin B | 20.0 | 8 | Material-B2 | 1.65 | 160 | A | A | A | A |
| Example 9 | Material A-9 | Hydrogenated rosin B | 40.0 | 8 | Material-B2 | 1.65 | 120 | A | A | B | A |
| Example 10 | Material A-8 | Hydrogenated rosin B | 20.0 | 2 | Material-B2 | 1.65 | 450 | B | A | A | A |
| Example 11 | Material A-8 | Hydrogenated rosin B | 20.0 | 4 | Material-B2 | 1.65 | 270 | A | A | A | A |
| Example 12 | Material A-8 | Hydrogenated rosin B | 20.0 | 20 | Material-B2 | 1.65 | 80 | A | A | A | A |
| Example 13 | Material A-8 | Hydrogenated rosin B | 20.0 | 30 | Material-B2 | 1.65 | 50 | A | B | A | A |

TABLE 5-continued

|  | Photosensitive transparent resin layer | | | | Second transparent resin layer | | Moisture permeability g/m²/day | Heat and moisture resistance after supply of saline water | Development residues | Stickiness | Transparent electrode pattern-masking property |
|---|---|---|---|---|---|---|---|---|---|---|---|
|  |  | Rosin compound | | | | | | | | | |
|  | Material | Kind | Amount added [% by mass] | Thickness [μm] | Material | Refractive index | | | | | |
| Example 14 | Material A-10 | Hydrogenated rosin C | 10.0 | 8 | Material-B2 | 1.65 | 200 | A | A | A | A |
| Example 15 | Material A-11 | Hydrogenated rosin C | 20.0 | 8 | Material-B2 | 1.65 | 140 | A | A | A | A |
| Example 16 | Material A-12 | Hydrogenated rosin C | 10.0 | 8 | Material-B2 | 1.65 | 240 | A | A | A | A |
| Example 17 | Material A-13 | Hydrogenated rosin C | 20.0 | 8 | Material-B2 | 1.65 | 190 | A | A | A | A |
| Example 18 | Material A-14 | Acid-modified rosin D | 10.0 | 8 | Material-B2 | 1.65 | 300 | A | A | A | A |
| Example 19 | Material A-15 | Esterified rosin E | 10.0 | 8 | Material-B2 | 1.65 | 380 | A | A | A | A |
| Example 20 | Material A-16 | Rosin R | 10.0 | 8 | Material-B2 | 1.65 | 210 | A | A | A | A |
| Example 21 | Material A-17 | Rosin R | 20.0 | 8 | Material-B2 | 1.65 | 160 | A | A | A | A |
| Example 22 | Material A-1 | Acid-modified rosin A | 5.0 | 8 | None | — | 420 | A | A | A | E |
| Example 23 | Material A-1 | Acid-modified rosin A | 5.0 | 8 | Material-B1 | 1.50 | 380 | A | A | A | D |
| Comparative Example 1 | Material A-18 | None | 0.0 | 8 | Material-B2 | 1.65 | 500 | C | A | A | A |
| Comparative Example 2 | Material A-19 | None | 0.0 | 8 | Material-B2 | 1.65 | 2000 | D | A | A | A |

From Table 5, it was found that the transfer film of the present invention can be used to form electrode protective films for electrostatic capacitance-type input devices which have a low moisture permeability and are excellent in terms of the heat and moisture resistance after the supply of saline water.

Meanwhile, in Comparative Examples 1 and 2 to which (D) the rosin compound was not added, the moisture permeability was high, and the heat and moisture resistance after the supply of saline water was poor.

In Examples 4, 5, and 9 in which the amount of (D) the rosin compound was great, the moisture permeability was low, but stickiness was not observed. In addition, in the constitutions in which $ZrO_2$ particles were added to the second transparent resin layer in Examples 1 to 21, it was found that the refractive index of the second transparent resin layer reached 1.65, and it was possible to form electrode protective films for electrostatic capacitance-type input devices being excellent in terms of transparent electrode pattern-masking properties.

In the same manner as in the method for computing the refractive indexes and thicknesses of the respective layers in a state of the transfer film, a black PET was adhered to the rear surface of a laminate obtained by sequentially laminating layers one by one on a transparent film substrate, the reflection spectrum was measured using the reflective film thickness monitor FE-3000, and the refractive indexes and thicknesses of the respective layers of the laminate were computed by means of operation. As a result, the refractive indexes and thicknesses of the respective layers of the laminate were the same as those computed in the transfer film.

Furthermore, the content of the metal oxide particles in the photosensitive transparent resin layer or the second transparent resin layer of the laminate of each of the examples and the comparative examples was measured using the following method.

A cross section of the laminate is obtained by means of cutting and is then observed using a transmission electron microscope (TEM). The ratios of the occupancy area of the metal oxide particles to the film cross-sectional area of the photosensitive transparent resin layer or the second transparent resin layer of the laminate are measured at three arbitrary places, and the average value thereof is considered as the volume fraction (VR).

The volume fraction (VR) is converted using the following expression, thereby computing the weight fraction (WR) of the metal oxide particles in the photosensitive transparent resin layer or the second transparent resin layer of the laminate.

$$WR = D*VR/(1.1*(1-VR)+D*VR)$$

D: The specific weight of the metal oxide particles

The ratios can be computed with D that is 4.0 in a case in which the metal oxide particles are titanium oxide or 6.0 in a case in which the metal oxide particles are zirconium oxide.

Meanwhile, the content of the metal oxide particles in the photosensitive transparent resin layer or the second transparent resin layer of the laminate of each of the examples and the comparative examples can also be computed from the composition of the photosensitive transparent resin layer or the second transparent resin layer. The content of the metal oxide particles in the photosensitive transparent resin layer or the second transparent resin layer of the laminate was the same as the content computed from the composition of the photosensitive transparent resin layer or the second transparent resin layer.

[Production of Electrostatic Capacitance-Type Input Device and Image Display Device (Touch Panel)]

To a liquid crystal display device manufactured using the method described in [0097] to [0119] of JP2009-47936A, the laminate of each example was attached, and, furthermore, a front glass plate was bound, thereby producing an image display device including the laminate of each of the examples which included the electrostatic capacitance-type input device as a constituent element using a well-known method.

<Evaluation of Electrostatic Capacitance-Type Input Devices and Image Display Devices>

The image display devices including the laminate of each of Examples 1 to 23 did not have any defects such as air bubbles in the photosensitive transparent resin layer and the second transparent resin layer, and image display devices having excellent display characteristics were obtained.

EXPLANATION OF REFERENCES

1: substrate
2: mask layer
3: transparent electrode pattern (first transparent electrode pattern)
3a: pad portion
3b: connection portion
4: transparent electrode pattern (second transparent electrode pattern)
5: insulating layer
6: additional conductive element
7: photosensitive transparent resin layer (preferably having a function of a transparent protective layer)
8: opening portion
10: electrostatic capacitance-type input device
11: transparent film
12: second transparent resin layer (which may have a function of a transparent insulating layer)
13: laminate
21: region in which transparent electrode pattern, second transparent resin layer, and photosensitive transparent resin layer are laminated in this order
22: non-patterned region
α: taper angle
26: temporary support
27: thermoplastic resin layer
28: interlayer
29: protective film
30: transfer film
31: terminal portion of guidance wire
33: cured portion of photosensitive transparent resin layer and second transparent resin layer
34: opening portion corresponding to terminal portion of guidance wire (non-cured portion of photosensitive transparent resin layer and second transparent resin layer)
C: first direction
D: second direction

What is claimed is:

1. A transfer film comprising:
   a temporary support; and
   a photosensitive transparent resin layer located on the temporary support,
   wherein the photosensitive transparent resin layer includes (A) a binder polymer, (B) a photopolymerizable compound having an ethylenic unsaturated group, (C) a photopolymerization initiator, and (D) a rosin compound having an acid value of from 50 to 300 mgKOH/g.

2. The transfer film according to claim 1,
   wherein (D) the rosin compound is one or more kinds of rosin compounds selected from rosin, hydrogenated rosin, acid-modified rosin, and esterified rosin.

3. The transfer film according to claim 1,
   wherein (D) the rosin compound includes one or more kinds of compounds selected from abietic acid, an abietic acid derivative, palustric acid, a palustric acid derivative, isopimaric acid, and an isopimaric acid derivative.

4. The transfer film according to claim 1,
   wherein (D) the rosin compound is rosin or hydrogenated rosin.

5. The transfer film according to claim 1,
   wherein the content of (D) the rosin compound is 45% by mass or less of the solids content of the photosensitive transparent resin layer.

6. The transfer film according to claim 1, further comprising:
   a second transparent resin layer on the photosensitive transparent resin layer,
   wherein the refractive index of the second transparent resin layer is higher than the refractive index of the photosensitive transparent resin layer.

7. The transfer film according to claim 1,
   wherein the thickness of the photosensitive transparent resin layer is 20 μm or less.

8. The transfer film according to claim 1,
   wherein the transfer film is used for an electrode protective film for an electrostatic capacitance-type input device.

9. An electrode protective film for an electrostatic capacitance-type input device which is obtained by peeling off the temporary support from the transfer film according to claim 1.

10. A laminate which is formed by using the transfer film according to claim 1 and transferring the photosensitive transparent resin layer in the transfer film onto a substrate including an electrode of an electrostatic capacitance-type input device.

11. The laminate according to claim 10,
    wherein the electrode of the electrostatic capacitance-type input device is a transparent electrode pattern.

12. The laminate according to claim 10,
    wherein the thickness of the photosensitive transparent resin layer is 20 μm or less.

13. A method for manufacturing a laminate, comprising:
    using the transfer film according to claim 1 and transferring the photosensitive transparent resin layer in the transfer film onto a substrate including an electrode of an electrostatic capacitance-type input device.

14. The method for manufacturing a laminate according to claim 13,
    wherein the substrate is a transparent film substrate.

15. An electrostatic capacitance-type input device comprising:
    the laminate according to claim 10.

16. The transfer film according to claim 1,
    wherein the photosensitive transparent resin layer comprises a urethane (meth)acrylate compound.

17. The transfer film according to claim 1,
    wherein the rosin compound is one or more kinds of compounds selected from the group consisting of palustric acid, a palustric acid derivative, isopimaric acid, and an isopimaric acid derivative.

18. The transfer film according to claim 1,
    wherein the rosin compound is one or more kinds of rosin compounds selected from the group consisting of rosin, hydrogenated rosin and acid-modified rosin.

19. The transfer film according to claim 1,
    wherein the photosensitive transparent resin layer includes, as the photopolymerizable compound having an ethylenic unsaturated group, at least one photopolymerizable compound having an ethylenic unsaturated group which contains a carboxy group.

20. The transfer film according to claim 1,
    wherein the photosensitive transparent resin layer includes, as the photopolymerizable compound having an ethylenic unsaturated group, at least one photopolymerizable compound having an ethylenic unsaturated group which contains a carboxy group, and
    the content of the photopolymerizable compound having an ethylenic unsaturated group which contains a carboxy group is in a range of 1% to 50% by mass of all of the photopolymerizable compounds.

21. The transfer film according to claim 1, wherein the photosensitive transparent resin layer includes, as the photopolymerizable compound having an ethylenic unsaturated group, at least tricyclodecane dimethanol diacrylate.

22. The transfer film according to claim 1, wherein the photosensitive transparent resin layer includes, as the photopolymerizable compound having an ethylenic unsaturated group, at least one (E) compound capable of reacting with acids by heating.

23. The transfer film according to claim 1, wherein the photosensitive transparent resin layer includes, as the photopolymerizable compound having an ethylenic unsaturated group, at least one (E) compound capable of reacting with acids by heating, and the compound capable of reacting with acids by heating is one or more blocked isocyanates.

24. A laminate comprising:
a substrate including an electrode of an electrostatic capacitance-type input device; and
a photosensitive transparent resin layer located on the substrate,
wherein the photosensitive transparent resin layer includes (A) a binder polymer, (B) a photopolymerizable compound having an ethylenic unsaturated group, (C) a photopolymerization initiator, and (D) a rosin compound having an acid value of from 50 to 300 mgKOH/g.

* * * * *